Nov. 28, 1950    A. W. MILLS ET AL    2,531,885
PAPER FEEDING DEVICE
Filed Aug. 9, 1945    20 Sheets-Sheet 2
FIG. 2.
FIG. 3.
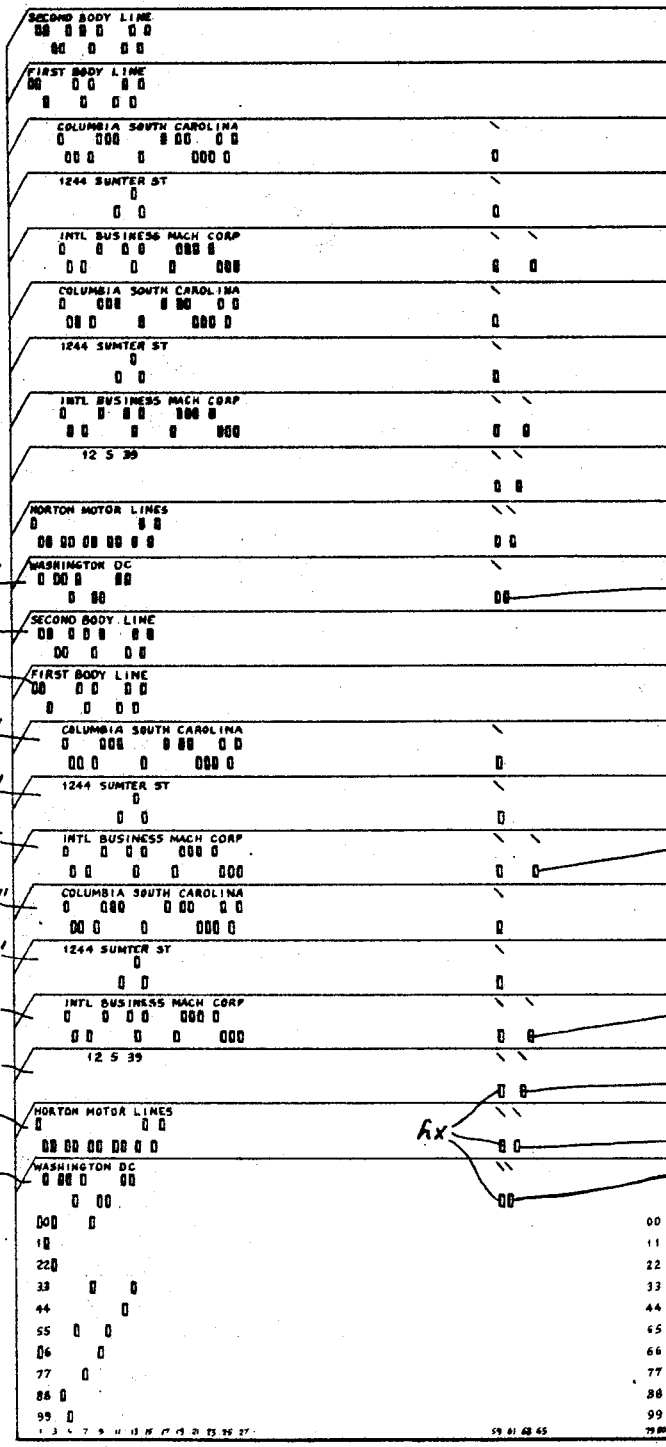
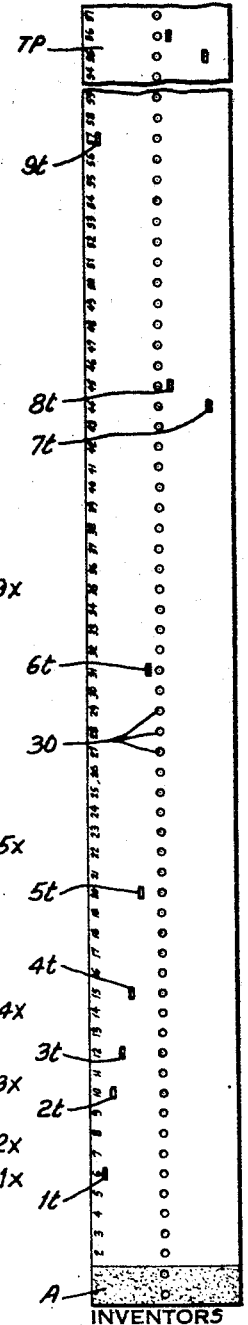
INVENTORS
A. W. MILLS
F. J. FURMAN
E. J. RABENDA
BY
ATTORNEY Nov. 28, 1950     A. W. MILLS ET AL     2,531,885
PAPER FEEDING DEVICE Filed Aug. 9, 1945     20 Sheets-Sheet 3

Figures 4, 5:
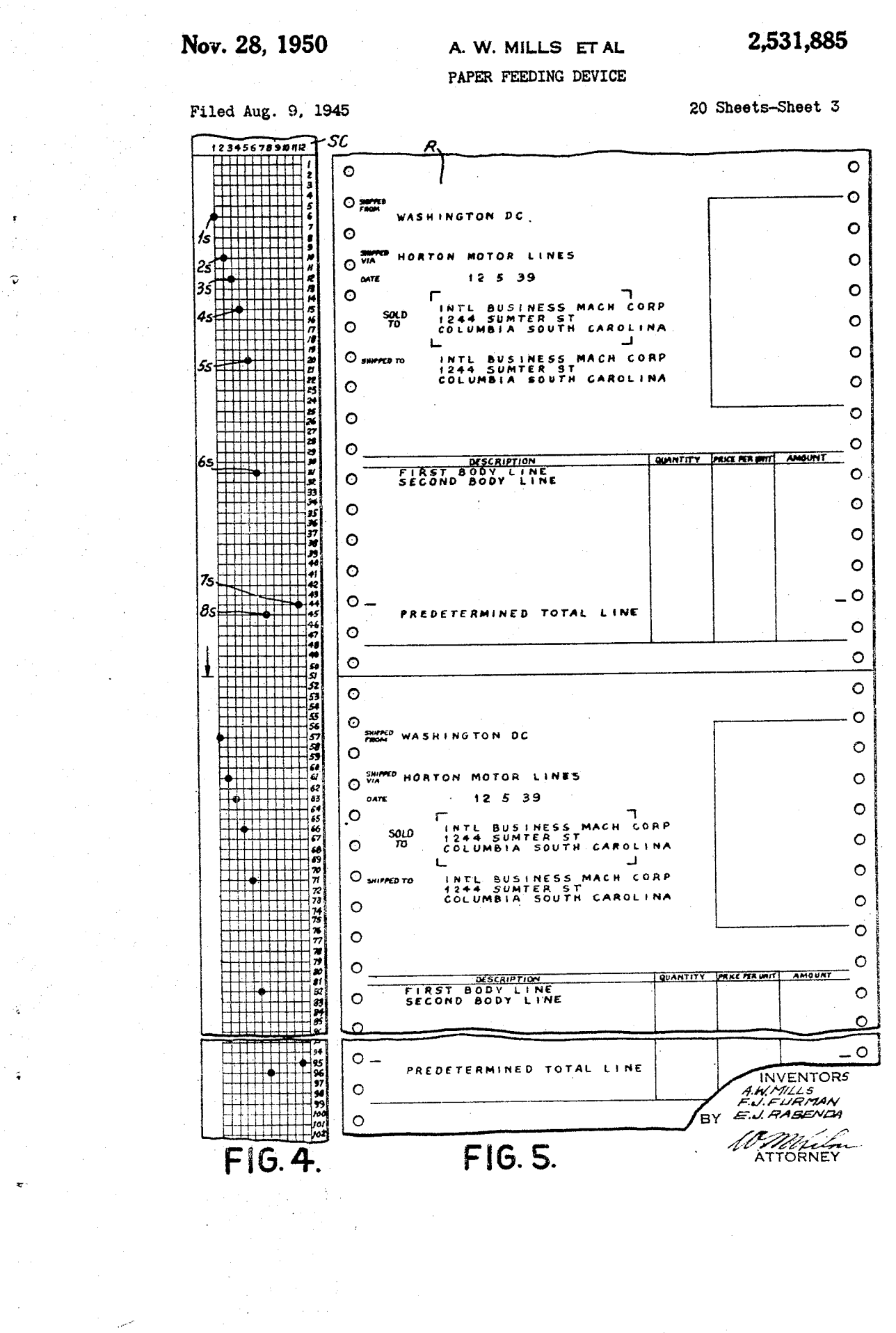

INVENTORS
A. W. MILLS
F. J. FURMAN
BY E. J. RABENDA
ATTORNEY

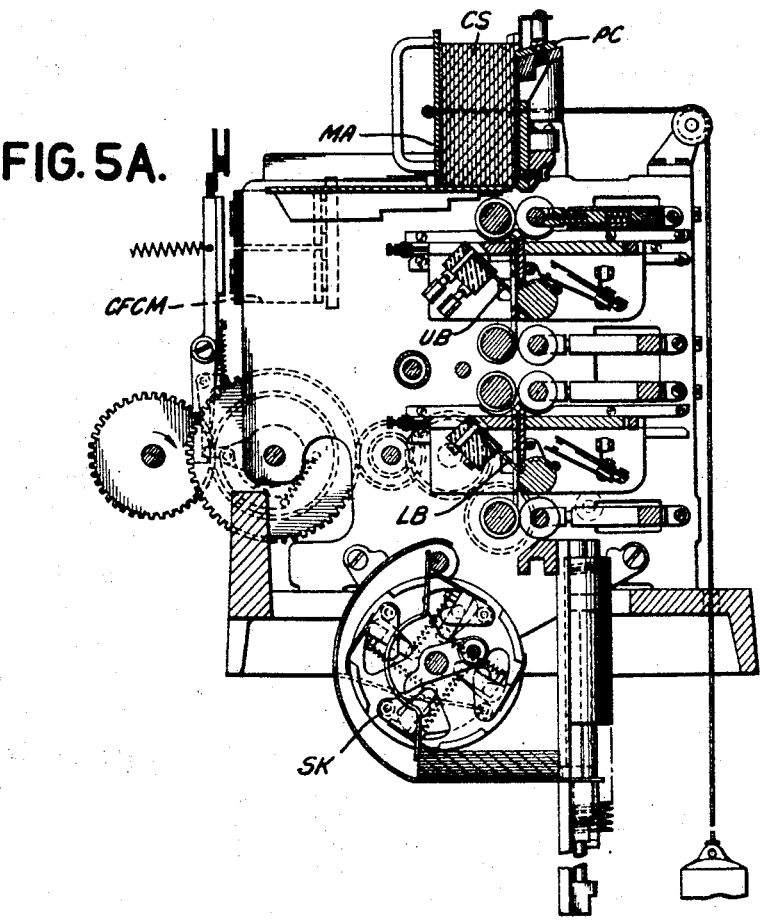

Nov. 28, 1950
A. W. MILLS ET AL
2,531,885
PAPER FEEDING DEVICE
Filed Aug. 9, 1945
20 Sheets-Sheet 5
FIG. 6.
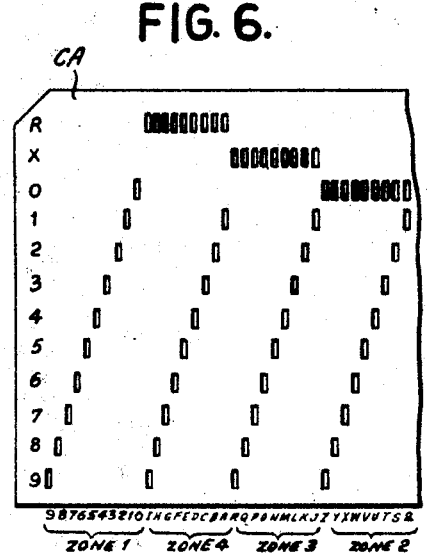
FIG. 7.
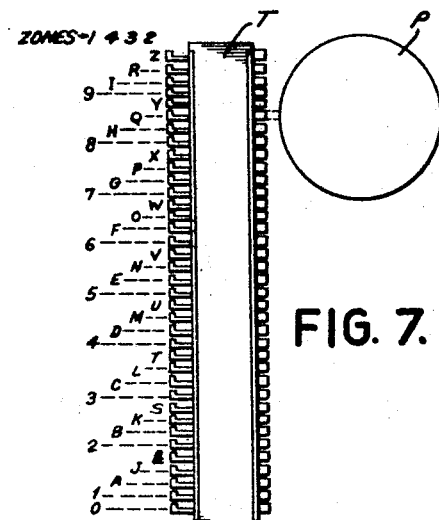
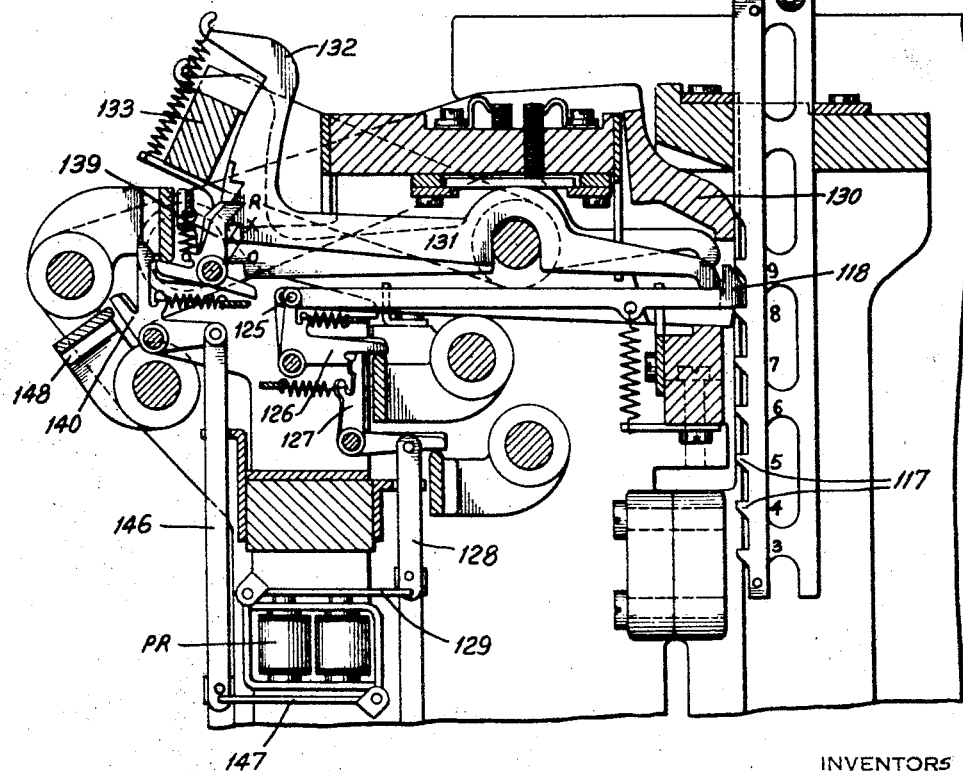
INVENTORS
A.W. MILLS
F.J. FURMAN
E.J. RABENDA
BY
ATTORNEY Nov. 28, 1950   A. W. MILLS ET AL   2,531,885
PAPER FEEDING DEVICE
Filed Aug. 9, 1945   20 Sheets-Sheet 6

INVENTORS
A.W. MILLS
F.J. FURMAN
BY E.J. RABENDA
ATTORNEY

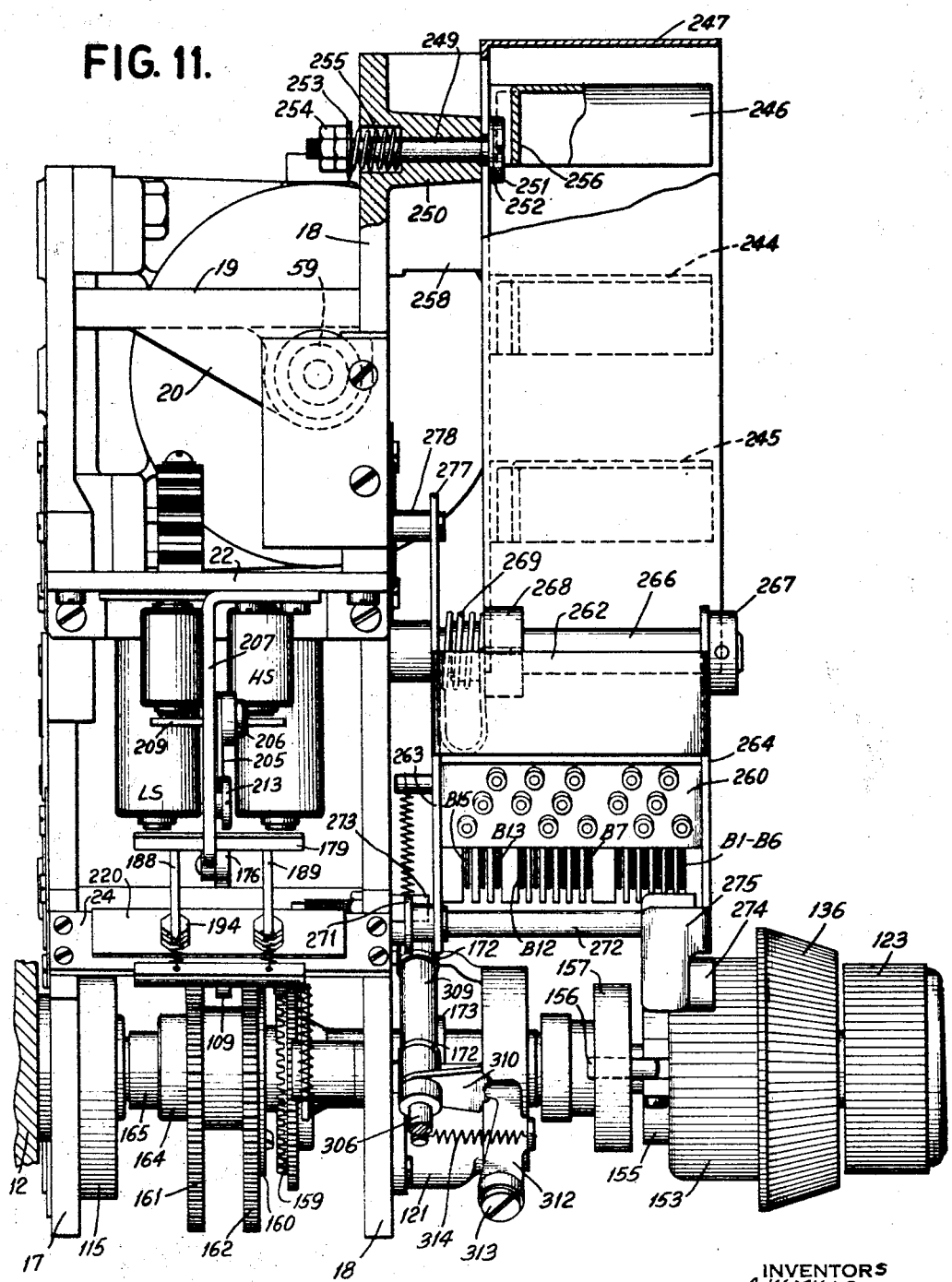

Nov. 28, 1950     A. W. MILLS ET AL     2,531,885
PAPER FEEDING DEVICE
Filed Aug. 9, 1945                                  20 Sheets-Sheet 10
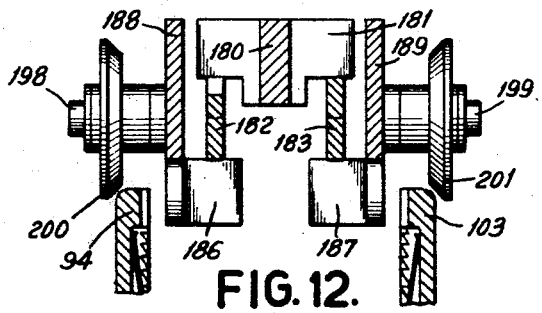
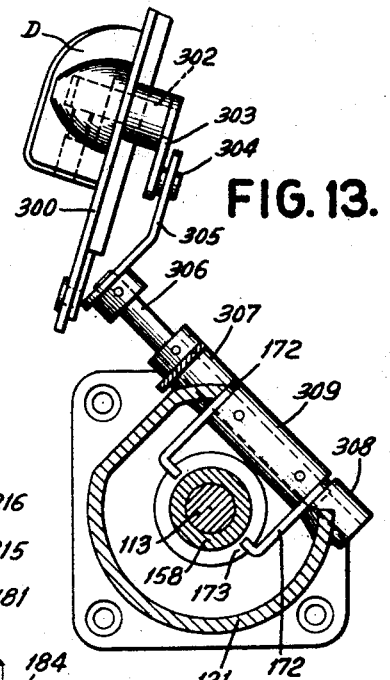
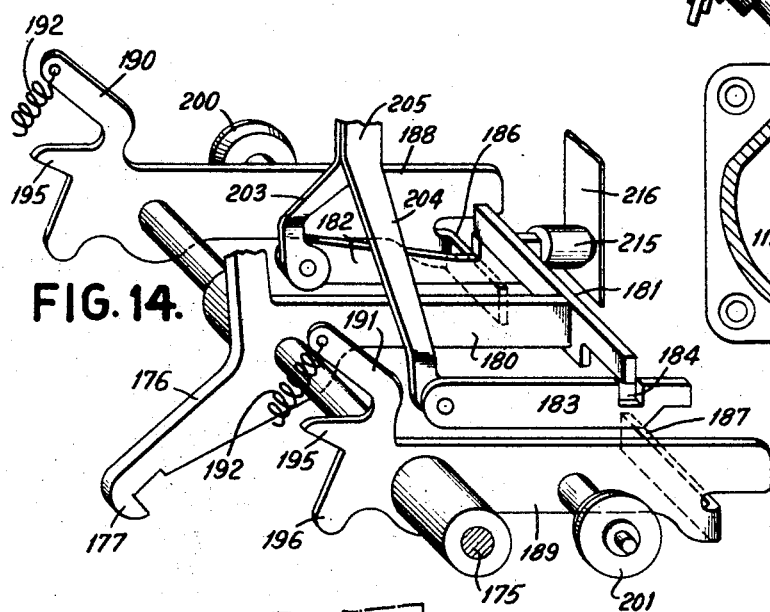
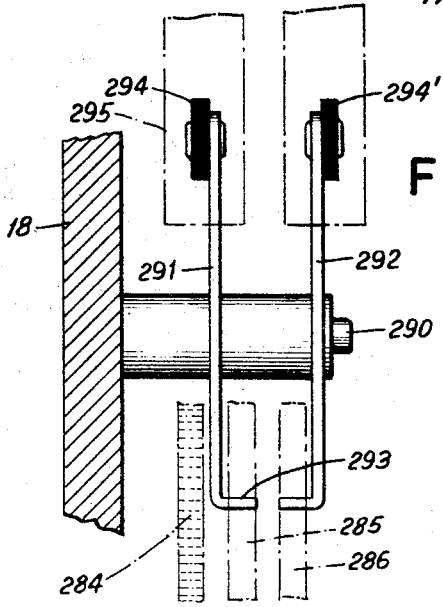
INVENTORS
A. W. MILLS
F. J. FURMAN
E. J. RABENDA
BY
ATTORNEY

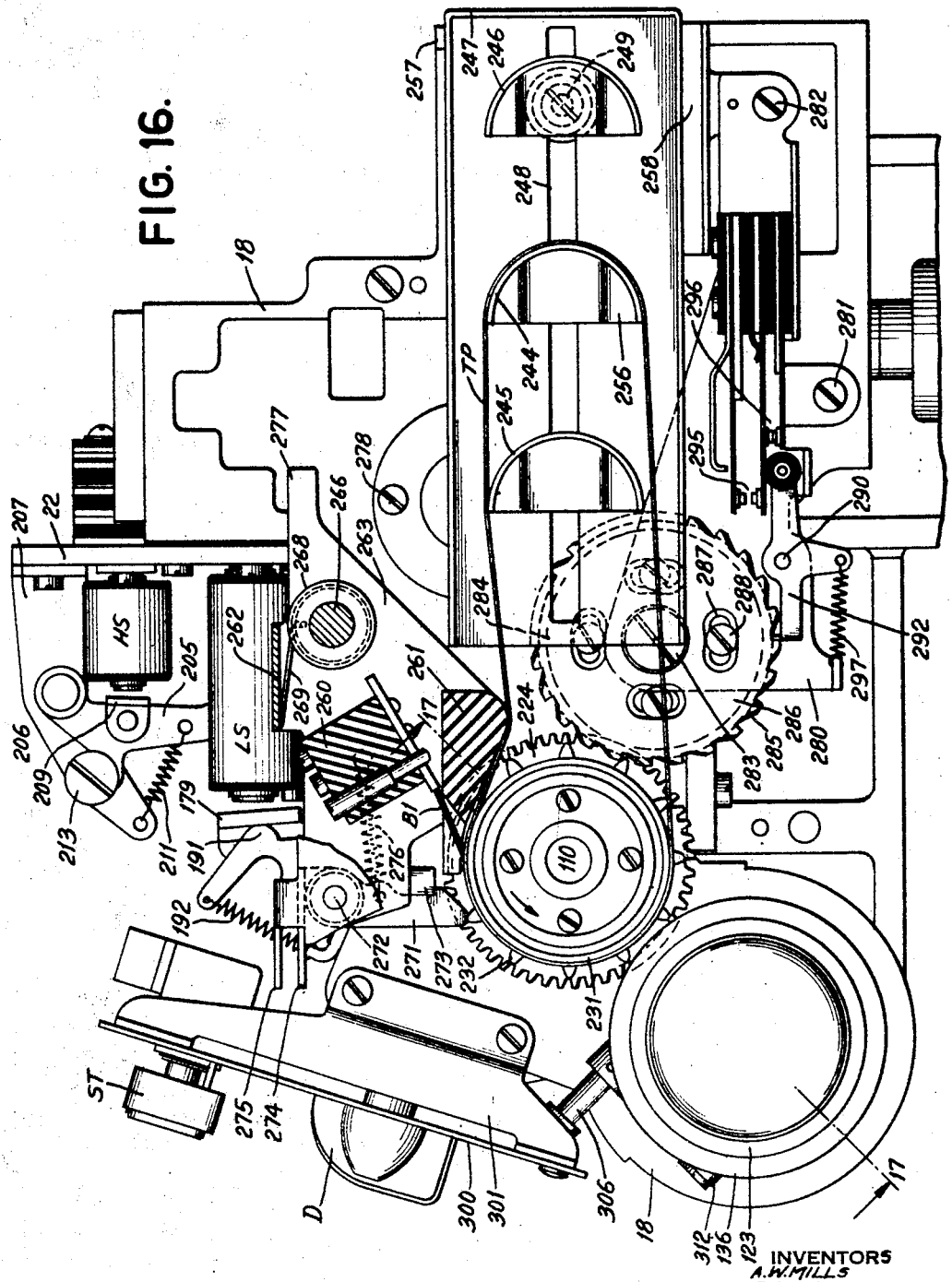

Nov. 28, 1950 A. W. MILLS ET AL 2,531,885
PAPER FEEDING DEVICE
Filed Aug. 9, 1945 20 Sheets-Sheet 12
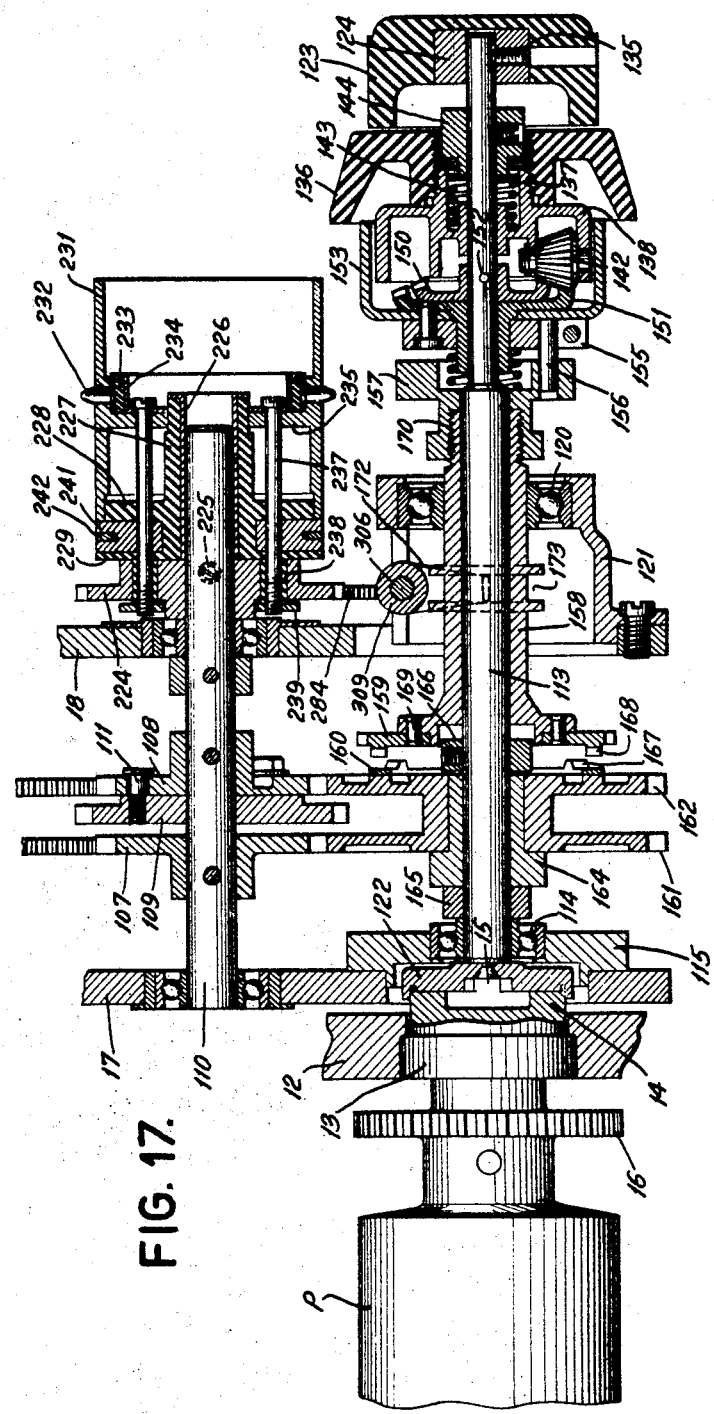
FIG. 17.
INVENTORS
A. W. MILLS
F. J. FURMAN
BY E. J. RABENDA
ATTORNEY Nov. 28, 1950  A. W. MILLS ET AL  2,531,885
PAPER FEEDING DEVICE Filed Aug. 9, 1945  20 Sheets-Sheet 14

Nov. 28, 1950    A. W. MILLS ET AL    2,531,885
PAPER FEEDING DEVICE
Filed Aug. 9, 1945    20 Sheets-Sheet 17

INVENTORS
A. W. MILLS
F. J. FURMAN
E. J. RABENDA
BY
ATTORNEY

Nov. 28, 1950 — A. W. MILLS ET AL — 2,531,885
PAPER FEEDING DEVICE
Filed Aug. 9, 1945 — 20 Sheets-Sheet 18

INVENTORS
A. W. MILLS
F. J. FURMAN
E. J. RABENDA
BY
ATTORNEY

Patented Nov. 28, 1950

2,531,885

UNITED STATES PATENT OFFICE 2,531,885

PAPER FEEDING DEVICE

Albert W. Mills and Frank J. Furman, Endicott, and Edward J. Rabenda, Binghamton, N. Y., assignors to International Business Machines Corporation, New York, N. Y., a corporation of New York Application August 9, 1945, Serial No. 609,854

72 Claims. (Cl. 235—61.9)

This invention relates generally to record sheet feeding devices and more specifically to means for positioning a continuous sheet of forms under control of a perforated tape.

This parent case contains claims relating to the tape controlled feeding devices in general. A number of divisional patent applications related to this case contain claims to specific portions of it. One divisional case, Serial No. 149,161, filed on March 11, 1950, contains claims to the feed control tapes and scales for measuring indicia positions thereon; a second divisional case, Serial No. 149,162, filed on March 11, 1950 contains claims to the feed control clutch devices; and a third divisional case, Serial No. 149,163, filed on March 11, 1950, contains claims to the line spacing devices.

An object of the invention is to provide perforated tape feed controls operable in synchronism with a motor driven feeding platen for controlling record strip advancement to receive printed heading and detail lines of print in pre-arranged positions on bill forms or other accounting records.

Another object of the invention is to provide a continuous control tape for governing record sheet adjustment. The control tape is restored to initial position by devices selected by a manipulative key.

Heretofore, the feeding of a continuous record strip divided into forms has been controlled by mechanisms wherein the places for different headings, body sections, predetermined total lines, overflow lines, etc. have been preselected by adjustment of levers and contacts set at differential points with relation to mechanism movable in synchronism with the advancement of the record sheet. Those prior art mechanical controls have limitations because in trying to achieve complete flexibility of control, a large number of such control levers must be superimposed and made effective over a wide range of adjustment. The disadvantages mentioned are avoided in the present instance through the use of a perforated feed control tape. This tape has a plurality of punch column positions in which any one of a numerous variety of arrangements may be preselected. Cooperating with the tape is a plurality of sensing brushes, certain of which are allotted to control stoppage of the platen movement in various heading line positions. Others are provided to control the location of the sheet in various positions along the body of the form to receive detail lines. Another brush is allotted to cooperate with a perforation situated so as to control the line on which the predetermined total is to be printed.

In addition to the number of perforations and brush controls for controlling stoppage of the form, there is another provision made for overflow control whereby approach of the end of the form coincides with detection of a perforation on the control tape and initiation of form ejection feed. The improved feeding device is also provided with line spacing controls having optional selection of single, double or triple spacing, or disabling of such usual controls and selection of variable line spacing control under control of perforations in the tape.

Another object of the invention is the provision of a driving mechanism involving the use of high speed and low speed clutches for selective connection to a record sheet platen roller connected to advance in synchronism with a feeding control tape. The clutches are controlled by a pair of magnets which are made effective by relays influenced by the record cards controlling the heading and detail impressions made on the record sheet.

Another object of the invention is the provision of record form feeding controls involving the joint control of classification data on record cards and a perforated record tape prepunched to provide predetermined record form arrangement. The record cards are arranged in a plurality of successive groups, certain groups representing different heading data and other groups representing different detail or item data. The groups are distinguished by classification designations and group number differences, a series of related heading and detail groups having the same group number but distinguished within the general group by classification designations. An error in card arrangement is indicated by a change in group number within a classified group. Means for detecting such errors are effective to cause advancement of the record sheet and the control tape to a predetermined stopping point.

Another object of the invention is the provision of tape feeding controls governed by digit perforations sensed in the record cards controlling printing. In a column of the record card, any one of a number of digit representing perforations may be placed to select one of a plurality of brushes cooperating with the feed control tape. This brush will become effective to carry a feed stopping impulse when the tape, operated in synchronism with the record sheet, presents a perforation situated with relation to the desired form location related to the digit perforation.

Another object of the invention is to provide feeding controls for preventing spoilage of forms even though groups of heading or detail cards are missing. The controls are arranged to automatically skip predetermined positions of the sheet which are supposed to receive printed data when the corresponding print control records are missing. The idea is to print as much of the form as the incomplete arrangement of cards permits and fill in the missing data later. These portion skipping controls are possible because the plurality of feed tape reading brushes are connected by circuits with contacts in cascade formation for making the brushes successively effective. For example, if four brushes are devoted to the control of heading groups and the second and third heading group cards are missing, control is automatically transferred through the cascade contacts from the first feed control brush to the fourth feed control brush.

Another object of the invention is to provide an improved method of making control mediums for preselecting the arrangement of data on a record form. The method involves the use of a sample form and a scale marked with index representations denoting the succession of printed portions and the line position of such portions. The readings of this scale are then transferred to the control tape which appears initially as a length of paper marked with transverse brush positions and longitudinal line positions. The tape is punched according to the readings of the scale, and it is then cut to the proper length and the two ends are joined with an adhesive to make an endless belt corresponding in length with one or more lengths of the equivalent record sheet. In other words, for short form records the tape may be made in multiples of the length to correspond with the sheet so that wear is distributed over two or more sections of the controlled tape for each series of forms printed.

An object of the invention is the provision of sheet feeding controls with a perforated control tape and a plurality of cooperating brushes, wherein each tape brush for stopping control is governed by a relay which is called into operation in any one of a number of ways; from a special perforation in a record card, as an incident to taking a total (before or after total printing); as an incident to a card classification change, as an incident to digit perforation detection, and as an incident to an error in card classification. The total control dominates and takes precedence over the classification and digit perforation controls.

An object of the invention is the provision of feeding controls for spacing printed matter on forms when such matter is inverted, i. e., with the detail or item matter such as amounts and totals appearing at the top of the form over the other name, address and identification matter usually found as headings.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 shows a sequence of control cards for determining the heading and detail data printed on two successive forms, such as those shown in Fig. 5.

Fig. 3 shows a portion of the perforated control tape.

Fig. 4 is an illustration of the measuring rule used to determine the arrangement of heading areas, body lines and total locations on the record forms.

Fig. 5 shows a portion of the continuous record sheet or strip with two successive forms having prearranged heading and detail data.

Fig. 5A is a sectional elevation view showing the feed and sensing devices for the record cards.

Fig. 6 shows a portion of the control record card perforated to represent the various digit and alphabet representations.

Fig. 7 is a sectional elevation view showing the numeral and alphabet printing mechanism.

Fig. 11 is a plan view showing the entire tape control mechanism and the driving extension on the platen shaft.

Fig. 12 is a detail sectional elevation view showing the clutch selection controls.

Fig. 13 is a side elevation view of the manipulative control for disconnecting the platen from the tape feed control mechanism.

Fig. 14 is a perspective view showing the mechanism for selecting one or the other of the two sheet advancing clutches.

Fig. 15 is a detail view showing the contact operating levers cooperating with a pair of circuit breakers.

Fig. 16 is a side elevation view of the perforated tape controls with the cooperating brush holder partly in section.

Fig. 17 is a sectional view showing the driving connections between the platen, the driving clutches and the pin wheel for advancing the control tape.

Figs. 20a, 20b, 20c, 20d, 20e, and 20f, when taken together, illustrate the wiring diagram of the machine.

Figure 1:
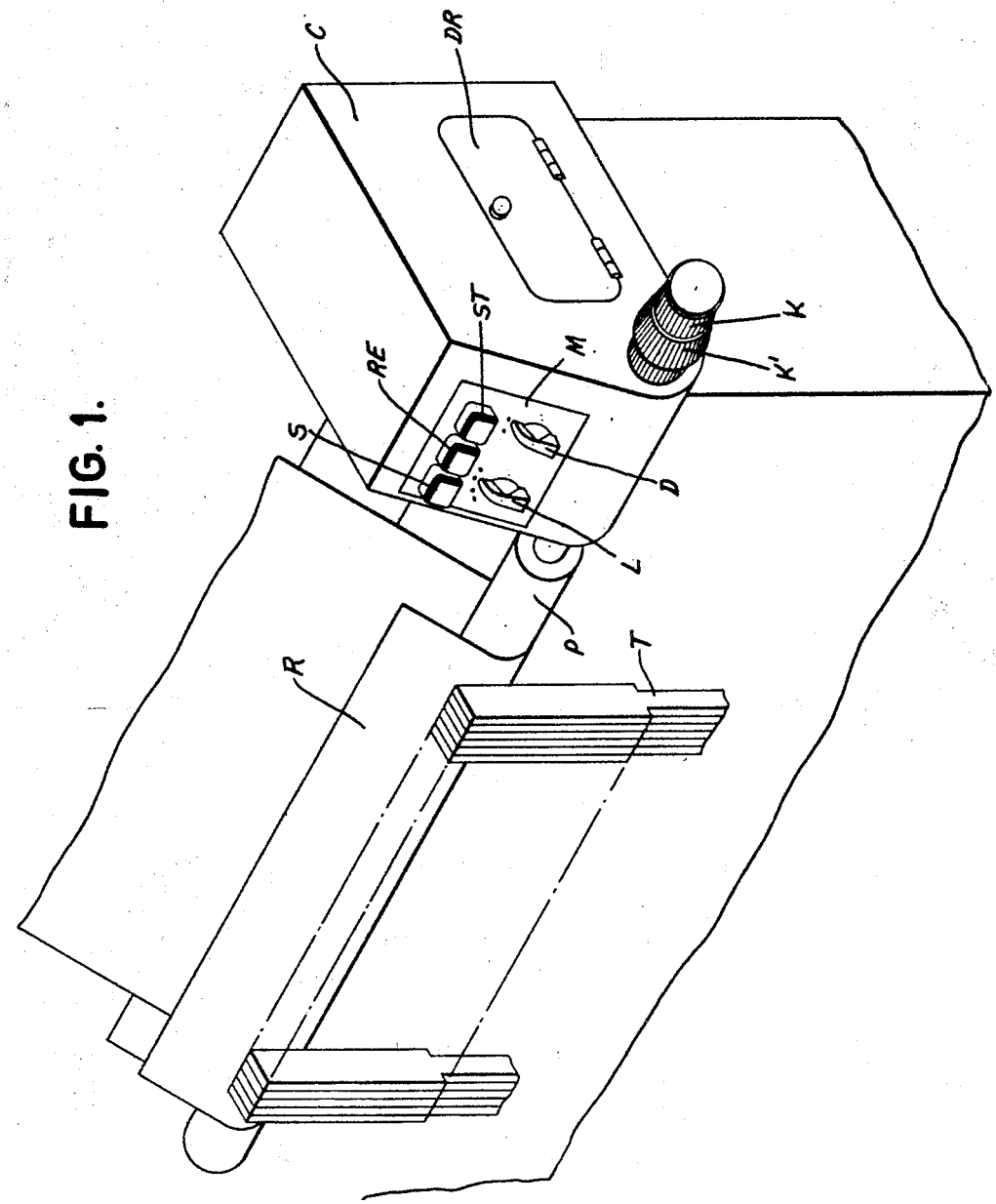
Fig. 1 is a perspective view showing the record feeding control mechanism attached to the right end of the platen.

Referring to Fig. 1, a tape control mechanism is shown in a general way as it appears attached near the right end of the platen P. Wrapped around the platen is a record sheet R before which the type bars T are raised into the printing positions. At the right end of the platen P, the shaft extends under the tape control casing C and ends with a pair of knobs K and K', the former having direct connections to the platen and the latter having gear connections arranged so that a vernier adjustment may be made to regulate the location of the printing line. Extending from the top of the casing C is a panel M holding the five manipulative controls for regulating the record sheet advancement. A knob L controls the line space movements for different extents of feed and for selective line spacing under control of the tape mechanism. A second knob D is provided for disabling the connections between the perforated tape unit and the platen.

The three keys extending across the top of the panel M are provided to control the operation of the tape feeding unit. The S key at the left is used to space the tape to bring it into a controlling position under manipulative control. The central key RE is a restoring control for governing the movement of the perforated tape to bring it around into initial position. This corresponds with a prearranged normal position of the record form R, so that both the record and the tape are ready to be moved in synchronism. A key ST at the right is used for stopping the operation of the tape control mechanism whenever desired.

The mechanism case C is provided with a door DR which is used to conceal the part of the mechanism receiving the perforated tape. A contact is provided in cooperation with this door DR, so that the driving motor is deenergized whenever the door is opened.

The feeding controls are illustrated in coordination with a record controlled alphabet printing tabulator. The printing machine is of the kind shown in Patents Nos. 2,079,418 and 2,111,122, wherein mechanisms are shown for feeding record cards one by one and analyzing the cards electrically to control the setting of type bars and the accumulation of amounts and total printing of such amounts.

In the printing of bills on a continuous strip, the control is exercised by a sequence of record cards arranged to print alphabetic heading data such as names, addresses, dates, in combination with other detail cards perforated to represent items and amounts to be recorded, accumulated, totaled and charged to the various customers. Such a sequence of cards is shown in Fig. 2 and cards there represented are used to control the printing on two successive forms, such as those shown in Fig. 5. On the forms of the continuous record R shown in Fig. 5, it is seen that there are five groups of heading data recorded above a pair of detail or body lines and one predetermined total line.

Referring back to the cards in Fig. 2 and reading them from the bottom to the top, it is noted that they coincide with the recordings on the sheet in Fig. 5. There it is also noted that the heading cards are distinguished from the detail cards by X punchings identified by the reference character $hx$. As a further distinction between the different groups of the heading data, other differently located X perforations are punched in the leading card of each heading group. It is also noted that the first three groups identified by the X punchings $1x$, $2x$ and $3x$ are single card heading groups. The fourth group is led by a card having the distinguishing perforation $4x$, and the last heading group has an advance record with the punching $5x$. These group identifying perforations $1x$ to $5x$ are used to select the various tape cooperating brushes for determining the stopping position of the reocrd R (Fig. 5) for locating the first line of each heading group.

There is further record feeding control provided in the form of X detecting devices for sensing the change from cards having heading perforations $hx$ to those following detail cards lacking such identification. Upon such a change of X to no X cards, the record form is advanced to the position designated to receive the first item impression. Thereafter, when the detail records, such as C6 and C7, are controlling for recording, the record form is advanced in line spacing under control of the usual cam contacts.

There is a further distinction between the various cards in a sequence related to more than one account. Group number perforations are used to distinguish between the cards relating to different customers. Therefore, upon the passage of the last detail card C7 and advancement of the first heading card C1' of the incoming group, there is detected a change in the group numbers and the machine is controlled to take a total and record the total on the predetermined total line, Fig. 5, selected by perforation $8t$, Fig. 3. After the total is printed, skipping is again initiated and limited by perforations $9t$ and the cooperating brush which is selected to carry the record sheet over into position to record the first heading line on the second form. Either the group change control or the perforation $9x$ in the card C1' is used to select the tape brush which determines the sheet stopping position for receiving the first heading line on the second form.

In the preparation of the perforated feed control tape TP shown in Fig. 3, there is an intermediate step between the selection of a standard form, such as that shown in Fig. 5, and the preparation of the tape. This intermediate step involves the use of a scale SC shown in Fig. 4. This scale is proportioned to correspond with the line spacing dimensions of the record form, and the column of figures shown progressing down the right border of the scale are indicative of line spacing positions. The other column of figures extending across the top of the scale is representative of brush positions identifying the tape sensing brushes extending across the perforated tape shown in Fig. 3. When the scale is placed alongside a sample form, such as that shown in Fig. 5, the top horizontal line on the scale is aligned with the separation line of the form. When the scale and record are aligned, it is noted that the heading groups start with the sixth, tenth, twelfth, fifteenth and twentieth lines. The marks $1s$ to $5s$, Fig. 4, are made at the intersections between the vertical brush lines and the horizontal space designating lines. These marks are progressively advanced from one to the other from left to right, because the corresponding heading control brushes take precedence in the order from left to right, so that should two brushes be selected, the one at the left is the one which is first effective. There is between the brushes a further electrical tie-up which is explained with reference to the wiring diagram. When heading cards are missing, it is possible for corresponding heading spaces to be skipped and the sheet to be advanced beyond the space allotted to those missing heading impressions.

Near the center of the scale, it is noted that other marks $6s$, $8s$ and $7s$ are made to locate the first detail line, the predetermined total line and the overflow point. The marks are duplicated at the lower end of the scale because the form shown is short enough so that the control tape may be made in a double length to reduce the wear on the tape and provide a more convenient size of tape.

On the scale it is the usual thing to allocate the first six brush positions at the left to control for heading spacing. Then three brush positions (7, 8 and 9) are allotted for detail body line spacing, sub or progressive total lines and ordinary total lines. The last three brush positions are allotted to the inverted form ending control, overflow control and selected line spacing control, respectively.

After the scale SC has been prepared in accordance with the desired arrangement of the form, it is used as a guide in the preparation of the perforated tape TP shown in Fig. 3. There it is seen that, reading upward from the lower adhesive bearing end A, the tape is punched with rectangular openings 1t to 9t corresponding with the record card X punching controls 1x to 9x. In other words, the perforation 1x in the first heading card group is used to select the tape sensing brush which wipes over the extreme left position in which it engages the tape perforation 1t, to thereby stop the advance of the tape and furthermore stop the advance of the record sheet R (Fig. 5) which is synchronized with the movement of the tape. In a similar fashion, all the other heading group X perforations call into operation different brushes for detecting the placement of tape perforations to regulate the extent of feed of the record form. The scale is used as a reference means for the punch operator to show him the proper positions in which to locate the control perforations as designated by the line spacing positions identified by the numerals on the left border of the tape.

The central line of circular perforations 30 is used merely to cooperate with a pin feed device, regulating the even advance of the punch tape. In reading the scale and controlling location of punch openings, it is seen in Fig. 3 that the punchings 6t, 7t and 8t do not coincide with any heading group X controls. That is because these last three controls are independent of heading variations and are provided for locating a first detail or item line, a predetermined total line and overflow line for skipping to the next form. After the tape TP is perforated to take care of all the positions for two successive forms, it is cut off and the adhesive end doubled back on the other end and attached thereto to make a continuous ribbon ready for placement in the feed control unit. Such continuous tapes are prepared for various kinds of forms and stored ready for use when a change in form is desired.

Before describing the mechanism used in the feed control unit, it is believed well to consider first the ordinary card feeding, alphabet printing mechanism and the accumulating devices found in the tabulating machine. A brief account of the mode of operation of these card sensing, printing and adding controls will furnish adequate background for the explanation of the impressions made on the record sheet, the advancement of which is the main concern of the present invention.

The control cards such as the heading cards C1—C5", Fig. 2, and the sample code card CA, Fig. 6, are punched with differentially located alphabet, date and amount representing perforations. An assembly of such cards CS, Fig. 5A, are placed in a magazine MA and advanced downward in succession by a reciprocating picker PC. Each card passes first under a set or line of upper sensing brushes UB and then, one cycle later, it passes under the line of lower sensing brushes LB. A set of feeding rollers advance the cards at a regular rate in synchronism with the movement of other tabulator parts such as the accumulator wheels and the type-bars. At the bottom of the feed unit the cards are engaged by a stacker SK and deposited in a card holder. Certain of the lower brushes LB cooperate with amount representing portions of the cards and there sense the amount perforations to create impulses which are carried into the accumulator magnets.

Figure 8:
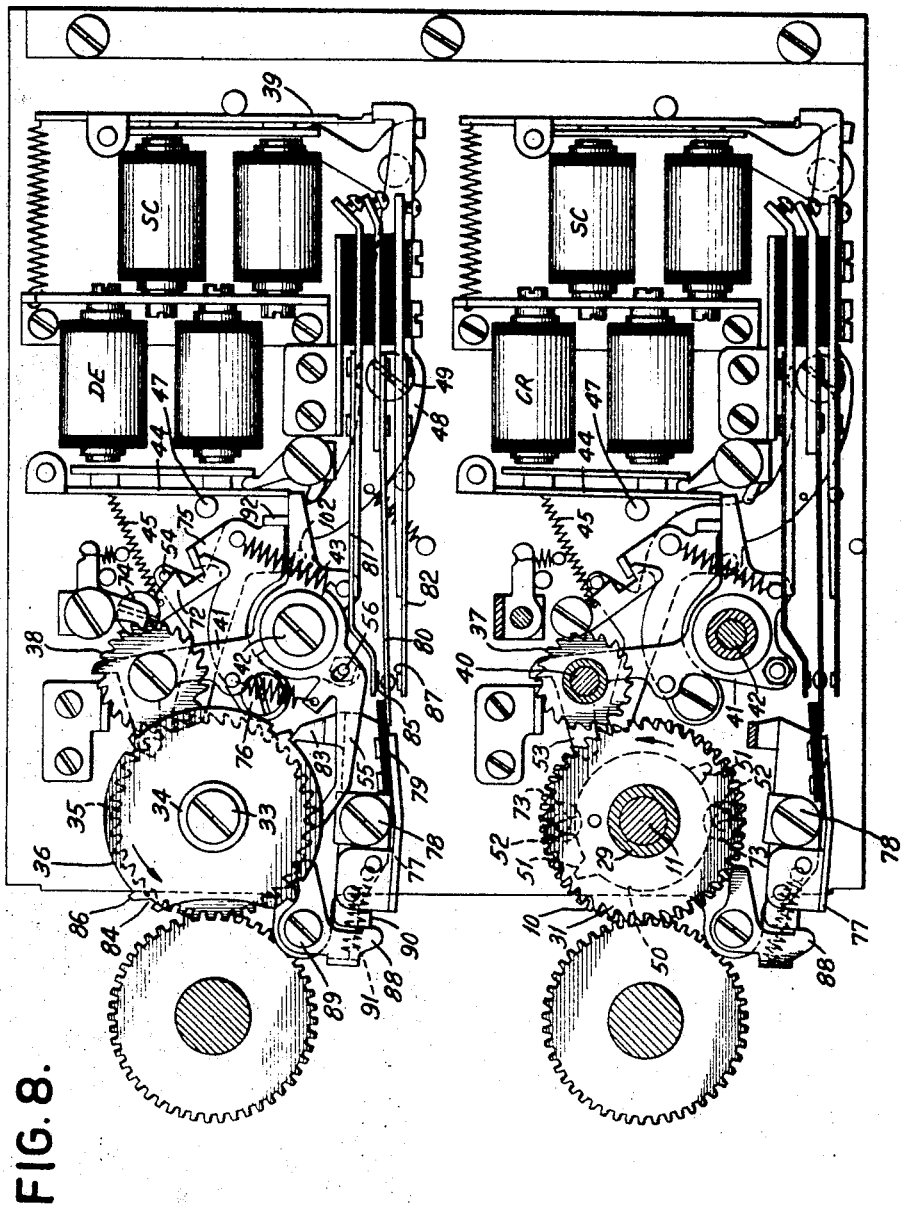
Fig. 8 is an elevation view showing one of the accumulator orders.

The pair of accumulator orders shown in Fig. 8 are representative of the adding mechanism for providing totals of the amount representations sensed on the record cards. The gear 10 in each accumulator order is mounted on a bushing 29 and keyed to another gear 31 by means of a dowel pin fastened to the bushing. The unit comprising the gears and the bushing is free to rotate constantly on the stud 11 and is so driven by connections to a motor as explained in Patent No. 2,079,418. The stud is extended by attaching a shouldered sleeve thereon by a screw 33. Between the head of the screw and the shoulder on the sleeve is located a hub 34 carrying an accumulator gear wheel 35 and a transfer cam disk 36. Thus, the two separate gear units can rotate independently on the stud 11. The unit including gear 31 is rotated one-half revolution for each cycle of operation of the machine. The accumulator gear 35 is provided with forty teeth; therefore, one-quarter revolution of this gear represents a complete adding operation of ten steps.

The two gears 31 and 35 on the same stud are adapted to be clutched together so that the accumulator gear 35 may be driven a differential distance by the drive gear 31. The clutching device includes two pinions 37 and 38 which are held together by a bushing on a stud 40 mounted on a clutching lever 41 pivoted at 42. The pinion 37 is adapted to engage with the gear 31 but the teeth thereon are normally out of engagement. The other pinion 38 maintains engagement with the teeth on accumulator gear 35. A spring 43 attached to lever 41, urges the lever counterclockwise to clutch pinion 37 with gear 31 for driving, but the lever is prevented from moving by the contact of the end of a horizontal arm thereon with the end of an armature 44 associated with the accumulator magnet CR or DE, the armature being held in such a position against a stop stud 47 by a spring 45. When the magnet is energized, attracting the armature, lever 41 is released and then the spring 43 rocks the pinion 37 into mesh with the gear 31.

The two accumulators are selectively clutched with the driving means according to whether an item is a credit or a debit entry. The lower accumulator is adapted to receive the true amounts of credit items and the complements of debit items, while the upper accumulator receives the true amounts representing debit items, and the complements of credit items. The energization of a credit magnet CR during credit item entering or the energization of a debit magnet DE during debit item entering, is effected by the sensing of an amount perforation in one of the data columns of the record card. The pinion 37 is then thrown into mesh with the gear 31 while the latter is rotating. Through the connections between pinions 37 and 38 and gear 35, the accumulator gear is caused to rotate until the zero position on the card is reached, at which time the pinion 37 is thrown out of mesh by a cam 50 which cooperates with the clutching lever 41. This cam is fixed with respect to gears 10 and 31 and is constantly rotating with them. Two cam projections 51 and two projections 52 are provided on the cam 50 because the cam is timed to turn a half-revolution for each accumulating cycle. After the pinion 37 is thrown into mesh with gear 31 and commences to rotate gear 35, as soon as the "0" cam projection 51 reaches an arm 53 extending from lever 41, the cam rocks the lever clockwise about the pivot 42 to move the pinion 37 out of mesh with gear 31 so that the accumulating gear 35 is declutched from the driving means and ceases to rotate. The lever 41 is latched in the declutched position by the armature 44.

An impositive latch or pawl 55 is pivoted at 42 and connected to lever 41 by a pin and slot connection 56. When the lever holds the clutching pinions out of engagement, pawl 55 engages the teeth on gear 35. The pawl also prevents overthrow of the gear as it is declutched.

For effecting carrying or transferring from one order to the next order in an accumulator, a frame 77 pivoted at 78 is adapted to cooperate with the cam faces on the transfer cam disk 36 which is attached to the accumulator gear wheel 35 as described hereinbefore. An insulation block 79 secured to frame 77 cooperates with the center blade 80 of a set of contact blades 80, 81 and 82. A finger 83 extending from the frame 77 cooperates with the periphery of the transfer disk 36.

When the accumulator wheel is located in the nine position, a notch 84 in the disk is in line with finger 83 and allows frame 77 to rock in a counterclockwise direction, permitting the center spring contact blade 80 to rise, closing the contacts 85 between the two upper blades.

If the accumulator wheel passes from the 9 to the 0 position during an adding operation, a projection 86 on disk 36 strikes the finger 83 and rocks the frame 77 in a clockwise direction. The block 79 then depresses the center blade 80 below the normal position and closes contacts 87 between the two lower blades. A latch 88 pivoted at 89 cooperates with a shoulder 90 to hold the frame in shifted position after the wheel passes the camming position. A spring 91 holds the latch in position until the end of the adding cycle when one of the rollers 73 strikes the latch and releases frame 77 for movement counter-clockwise into normal position as urged by blade 80.

After accumulating, the wheels are restored to the normal 0 position, finger 83 rests on the concentric edge of the disk and frame 77 holds the center blade 80 with both contacts 85 and 87 opened.

Each lower contact 87 is wired in series with the next higher order accumulator magnet CR or DE for carrying purposes. The upper contacts 85 are also wired to connect to higher order magnets so that, if a transfer impulse is directed to a magnet associated with closed "9" contacts 85, the impulse is carried through them to the next higher order magnet. The transfer impulses through the contacts 85 and 87 are timed to occur after the cam projection 51 passes the extension 53 so that, if a transfer is desired, the magnet CR or DE is energized, releasing clutch lever 41 and clutching the accumulator gear for one step of movement, after which the clutch lever is again thrown out by engagement of cam projection 52 with extension 53.

A magnet SC is provided for each accumulator order and is associated with devices for operating the clutching lever 41 to declutch gear 35. A long lever 48 is pivoted at 49 on the accumulator plate and has its right end cooperating with the bottom of an armature 39 associated with magnet SC. The armature is pivoted and held normally against a stop stud by a spring. When the magnet is energized, releasing the end of the lever 48, a spring urges the lever in a counterclockwise direction against a stop, and a pin 54 on the lever is pushed against a latch 72 pivoted at 74. The latch 72 normally engages a shoulder on an arm 75 pivoted at 76.

Another shoulder 92 on the arm 75 is urged toward the horizontal arm on lever 41 by means of the spring 43 attached to a stud on the arm. The sudden release of the arm 75 after the pin 54 pushes the latch 72 away from the shoulder causes the two parts 75 and 41 to rock clockwise under the urging of the spring 43 connecting the two, thereby swinging the lever 41 in a clockwise direction to declutch the gears. This action is accomplished because spring 43 tends to fold together and shorten. It can shorten only when member 75 and frame 41 are rocked in a clockwise direction. Therefore, when the latch 72 releases the spring it moves the frame to declutch the gears. The parts 72 and 75 delay declutching a moment after magnet SC is energized. The lever 41 is latched in normal position by the armature 44.

At the end of each machine cycle, the lever 48 is restored by one of the pair of rollers 73. The roller strikes the lower side of the left end of the lever, rocking it clockwise and latching the right end under armature 39. While restoring, a pin 102 on lever 48 strikes the lower edge of arm 75 and restores the arm, placing the shoulder above the latching face on latch 72 and tensioning spring 43 to urge lever 41 in the proper direction for clutching the gears. The parts 72 and 75 provide means for controlling the declutching time, so that a uniform disengagement of the gears is secured during the operation of the machine at listing or tabulating speed.

From the foregoing section of the description, it is clear that the accumulator wheels are clutched to the driving gears by means under control of the accumulator magnets CR or DE, and they are declutched by the magnets SC at differential times during a cycle or by cam 51 at the end of a cycle. During ordinary adding operations, the magnets SC are not used, the accumulator wheels being clutched at the differential times by the magnets CR or DE and declutched at the zero position by cams 51.

When the machine is set for subtraction control and a debit item is entered, the magnets CR are energized early in the cycle to clutch the credit accumulator wheels to begin adding the complement of the debit amount. Then, when a certain amount perforation in the card is sensed, the related credit accumulator magnet SC is energized to declutch the credit wheel at the differential point, and at the same time the related debit accumulator magnet DE is energized to clutch the associated debit wheel to start the adding of the true debit amount.

In a total taking cycle, the magnets CR or DE of the selected accumulator are energized early in the operation to clutch the accumulator wheels and start them revolving toward the 0 position. The accumulator wheels 35 are clutched and continue to revolve until they arrive at the 0 position. Then the transfer contacts 87 are closed and direct impulses through magnets SC for declutching, and printing magnets for total printing. Thus, the total is printed whether the accumulator wheels are declutched at 0 for a clearing total or continue to rotate for ten steps back to the numeral storing position for a progressive total.

The heading name and address cards C1—C5" (Fig. 2) bear alphabet indicia in the form of code perforations. These perforations are sensed by the lower brushes and directed into print control magnets to control the recording of names and addresses.

The code arrangement of the perforations in the record card will first be explained. Referring to Fig. 6, the diagrammatic record card CA has the usual perforations for indicating numerical values as shown at the left side of the card. The alphabetical characters from A to I are combinations of one of the numerical characters from 9 to 1, plus a perforation in the R index point position. The characters J to R each comprise a perforation in one of the numerical positions 9 to 1, plus a perforation in the X index point position. The remaining letters of the alphabet, namely, S to Z, each comprise a combination including one of the perforations 9 to 2, plus a perforation in the 0 index point position.

It may be mentioned that, as the address cards pass under the lower brushes and differentially timed impulses are initiated, these impulses are carried to control magnets and used to position alphabet print bars as about to be explained with reference to mechanism similar to that shown in Patent No. 2,111,122.

In Fig. 7 is shown an alphabet type bar T which is provided with a plurality of type elements upon which the digit and alphabet characters are arranged as indicated. For the purposes of explanation, the various characters are arranged and labeled in accordance with a particular zone. Thus, the digits are included in zone 1; the letters S to Z in zone 2; J to R in zone 3; and A to I in zone 4. Reference to Fig. 6 reveals that the letters I, R and Z each contains a perforation in the 9 index point position, but has a different zone perforation R, X and O. Similarly, the letters H, Q and Y each contain the perforation 8 and a different zone perforation.

The type bar T is arranged to be moved to pass the printing position opposite platen P in synchronism with the movement of the card by the lower brushes and as the 9 index point positions traverse the brushes, the Z type element will be approaching the printing position; as the 8 index point positions traverse the brushes, the Y type element will be approaching the printing position, and so on.

Each type bar T is provided with a series of teeth 117 which are labeled 9 to 0 and which represent corresponding index point positions on the record card. As the type bar is moved upwardly, the teeth 117 move to pass a stopping element 118. The element 118 is pivoted at 125 to a bell crank 126 which is normally held in the position shown by a bell crank latch 127 which has connection through a link 128 to the pivoted armature 129 of magnet PR.

Upon the energization of magnet PR in response to the sensing of a digit perforation, armature 129 will be rocked clockwise, drawing downwardly on link 128 to cause clockwise rocking of latch 127 to release bell crank 126 whose spring will thereupon shift the stopping element 118 toward the right into the path of the tooth 117 corresponding to the perforation whose sensing caused energization of the magnet. Further upward movement of the type bar is thus interrupted at this time. The stopping element 118 is held against upward movement by a bail 130 which later, as the zone holes are sensed, rocks counterclockwise to permit resumption of the upward movement of the type bar. During such movement, the element 118 may be stopped by a lever 131 which loosely straddles a rod and has its upper curved edge held down by a bar. The left end of the lever has an extension 132 resting upon a bail 133 which occupies a raised position during the analysis of the digit representing positions of the card. The member 131 is provided with three teeth which, under control of the bail 133, move downwardly to pass the toe of a stopping pawl 139 during the time that the zone perforations O, X and R pass the brush LB. The pawl 139 is normally held with its toe out of the path of the teeth by a bell crank latch 140 which has a link connection 146 with the lower armature 147 of magnet PR.

Extending across the latches 140 is a bail 148 which occupies a raised position during the sensing of the digit positions, preventing tripping of these latches during this portion of the sensing operation. While the zone perforations are passing the brushes, however, the bail 148 is rocked slightly counterclockwise so that energization of magnet PR, due to the sensing of a zone perforation, will rock its armature 147 clockwise to elevate link 146 and rock bell crank 140 counterclockwise to release pawl 139 which will engage the first tooth 0 if the zone hole is at the zero position; the second tooth X, if it is in the X index position; or the third tooth R if it is an R hole. If no zone hole is present, the lever 131 will rock an additional step to cause an upper shoulder to engage the pawl 139. From the foregoing it is apparent that the alphabet printing bars can be stopped as governed by the address code perforations on the name and address cards, so that various words are spelled and recorded at the printing line.

The foregoing portions of the description are concerned mainly with the controls of the regular tabulator. The following sections deal with the sheet feeding control unit.

*The sheet feeding control unit*

The platen P, Fig. 17, has the usual pressure rollers cooperating therewith to hold and advance the record sheet R as the platen is rotated.

As already noted, the feeding control unit is hung on the right side frame of the machine. In Fig. 17 it is seen that this main right side frame 12 carries a ball bearing 13 for supporting a shoulder of a clutch disk 14 fastened to the right end of the platen shaft. The disk is formed with a number of extensions 15 for providing clutch connections between the removable feeding unit and the stationary but rotatable platen mounting.

The feeding controls are supported in the main between a pair of frames 17 and 18, the former being fastened against the outside of the right machine frame 12, and the latter suspended further to the right to carry a platen shaft extension and a tape pin feed wheel. Between the two unit side frames are a number of cross bars tying them together and providing supports for various parts of the control mechanism.

Figure 9:
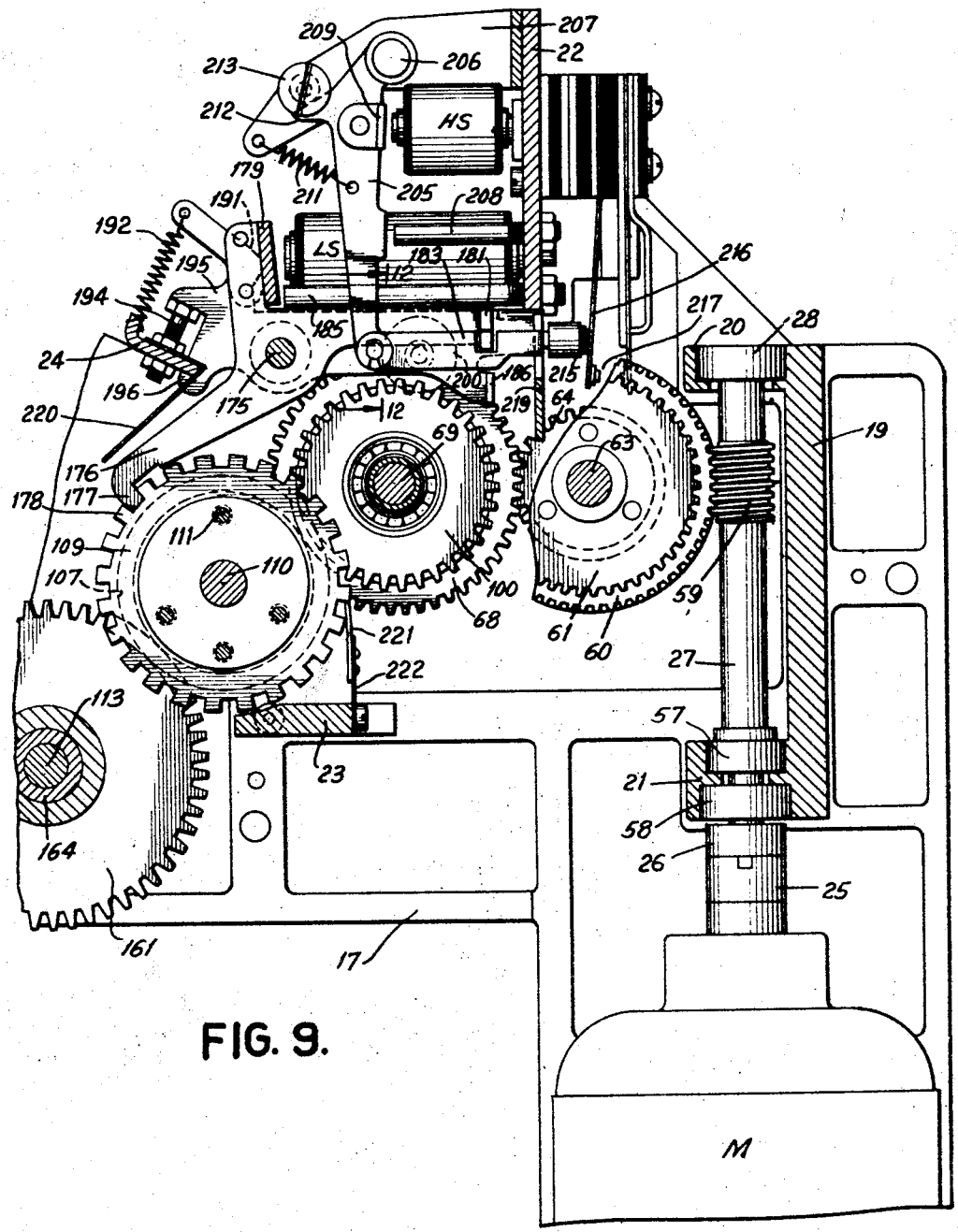
Fig. 9 is a sectional elevation view showing driving connections for the sheet feeding devices.

In Fig. 9 it is seen that a heavy vertical casting 19 is located near the rear of the unit and serves as a tie between the side frames. At the top of the mechanism another tie in the form of a plate 22 is secured between the two frames. Near the center of the mechanism, a cross bar 23 serves to tie the two frames 17 and 18 together. A front tie plate 24 also extends across the upper center of the feed unit.

Figure 10:
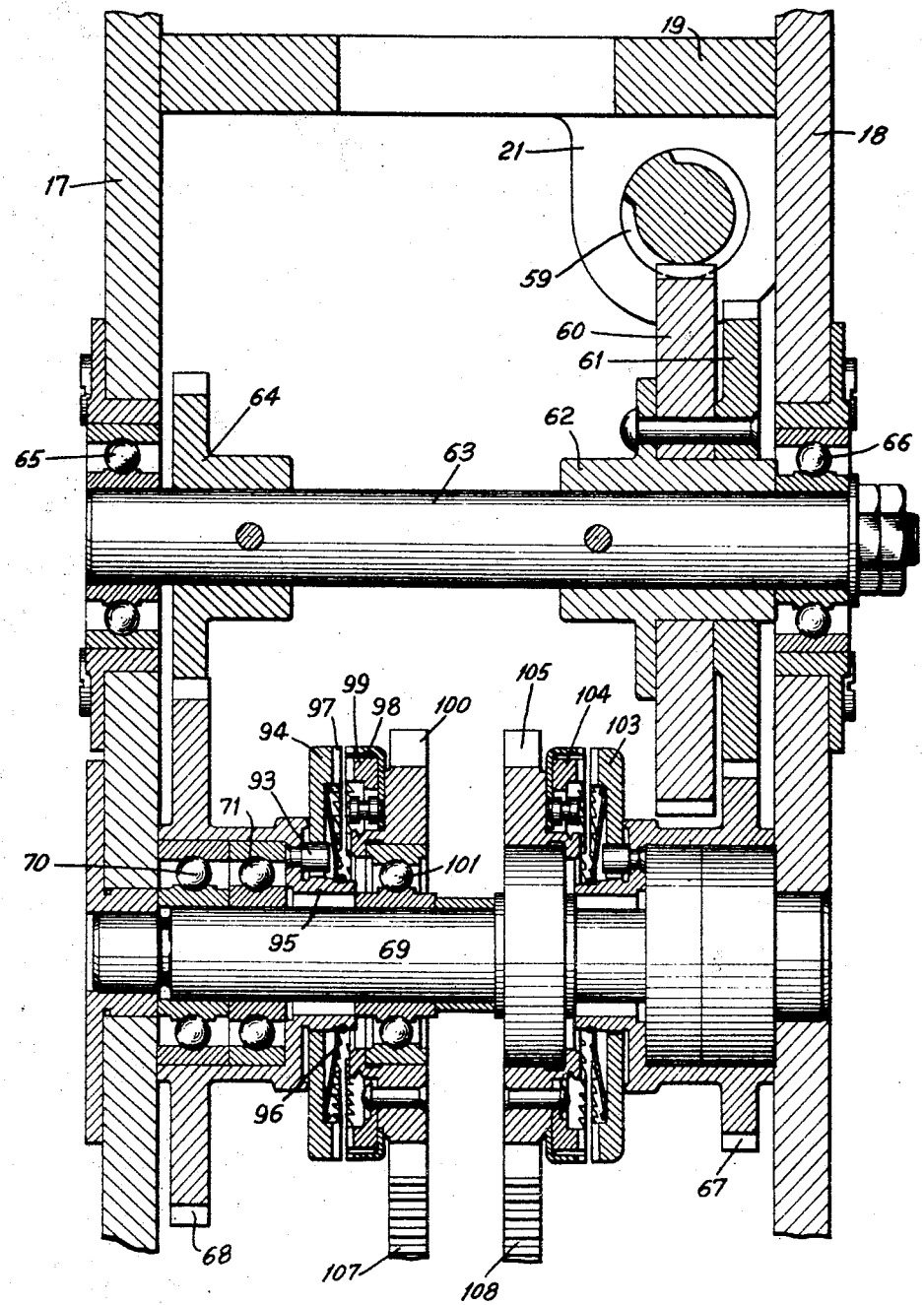
Fig. 10 is a sectional plan view showing the driving connections to a pair of clutches for governing the advancement of the record sheet at low and high speeds.

In Figs. 9 and 10 it is seen that the heavy bracing frame 19 is formed with a pair of ears 20 and 21 for guiding the main drive connections. A motor M (Fig. 9) is fastened to the outer frame 18 in a vertical position and the upper end of its shaft is attached to a flexible coupling 25. This coupling is engaged with a clutch disk 26 fastened to the lower end of a drive shaft 27. Cooperating with shaft 27 is a set of three bearings, one bearing 28 being located in the upper ear 20 and the two lower bearings 57 and 58 being mounted in the lower ear 21, the former being a thrust bearing to take up the pressure provided by the driving worm 59 fastened near the upper end of shaft 27. The motor M and the connected worm drive mechanism is operated continuously and the drive connections therefrom to the clutches are available for instantaneous operation, which is terminated only by operation of a stop key S, Fig. 1, or opening of the feed mechanism door DR to change the feed control tape.

Reference to Fig. 10 reveals that the vertical worm 59 is in mesh with a worm wheel 60 fastened along with a gear 61 to a hub 62 attached to a horizontal drive shaft 63. This shaft not only carries the high speed control gear 61 but also has attached thereto a smaller gear 64 for driving connection to a clutch for low speed operation. A pair of ball bearings 65 and 66 are mounted in frames 17 and 18 respectively for guiding the ends of a shaft 63.

Meshing with gears 61 and 64 are a pair of gears 67 and 68 freely mounted on a clutch shaft 69. The gear 68 is the larger of the two to cooperate with the small driving gear 64 for low speed operation. Each of the gears 67 and 68 are provided with a pair of ball bearings, such as 70 and 71, for providing a wide bearing area and a free turning control on the stationary shaft 69. Extending from the outer wall of the hub of gear 68 is a driving pin 93 protruding into a slot cut in the annular clutch disk 94 assembled loosely on a cylindrical shoulder 95 extending from the hub of gear 68. Although this clutch disk 94 is loosely arranged on the end of the gear, it is held against the gear by a spider spring 96 fastened to the shoulder 95 and having spring fingers pressing disk 94 against the side of the gear hub. Disk 94 is formed with an annular ring of driving teeth 97 normally separated from matching teeth on a clutch shroud 98 which is loosely assembled over a toothed clutch ring 99. The teeth of shroud 98 are slightly longer and higher than teeth 99 so that, if the movable clutch member is located with the teeth abutting, then the shroud tooth causes the moving tooth 977 to ride down into the next stationary tooth 99. Disk 94 is mounted opposite shroud 98 and a driving ring 99 fastened to a driven gear 100 also loosely mounted on shaft 69 and supported thereon by a bearing 101. Gear 100 is normally held from rotation by a locking disk to be described hereinafter, and the driving connection is established by tipping disk 94 with reference to gear 68. When the upper end of disk 94 is tilted or tipped as already mentioned, the spider spring yields in that particular direction and the teeth on the opposing clutch members mesh to provide a driving connection.

The other gear 67 is also provided with a clutch driving disk 103 and a driven disk 104 attached to a gear 105. Since the constructional details of both clutches are similar, it is unnecessary to mention the details of the clutch at the right.

Cooperating with gears 100 and 105 are a pair of intermediate gears 107 and 108 (Fig. 17) mounted with a locking disk 109 on a shaft 110 which passes through bearings in both side frames and extends beyond the outer side frame 18 and there it supports the tape driving drum.

The two clutches shown in Fig. 10 are used for different kinds of control in advancing the record sheet. The low speed clutch including driving disk 94 is used most of the time and is called into operation for line spacing and overflow skipping. The other clutch including disk 103 shown at the right and comprising high speed gearing is called into operation as an incident to the printing of totals and for other movement. A pair of magnets is used to operate camming mechanism for closing one or the other of the two clutches. But before describing the details of the means for operating the clutches, it is believed best to follow the driving connections from the clutches to the platen.

It is already mentioned that a locking disk 109 (Figs. 9 and 17) is mounted on shaft 110 and situated between the two intermediate drive gears 107 and 108. This locking disk is fastened to the gear 108 by means of a series of said screws such as the screw 111.

The platen shaft extension

The driving connections are not direct from the clutches to the platen shaft. Instead, a platen shaft extension is provided to carry adjustment and vernier regulating knobs as platen controls removable along with the entire feed control unit. Not only is the entire platen extension removable, but within the unit is a clutch connection making it possible to disconnect the tape feed control so that the sheet feeding operation may revert directly to the ordinary manual operation of the platen knobs.

Referring to Fig. 17, it is seen that the extension shaft 113 extends to the right of the platen clutch 14 and is supported by bearing arrangements in the two feed unit frames 17 and 18. The left end of extension shaft 113 is supported by the ball bearing 114 centered in an annular ring or collar 115 fastened in a circular opening near the bottom of the frame 17. The middle of shaft 113 is supported by another ball bearing 120 fixed in a hollow bearing cup 121 fastened to the outer side of frame 18. Fixed to the left end of shaft 113 is a coupling disk 122 shaped with an annular flange which embraces the periphery of the locking disk 14 fastened to the stationary platen shaft. Coupling 122 is shaped with notches to coincide with the extensions 15 formed on the clutch member 14, thereby providing a driving connection between the stationary part of platen and the removable unit with extension shaft 113.

At the right end of extension shaft 113 is fastened the platen adjustment knob 123 formed with a metallic center 124 carrying a set screw 135 for securing the knob to the shaft. This knurled knob 123 is used for line space adjustment of the platen and long feed movement in graduations greater than line space movements. Alongside knob 123 is another knurled knob 136 provided to regulate adjustments to a fine degree through a vernier mechanism which is used to select the exact location of printed matter with respect to definite recording spaces on the record forms. A motion of vernier knob 136 is not communicated directly to the extension shaft but passes through bevel gearing, making possible a relatively fine movement of the shaft for a comparatively large movement of the knob.

The inside of vernier knob 136 is threaded to provide means for connecting it to the threaded shoulder 137 formed on the cup-shaped driving member 138 loosely mounted on shaft 113. Member 138 is formed with a pair of flanges or annular rings between which is loosely pivoted a bevel pinion 142. Member 138 is formed on the threaded side with an annular groove in which there is pressed a coil spring 143 tending to hold the bevel pinion in operation. As a means for backing up the spring 143, a collar 144 is fastened to shaft 113 by a set screw.

Cooperating with bevel pinion 142 is a pair of bevel gears 150 and 151, the former being pinned directly to shaft 113 by pin 152 and the latter attached to the inside of the cup-shaped shroud 153. Also attached to the shroud 153 and located on the outer surface thereof is a driving pin holder 155 carrying a pin 156 through which the driving force from the clutches mentioned hereinbefore is communicated to the platen. Pin 156 projects into an opening formed in the wall of a sliding bushing 157 threaded on one end of a long sleeve 158 carrying a clutch disk 159 cooperating with another clutch disk 160 fastened to the side of a unitary arrangement of a pair of gears 161 and 162 meshing with the intermediate gears 107 and 108 already described. It will be remembered that gears 107 and 108 communicate the driving action from the low speed and high speed feed control clutches. The operation of driving from either feed clutch is communicated down to the gears 161 and 162 and from that point on it is optional whether the drive is to be communicated to the platen, depending on the axial position of the sleeve 158 to engage or disengage clutch 159, 160.

Returning again to the explanation of how the vernier knob operates through the bevel gear, it is noted that when the sliding connection comprising pin 156 is fixed because of connection to the feed control clutches, then the outer bevel gear 151 is fixed relative to the inner bevel gear 150 which is fastened to the platen extension. With the outer gear fixed and the pinion rotated in a planetary fashion about the shaft center, then the inner gear with a smaller number of teeth is advanced slightly relative to the fixed parts and a fine adjustment of the platen is made possible.

When the driving action comes through the clutch sleeve 158 from the feed control clutches, then the outer bevel gear 151 becomes the driver and the bevel pinion 142 merely serves as a connection to the inner bevel gear 150 which connects directly to the extension shaft 113 and the platen P.

Returning to consideration of the drive from the feed control clutches, it is noted that the gear unit comprising gears 161 and 162 is fixed to a bushing 164 loosely mounted on shaft 113. The bushing is confined between a pair of fixed collars 165 and 166, the former taking up the thrust produced when the clutch connection 159, 160 is established. The stationary part of the clutch connection is the ring 160 fastened to the side of gear 162 and provided with a series of teeth 167 extending toward the teeth 168 formed on the side of the clutch disk 159 fastened to a flange on sleeve 158 by a series of rivets 169. At the right end of sleeve 158, the driving bushing 157 is attached to the sleeve by being screwed on the threads of a reduced extension 170.

The position of the connecting sleeve 158 is regulated by a manipulative control ending in an arm 172 having an extension fitted in a circular groove 173 between a pair of flanges formed on sleeve 158. However, before considering all details of the manipulative control, it is believed best to consider first the means for controlling the low speed and high speed clutches and effecting the driving motions already described.

Referring to Figs. 9, 12 and 14, it is seen that a pair of magnets HS and LS control a set of camming mechanisms for operating one or the other of the two clutches. If magnet LS (Fig. 9) is operated alone, it is a sign that the low speed clutch is to be operated to drive the platen connections to advance the record sheet for line spacing or overflow movements. When the other smaller magnet HS is energized slightly before the magnet LS, it is an indication that the connections are to be varied so that a high speed clutch is closed to advance the platen and the record sheet as an incident to a total printing operation.

In Fig. 9 it is seen that the large magnet LS is mounted on the cross plate 22 and that the other magnet HS is also mounted thereon directly above it.

Extending across the unit between the said frames 17 and 18 is a shaft 175 which acts as a pivot for a locking lever 176 having a hooked end 177 for cooperating with the teeth 178 formed around the periphery of the locking disc 109. Lever 176 not only serves to perform the function of keeping the drive gearing locked in a normal condition, but it is also formed with two other extending arms, one of which carries the armature 179 located opposite the pole pieces of the low speed control magnet LS. The third arm 180 (Fig. 14) extends toward the rear of the machine and carries a cross bar 181 which is used to operate the camming mechanism for throwing one or the other of the two clutches into an operated condition. Cross bar 181 does not act directly on the clutch shifting parts but instead it works through a pair of interposer slides 182 and 183. In Fig. 14 it is seen that the left slide 182 is so shaped that the top surface thereon abuts against the under side of one end of bar 181 while, on the other hand, the notch 184 in the other slide 183 is normally presented under the opposite end of bar 181. Underlying the slides 182 and 183 are offset lugs 186 and 187, the former being part of an operating lever 188 for the low speed clutch and the latter being formed on a lever 189 which is provided to cam the clutch for the high speed train of connections. Both levers 188 and 189 are loosely pivoted on shaft 175 and extend forwardly and have raised elbows 190, 191 for abutting against the front face of the armature piece 179. A pair of springs 192 (Fig. 9) are connected between the extending ends of the levers and the cross bar 24. They tend to rock the levers 188 and 189 in a counterclockwise direction which is the opposite of the direction for producing a clutch closing motion. Extending upwardly from plate 24 is a pair of bolts 194, the heads of which serve as adjustable stops for extensions 195 formed on the front of the operating levers. In order to guide the front ends of the operating levers, the cross bar 24 is formed with notches for confining dependent extensions 196 formed on the lower part of the front ends.

In Figs. 12 and 14, it is seen that the operating levers 188 and 189 are provided with outwardly extending studs 198 and 199 for carrying camming disks 200 and 201. The cam disks are loosely mounted on the studs for rotatable movement, but they are closely confined to prevent end play. Disk 200 (Fig. 12) is situated so that the slanted cam surface thereon cooperates with the outer rounded periphery of the movable clutch disk 94 forming part of the low speed drive. The other cam disk 201 mounted on lever 189 is somewhat similarly located with respect to the other clutch connecting disk 103 which is part of the high speed drive. It is noted that the slanted cam surfaces of the two clutch disks face in opposite directions because the closing motion for the low speed clutch is toward the right while the closing motion needed for operating the high speed clutch is toward the left.

Before pointing out how the parts are operated to engage one or the other clutches, it is believed well to explain how the interposer slides 182 and 183 (Fig. 14) are shifted to set the mechanism in two different ways. In Fig. 14 it is seen that both arm 203, which is pivotally connected to a slide 182, and arm 204, which is pivotally connected to slide 183, are slanted upward toward a common point and joined with an armature lever 205 pivoted at 206 (Fig. 9). This pivot is provided on a bracket 207 attached to the vertical plate 22 already mentioned as one of the connecting parts between the frames.

Extending from plate 22 is an adjustable pin 208 which serves as a stop for the armature lever 205. Attached to lever 205 is a cross piece 209 serving as an armature in cooperation with the pole pieces of the interposer magnet HS which is operated for high speed purposes. A spring 211 tends to draw the lever 205 in a clockwise direction so that an extension 212 thereon abuts against a stop stud 213. When lever 205 is in the normal position, the slides 182 and 183 are located as shown in Fig. 14 with the first mentioned slide in position to be operated and the second slide presenting the notch 184 which makes it free from operating control.

Extending from the left slide 182 is an insulated button 215 (Fig. 9) abutting against a flexible contact blade 216 forming one side of a pair of contacts 217. These contact blades are mounted between insulation blocks secured to the rear surface of cross plate 22. Attached to the bottom edge of the plate 22 is a notched comb 219 which acts as a guiding means and prevents side play of the interposer slides and the operating levers 188 and 189 which are formed with rearwardly extending portions.

Assuming that the parts are in the normal position and that the low speed magnet LS is the only one energized, then the armature 179 (Fig. 9) is attracted and the operating lever 176 is rocked in a clockwise direction until stopped by pin 185. This motion serves first to disengage the locking tooth 177 to permit free rotation of the gearing drive. At the same time the cross bar 181 (Fig. 14) is lowered and carries down before it the cooperating interposer slide 182 and this in turn depresses the lug 186 on the left hand operating lever 188. Since this lever carries the camming disk 200, it operates to shift the clutch disk 94 (Fig. 12) toward the right and engage the low speed clutch with the constantly operating part of the gearing. In this way operation of the magnet LS alone causes advance of the record sheet as driven by the low speed gearing.

When lever 176 (Fig. 9) is rocked clockwise by energization of the magnet, it comes into contact with a leaf spring 220 fastened on bar 24. This spring tends to restore the lever to the normally disengaged position which is assumed when the magnet becomes deenergized. The hooked end 177 of lever 176 is tapered to find its way between teeth 178 so that the stopping wheel 109 can be brought to a definite locked position. Cooperating with the opposite side of the locking disk is a reverse lock overthrow preventer in the form of a blade 221 mounted on a spring 222 fastened to the rear of the cross bar 23. Upon the passage of each tooth 178 in a counterclockwise direction, blade 221 snaps in behind the tooth and prevents retrograde movement.

Assuming that the gearing is to be connected for a high speed operation, then the interposer magnet HS (Fig. 9) is energized first and serves to rock lever 205 in a counterclockwise direction and shift the two slides 182, 183 (Fig. 14) so that the former presents a relieved portion under the left end of cross bar 181 and the latter is shifted rearwardly so that the notch 184 is carried away from the underside of the right end of cross bar 181. With slide 183 in an abutting position between cross bar 181 and the lug 187 on lever 189, then upon energization of the other magnet LS and consequent clockwise operation of lever 176, downward movement of the connected bar 181 is communicated through slide 183 to lug 187 and serves to rock lever 189 in a clockwise direction. Since this operating lever 189 is the one carrying camming disk 201 associated with the high speed disk 103 (Fig. 12), the high speed clutch is closed and the driving connections are established from the motor through the high speed drive to the platen.

As an incident to the shifting of the interposer slide 182 (Fig. 9), contacts 217 are closed to provide circuit connections to call in magnet LS directly after energization of magnet HS as described in detail hereinafter. Provisions are made to advance the control tape TP (Fig. 3) in synchronism with the movement of the record sheet by means of gearing connections from the two clutches described hereinbefore. The point at which the two drives are connected is shown in Fig. 17, where it is seen that the intermediate gear shaft 110 extends to the right of the outer frame 18 and carries a tape feeding pin wheel. This wheel cooperates with the central line of feed perforations 30 shown in the tape TP (Fig. 3). When the tape is formed in a continuous band, it is placed on the pin feed wheel and aligned with the top of the record sheet and thereafter provides a control medium through the rectangular perforations which are positioned with respect to places on the record sheet where recording is to be started.

Most of the perforations on the tape are concerned with stopping control for limiting the advance of the record sheet after feeding has been started by X hole control, digit sensing, group change, total recording, etc. However, there is one control provided by the tape for initiating feeding rather than terminating feeding, and that is the overflow control for limiting the extent of printing near the bottom of the form, so that skipping takes place to carry the record sheet over into a position for continuing recording at the first item line on the second form.

Considering now the actual mechanical arrangement of the pin feed wheel, it is noted in Fig. 17 that a gear 224 is secured to shaft 110 by a set screw 225 which fastens it alongside the frame 18. Alongside gear 224 is fitted a sleeve 226 carrying an insulation hub 227 formed with a pair of flanges 228, 229. Assembled on the insulation member 227 is a metallic drum 231 provided with a line of radial perforations through which project the feeding pins 232. Pins 232 are formed with an enlarged base and, after a series of them are assembled in the drum 231, an annular ring or washer 233 is inserted under the bases of the series of pins and held there by a flanged ring 234 assembled against a central wall 235 formed on the inside of drum 231.

All of the feed wheel parts are assembled by means of a series of stay rods or bolts 237 which project through insulation bushings 238 in gear 224 and are threaded in a retaining washer 239 placed alongside gear 224. When the bolts 237 are tightened, they not only draw together the ring 234, drum 231, insulation member 227, gear 224 and retainer 239, but they also hold the ring 233 under the pins 232 so that the pins are held in the extending position.

Assembled between the two flanges 228 and 229 is a molded insulation commutator ring 241 containing a series of metallic contact spots 242 for controlling multiple line spacing. Some of these spots 242 are spaced at intervals coextensive with the double spacing of the record form while other spots are spaced at intervals coinciding with the movement of the record through a space equivalent to three line spaces. The periphery of the metallic drum 231 is used as an electrical conductor for impulses through the brushes which cooperate with the tape and sense the perforations therein to determine the location and timing of the feed control impulses.

In the side elevation view, Fig. 16, it is seen that while the left loop end of tape TP is drawn around pin feed drum 231, the right end of the tape is guided by a curved guide 244. There are two other such guides 245 and 246 fastened in a sliding box 247 fastened to spacers extending from the frame 18. According to the length of the tape TP, one or the other of the three curved guides is selected to support the right end of the tape. Box 247 is formed with a long slot 248 which makes it possible to vary the horizontal position of the box and the guides contained therein with respect to a securing bolt 249 best shown in the sectional view, Fig. 11. There it is seen that the frame 18 is formed with an extending boss 250 through which the bolt 249 projects. The bolt has an enlarged head 251 which cooperates with the inside wall of box 247 alongside the slot 248 through which the bolt projects. The washer 252 is also provided to enlarge the frictional area used to hold the box in an adjusted position. On the inner end of bolt 249 is assembled a washer 253 and locking bolts 254 for backing up a coil spring 255 assembled around the bolt and seated in a depression formed within boss 250. In Fig. 11 it is noted that all three guides 244, 245 and 246 are formed with a raised portion 256 for bridging over the bolt head 251, so that the box 247 is free to be moved with respect to the bolt from one end to the other.

The proceedure of assembling the tape involves placement of the left end around the pin wheel and location of the feeding perforations over the pins and then drawing the opposite end of the tape around one of the curved guides before drawing the box 247 toward the right (Fig. 16) sufficiently to draw the tape taut without stretching it. As a further means for guiding the movement of box 247 and holding it in the adjusted position, frame 18 is provided with an extension 257 cooperating with the top surface of the box and a longer extension 258 underlying the bottom of the box.

The tape sensing brushes

It was noted in describing the tape TP (Fig. 3) that provisions are made across the tape for twelve possible rectangular control perforation positions. These positions are evenly divided with six punch locations on each side of the circular pin feed openings 30. Figs. 11 and 16, it is seen that a square insulation bar 260 carries a series of fifteen brushes B1—B15. The plan view, Fig. 11, shows that the first six brushes B1 to B6 are located on the right and then there is a second group of six brushes B7 to B12 in the center and a third group of three brushes B13 to B15 at the left. The two groups of six brushes each are separated by the space required for the pin feed control. Two of the three brushes at the left cooperate with the commutator 241 (Fig. 17) for controlling line spacing operation. Brush B13 is a common contact brush cooperating with the metallic drum 231 outside the area of the tape, so that it is in continuous contact with the drum.

As a means for confining the ends of the brushes B1—B15, a slotted insulation bar 261 is extended across the tape and has a fork-shaped front end with insulation projections interspersed between the brushes.

Both insulation cross bars 260 and 261 are mounted in a rockable frame, so that the brushes may be lifted away from the tape when the tape is to be changed. The brush frame comprises a U-shaped member with a cross bar 262 and a pair of side pieces 263 and 264 between which the insulation bars are fixed. The entire brush unit is pivoted on a stud 266 extending from the frame 18 and carrying a fixed collar 267 for locating the frame and another collar 268 for confining a spring 269 which cooperates with the frame (Fig. 16) and tends to rock it in a clockwise direction.

As a means for locking the brush frame in the sensing position, the frame is provided with a latch 271 rotatably mounted on a rod 272 extending through the brush frame near the front of the unit. The hooked lower end of latch 271 cooperates with a square stud 273 extending from the main frame 18. Formed on the upper end of latch 271 is a horizontal finger piece 274 extending forwardly under a somewhat similar horizontal finger piece 275 formed as an extension of the right side wall 264 of the brush frame. A spring 276 is attached to latch 271 and tends to rock it in a counterclockwise direction to hold the frame latched and space the finger pieces 274 and 275 apart. When it is desired to free the frame to be rocked clockwise under action of spring 269, the finger pieces 274 and 275 are pinched together and the latch is separated from stud 273 and the entire frame pivots about stud 266 in a clockwise direction. The motion of the frame is limited by the cooperation of an extension 277 with a stud 278 extending from the frame 18.

When the brush frame is rocked away from the tape, the tape is free to be removed and then, when the new tape is assembled and the brush frame is lowered, it will be noted that the lower end of insulation bar 261 is extended and rounded to push down on the tape and draw it taut at the point where it approaches the pin feed drum and is about to pass under the sensing brushes. Since the latch 271 is formed with a slanted bottom end, the brush frame can be lowered into operating position by merely pushing down on the top finger piece 275 until the latch snaps under the stud.

In order to prevent sparking of the brushes at the tape and to properly time and limit the length of the impulses directed through the tape, a pair of circuit breakers are provided and geared to the pin feed drum to rotate in synchronism therewith. In Fig. 16 it is seen that a small triangular frame 280 is secured at 281 and 282 to the outside of frame 18. Extending outwardly on this small frame 280 is a stud 283 acting as a pivot for a gear 284 in mesh with the gear 224 already mentioned as secured to the pin feed drum 231. Adjustably secured to the side of gear 284 is a pair of ratchet wheels 285, 286 formed with a series of arcuate slots 287, through which pass the adjustment screws 288 for fastening the wheels relative to each other and also with respect to the driven gear 284. The teeth of the two wheels are not aligned but instead are staggered relative to each other and the circuit closing and opening times are varied to permit the passage of the impulse carried from the sensing brushes.

Pivoted at 290 on the outside of frame 280 is a pair of contact operating levers 291 and 292, Fig. 15. The former has a lug 293 cooperating with the teeth on ratchet wheel 285 and the lever extends rearwardly to carry an insulation roller 294 underlying a pair of normally open contacts 295. A spring 297 (Fig. 16) tends to rock the lever in a clockwise direction and hold it in cooperation with the circuit breaker wheel. As the wheel rotates in synchronism with the pin wheel upon the passage of a feed control perforation position, the lever is rocked upward by one of the teeth and the contacts 295 are closed after the presentation of a perforation.

In a similar fashion the other lever 292 is operated by the circuit breaker wheel 286 to control the opening and closing of contacts 296, Fig. 15, which are normally closed and provided with an upper blade extending over the insulation roller 294' attached to lever 292.

*The control panel*

Figure 18:
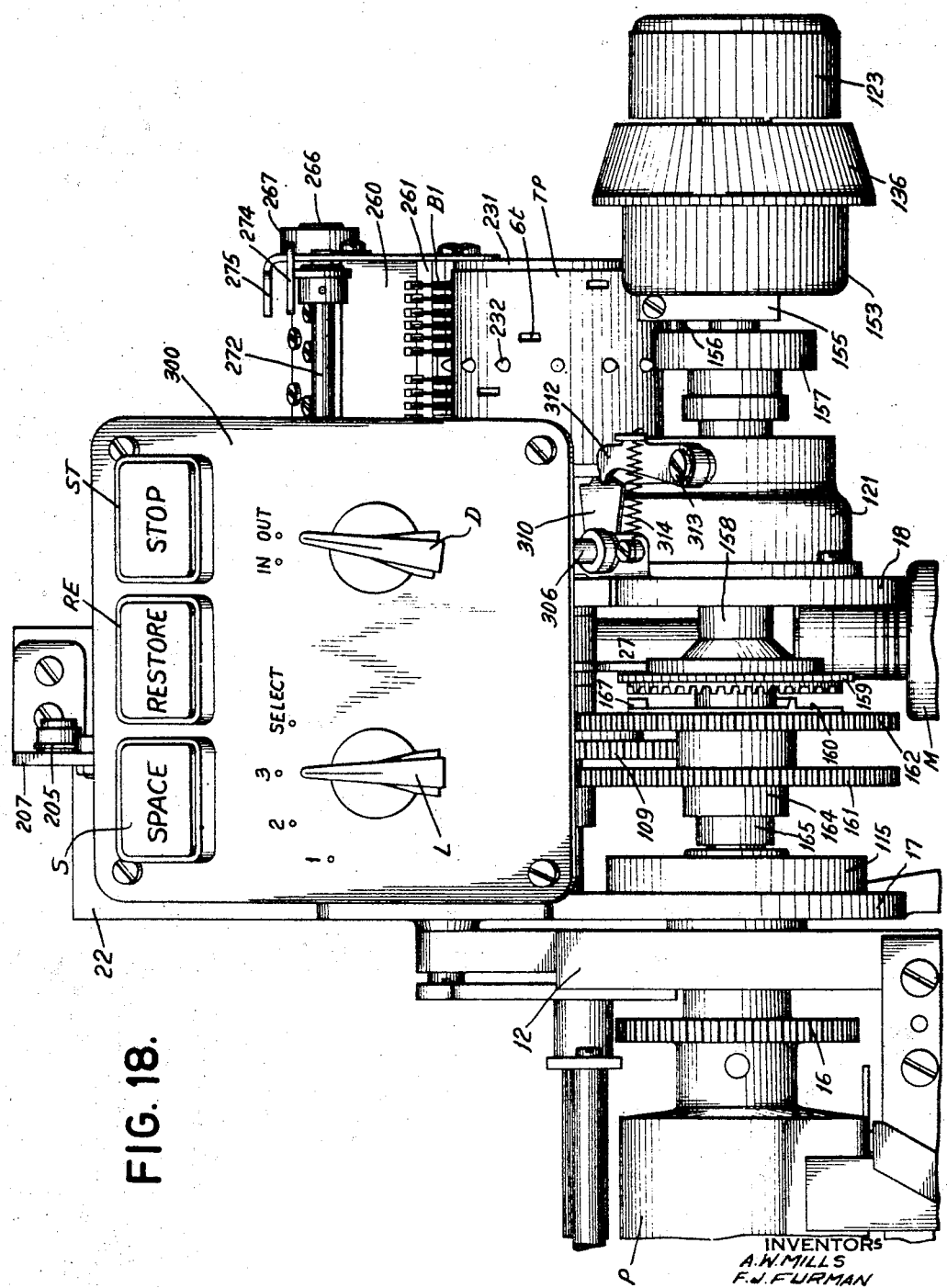
Fig. 18 is a front elevation view showing the platen extension shaft and the control panel supporting the manipulative elements for regulating the tape control line spacing and restoration of the control.
Figure 19:
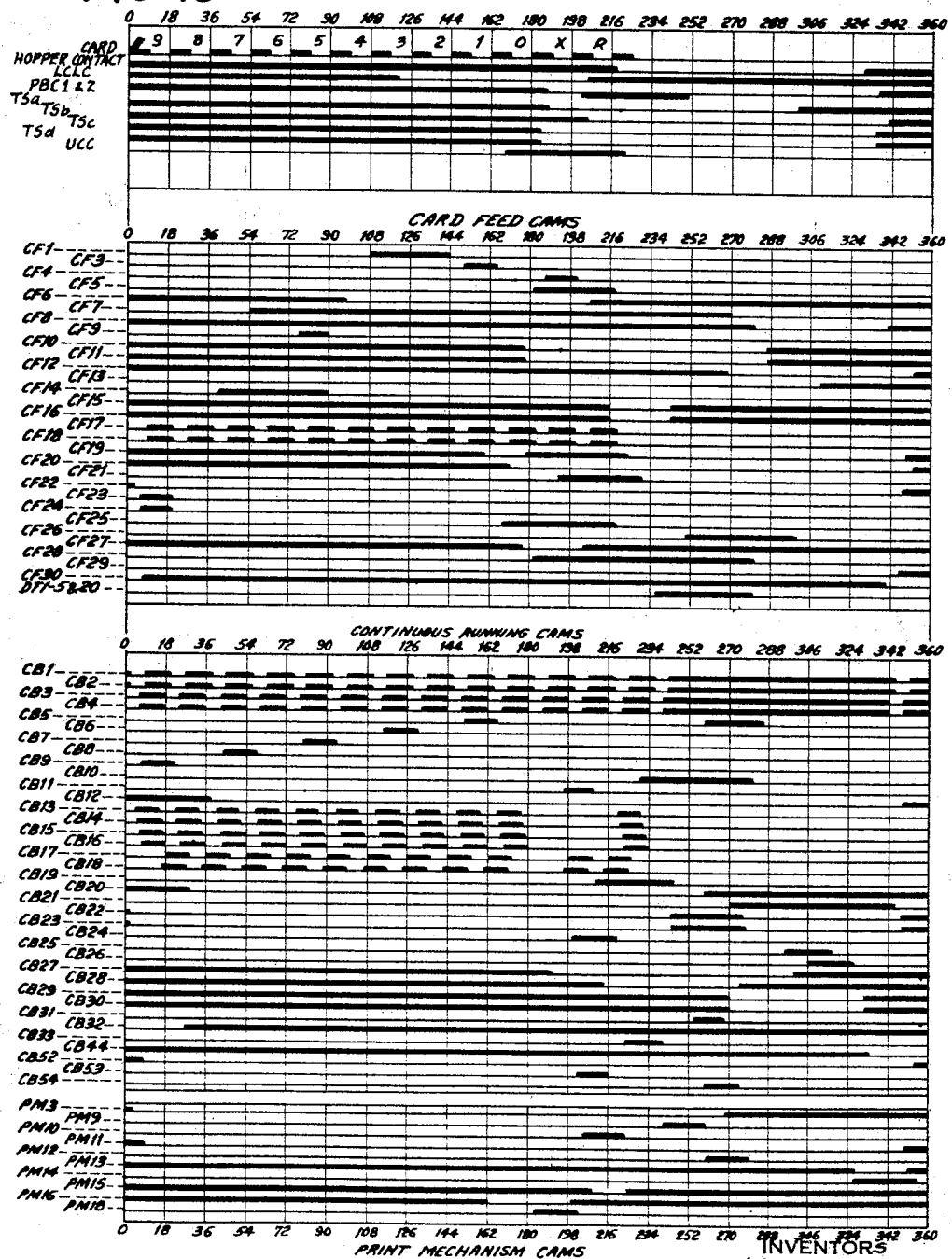
Fig. 19 is a timing chart showing the intervals of operation of the various electrical and mechanical controlling elements.

The feed control unit is provided with its own set of operating control keys and levers for setting the device for desired line spacing and operating control. Referring to Fig. 18, it is seen that a control panel 300 is the mounting for the three control keys, i. e. space key S, restore key RE, and stop key ST. Also mounted on the panel are the line space control lever L and the declutching lever D. The space key S is provided for selecting hand operated line spacing control and also for advancing the record and the control tape in long feeding when it is desired to advance a record independent of the tape control. The restore key RE is provided to close circuit connections for energizing the tape control magnets, so that the tape is advanced to the normal or home position, which is aligned so as to coincide with the presentation of the top of the record form at the printing line on the platen. The stop key ST is provided to open circuit connections to disable the tape control magnets when there is need for an emergency stop.

The line space control lever L is settable to one of four positions, the first three marking selection of a succession of progressively greater line space movement for one, two or three steps. The fourth position is one making the line spacing movement independent of any prearranged number of steps other than the degree of motion selected by the perforations cut in the control tape. In other words, this "select" line space control is tape control of line spacing.

Before describing the mode of operation of the declutching lever D, it may be noted that the panel 300 (Fig. 16) is supported at a slight angle by a pair of brackets 301, one of which is shown attached to the outer frame 18 and the other being similarly secured to the frame 17.

In Fig. 13 it is shown that the lever D is provided with a projecting shaft 302 to which is secured an arm 303 having a hub cooperating with the inner surface of the panel 300. Extending from arm 303 is a stud 304 projecting in a notched opening in the end of a lever 305 secured to a slanted shaft 306 carried in bearings 307 and 308 formed on the bearing block 121 described earlier in this specification. Also secured to shaft 306 is a long hub 309 carrying a pair of bent arms 172 for engaging in the grooved section 173 (Fig. 17) formed on the clutching sleeve 158 already described.

It is noted from the position of the lever D (Fig. 18) that, when it is rocked counterclockwise to the "in" position, pin 304 (Fig. 13) is lifted toward the observer and arms 172 are depressed and rocked in the direction observed as clockwise in Fig. 17. This movement tends to shove the sleeve 158 toward the left and engage the clutch disk 159 with the driving ring 160.

When lever D (Fig. 18) is rocked clockwise to the "out" position, the train of connections is moved in the opposite direction and shaft 306 (Fig. 17) is rocked counterclockwise to push the sleeve 158 toward the right and disconnect the connections between the feed control clutches and the platen.

In order to maintain the position in which the declutching lever D is set (Fig. 18), a detenting device is provided. Attached to shaft 306 is an arm 310 formed with a pair of notches. Cooperating with the notched surfaces is a pointed detent 312 pivoted on a stud 313 extending from the side of the bearing frame 121. A spring 314 is connected to the detent and tends to rock it counterclockwise to hold the pointed end in engagement with the notched surface of arm 310 and thereby hold the declutching lever in one of the two possible selection positions.

When the tape feed control unit is to be used, the clutch lever is moved to the "in" position to secure a driving connection between the tape selected feed clutch and the platen shaft. However, there are times when it is desired to disconnect the selective feed and control the tabulator in the customary fashion for ordinary line spacing to print on continuous record material, which is not divided into record forms or bills.

*The electrical controls*

As shown in the wiring diagram (Figs. 20a–20f) the controls of the tape sensing devices are coordinated with the controls of an alphabet printing tabulator. The tabulator is of the type described in United States Patents Nos. 2,079,418 and 2,172,067 and 2,199,547, to which reference may be made for details of construction. Before describing the manner in which the feeding control tape is influenced by the ordinary tabulator controls and operations, it is believed well to outline the usual tabulator operations from starting control up to the printing of totals.

In such machines a motor drive is communicated through two clutches which are selectively operated for card feeding and printing operations. A number of PBC contacts and CF cam contacts operate only when the card feed clutch is engaged. Certain PM contacts operate only when the printer clutch is engaged. Other CB contacts operate all the time that the motor is active. A series of TS contacts are operated only when a total cycle is initiated.

Figure 20A:
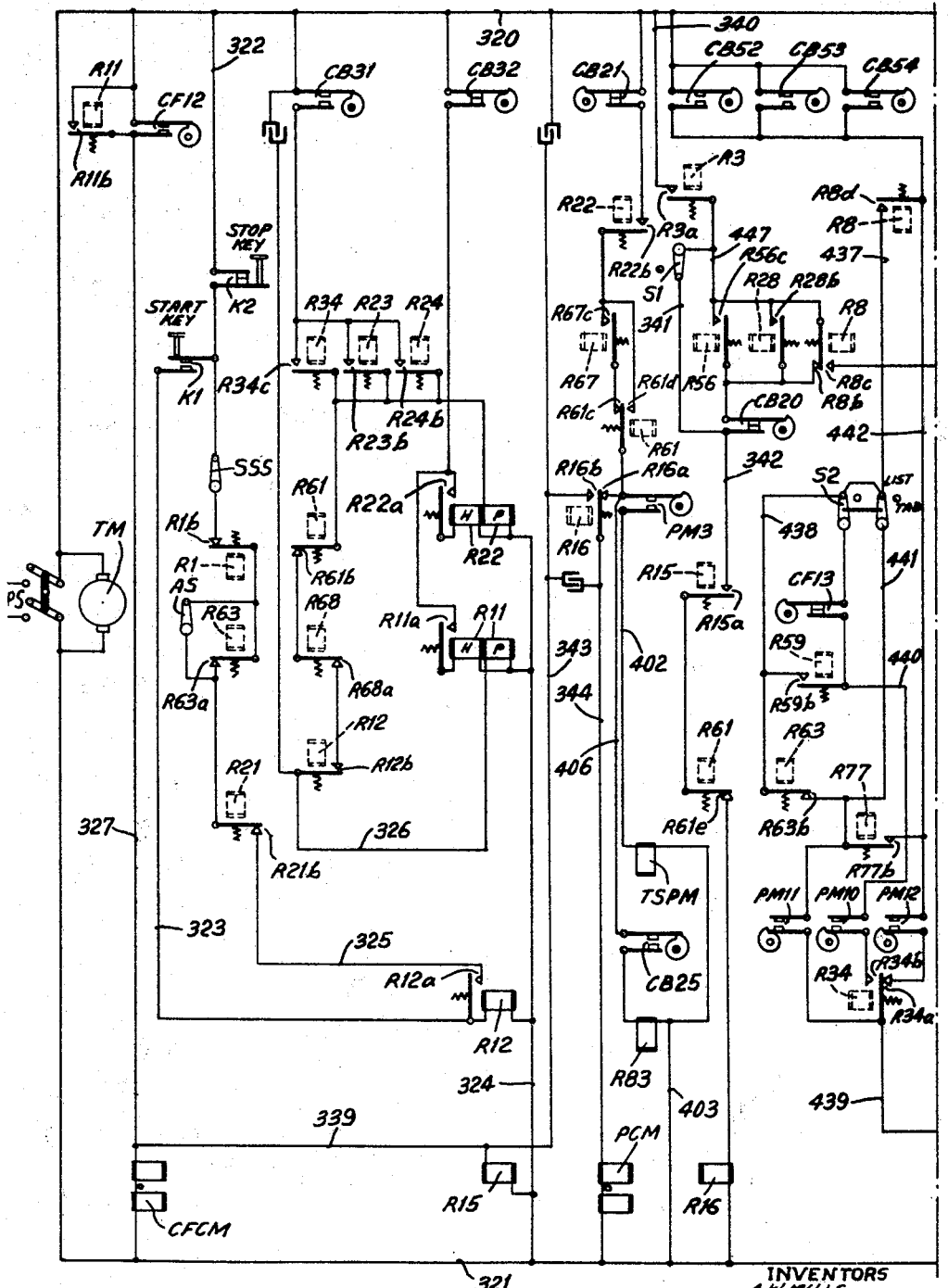

After cards are placed in the feed magazine, an initial feeding cycle is initiated by pressing the start key K1 (Fig. 20a). A circuit is then closed from line 320, through wire 322, stop key contacts K2, start contacts K1, wire 323, relay R12 and wire 324 to line 321. Relay R12 then closes contacts R12a to set up a holding circuit including line 321, wire 324, relay R12, contacts R12a, wire 325, single sheet stop contacts R21b, contacts R63a and R1b, stacker stop switch SSS, stop contacts K2, wire 322 and line 320.

Relay R12 also closes contacts R12b (Fig. 20a) to energize the pickup coil of relay R11 by a circuit with line 321, wire 324, pickup coil of R11, wire 326, contacts R12b, R68a, R61b and R34c, cam contacts CB31 and line 320. When contacts CB31 close toward the end of the pickup cycle, the pickup circuit is made and this is followed by the closure of contacts R11a to hold over through contacts CB32 which break in the first part of the next cycle. The holding circuit for relay R11 includes line 320, cam contacts CB32, contacts R11a, the holding coil of relay R11, wire 324 to line 321.

Other contacts R11b, Fig. 20a, of relay R11 are in series with the card feed clutch magnet CFCM and, when closed, serve to initiate card feeding. The clutch circuit includes line 320, contacts R11b, wire 327, clutch magnet CFCM and line 321. In Fig. 5A it is seen that when the card picker is operated, the first card is pushed down to the upper brushes UB.

As the feed drive starts, a cam contact CF9 (Fig. 20e) closes to call in relay R1. The circuit passes through line 320 (Fig. 20e), timer contacts CB1—4, wire 328, timer contacts CF17 and CF18, contacts R2a, common brush 329, the upper brush contact roller 330 and brush 331, wire 332, cam contacts CF9, pickup coil R1, wire 333 and line 321. Relay R1 is then held through contacts R1a and CF8 until the first full cycle is well advanced. The circuit includes line 320, wires 336 and 337, cam contacts CF8, contacts R1a, holding coil R1, wire 333 and line 321.

Relay R1 is effective to open contacts R1b (Fig. 20a) and deenergize relay R12 which in turn opens contacts R12b to deenergize relay R11 when cam contacts CB32 open. The card feed clutch magnet circuit is maintained until near the end of the cycle by the closure of contacts CF12. When the clutch magnet becomes deenergized, the card feed clutch dog is pulled out of the ratchet wheel to stop the feed. The card feed mechanism has operated for one cycle and stopped.

Under initial starting conditions, it is necessary to depress the start key a second time to cause a continuous succession of card feed cycles. After the second cycle, the feed unit runs continuously until the card magazine is empty. Cam contacts CF9 (Fig. 20e) cannot energize relay R1 as long as cards are feeding, because the passing cards insulate the brush 331. Relay R1 remains deenergized and the contacts R1b (Fig. 20a) remain closed to maintain the holding circuit for card feed relay R12.

Near the end of the last cycle when the last card is past the brushes, cam contacts CF9 (Fig. 20e) close and energize relay R1 which then opens contacts R1b to deenergize relay R12 and stop the card feed mechanism as already described in connection with starting conditions.

The lower card lever relays R3 and R4 (Fig. 20e) are energized when the first card passes below the upper brushes UB and they remain energized until the last card passes the lower brushes LB. The first card closes the lower card lever contacts LCLC after digit analysis under the upper brushes. Then cam contacts CF6 also close to energize the relays by the circuit: line 320, wires 336 and 337, cam contacts CF6, card lever contacts LCLC, relays R3 and R4, wire 333 and line 321. Relays R3 and R4 are held energized, during the time that contacts LCLC are opened between cards, by the presence of a holding circuit through relay contacts R3a and cam contacts CF7.

In listing operations the card passes the lower brushes in synchronism with the upward movement of the type bars. Magnets PR (Fig. 7) operate stop pawls to locate the type bars in positions corresponding to the data punched in the card and at a predetermined time, hammers are tripped to record the information on the bill form.

Therefore, listing operation requires energization of the card feed clutch magnet CFCM (Fig. 20a) to advance the cards, and energization of the printer clutch magnet PCM for raising the type bars. Relays R1, R11 and R12 serve to energize the card feed clutch magnet CFCM as explained in connection with start key operation. Continuous operation is the same as the aftermath of starting conditions. It is noted in Fig. 20a that relay R15 is connected to clutch magnet CFCM by a wire 339 so that the relay is operated to condition printing connections when cards are feeding.

The printer clutch magnet PCM is called into operation under control of relays R15 and R16 when switch S1 is set for listing operation. The circuit for operating relay R16 flows from line 320, through wire 340, lower card lever relay contacts R3a, switch S1, wires 341 and 342, contacts R15a and R61e, relay R16 and line 321. Relay R16 then closes contacts R16b so that the printer clutch magnet PCM is called into operation along with the card feed magnet whenever contacts R11b or cam contacts CF12 are operated. The printer operating circuit includes line 320, contacts R11b or CF12, wires 327, 339 and 343, contacts R16b, wire 344, printer clutch magnet PCM and line 321.

Figure 20B:
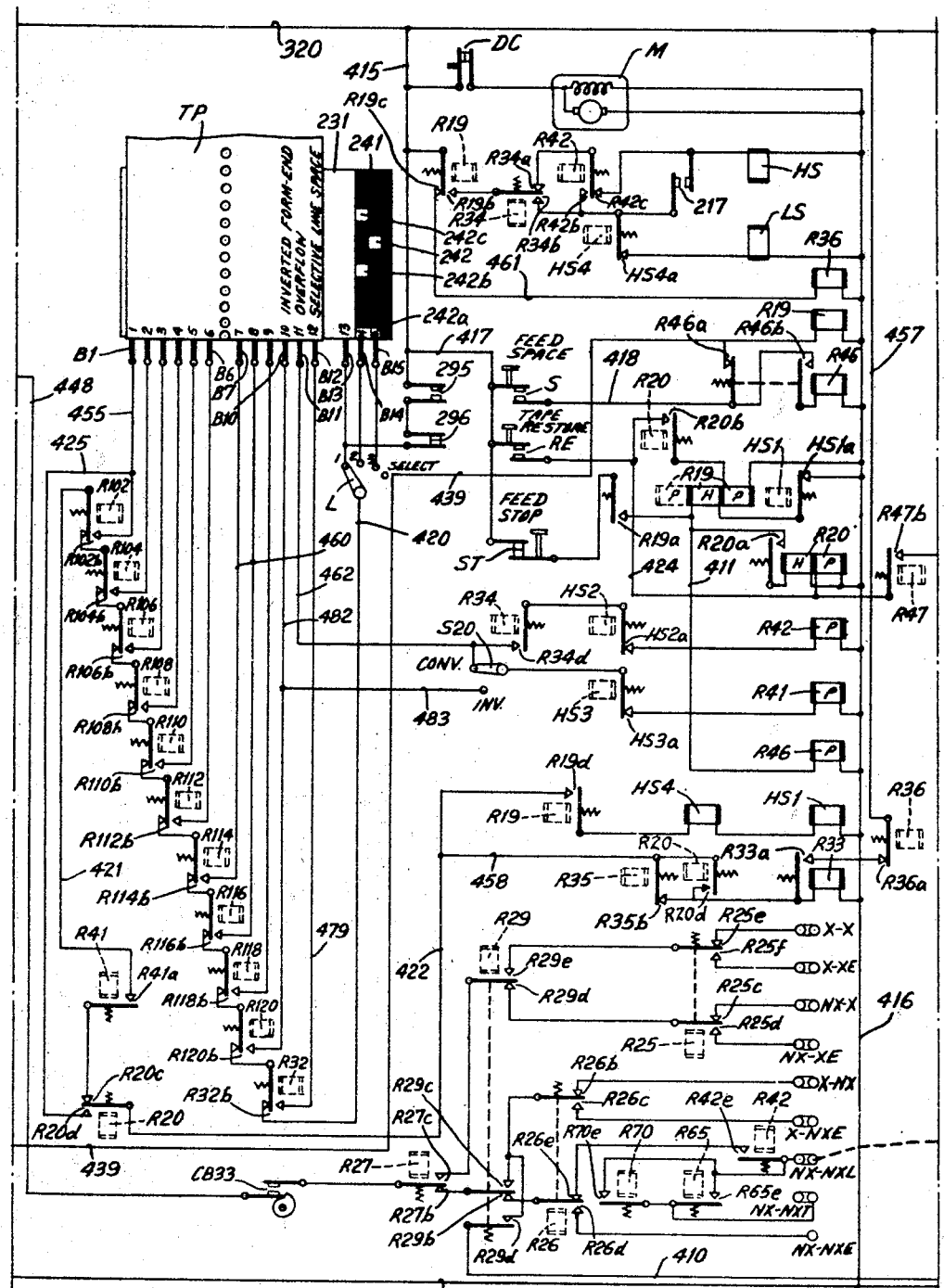
Figure 20C:
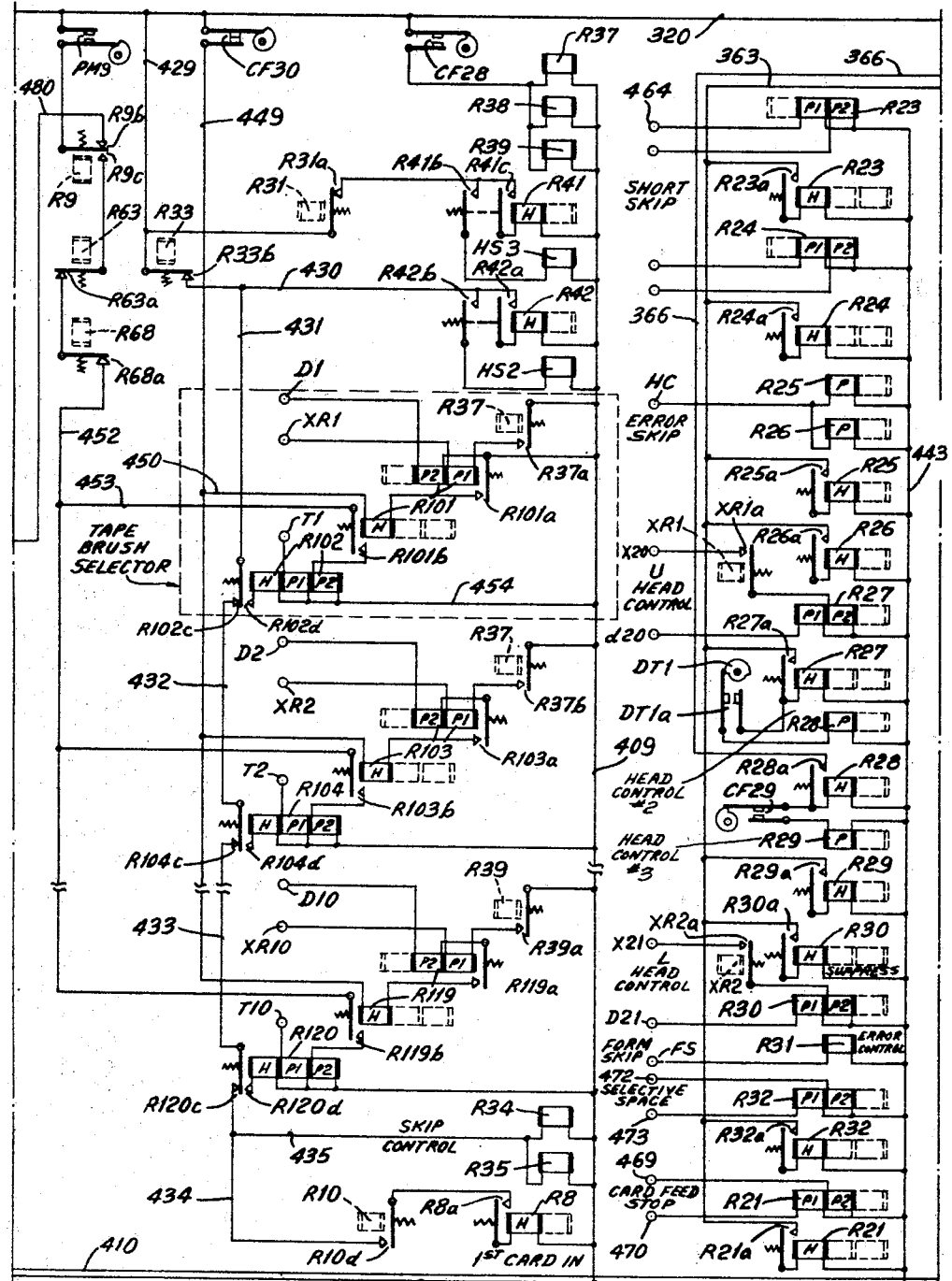
Figure 20D:
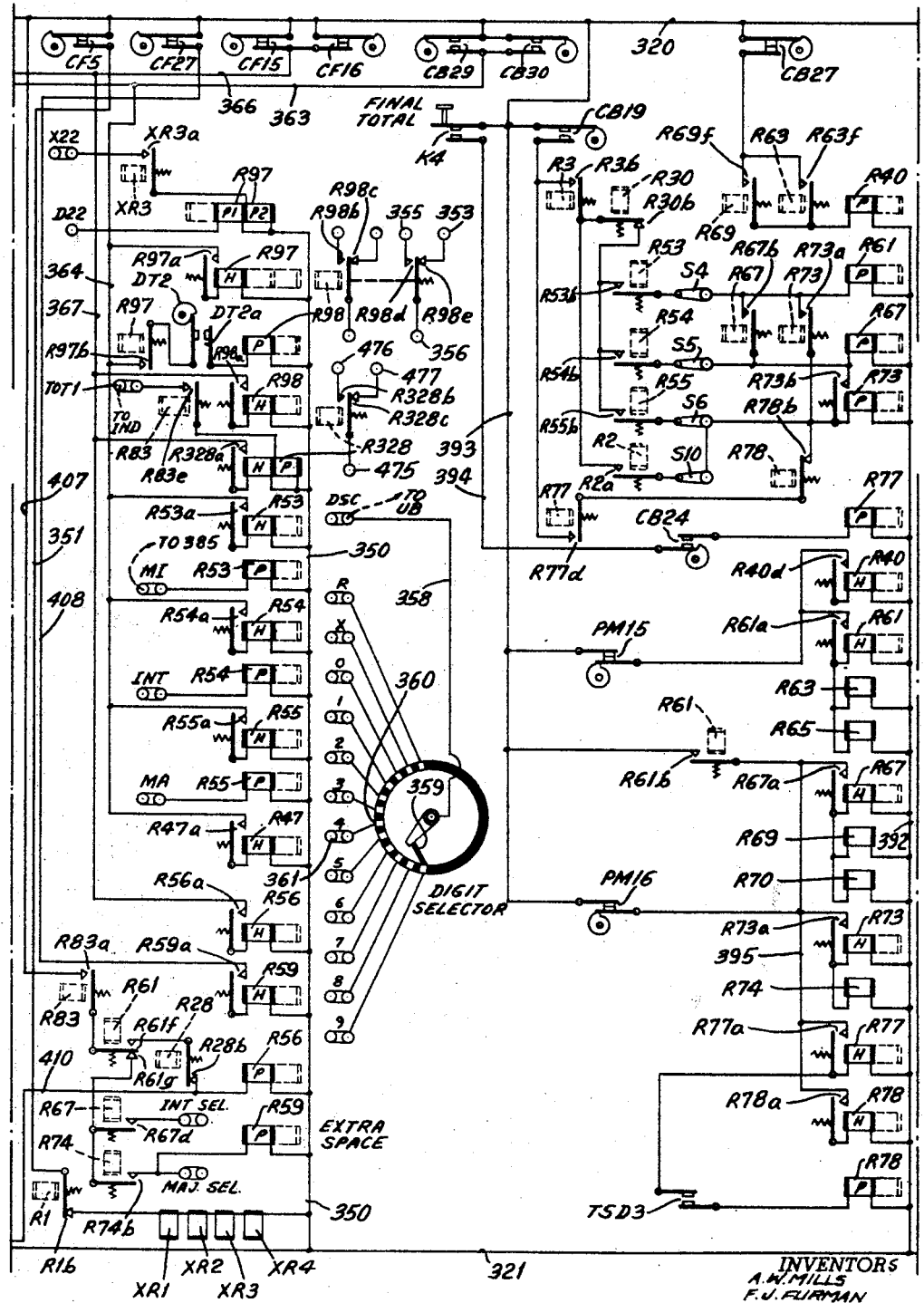
Figure 20E:
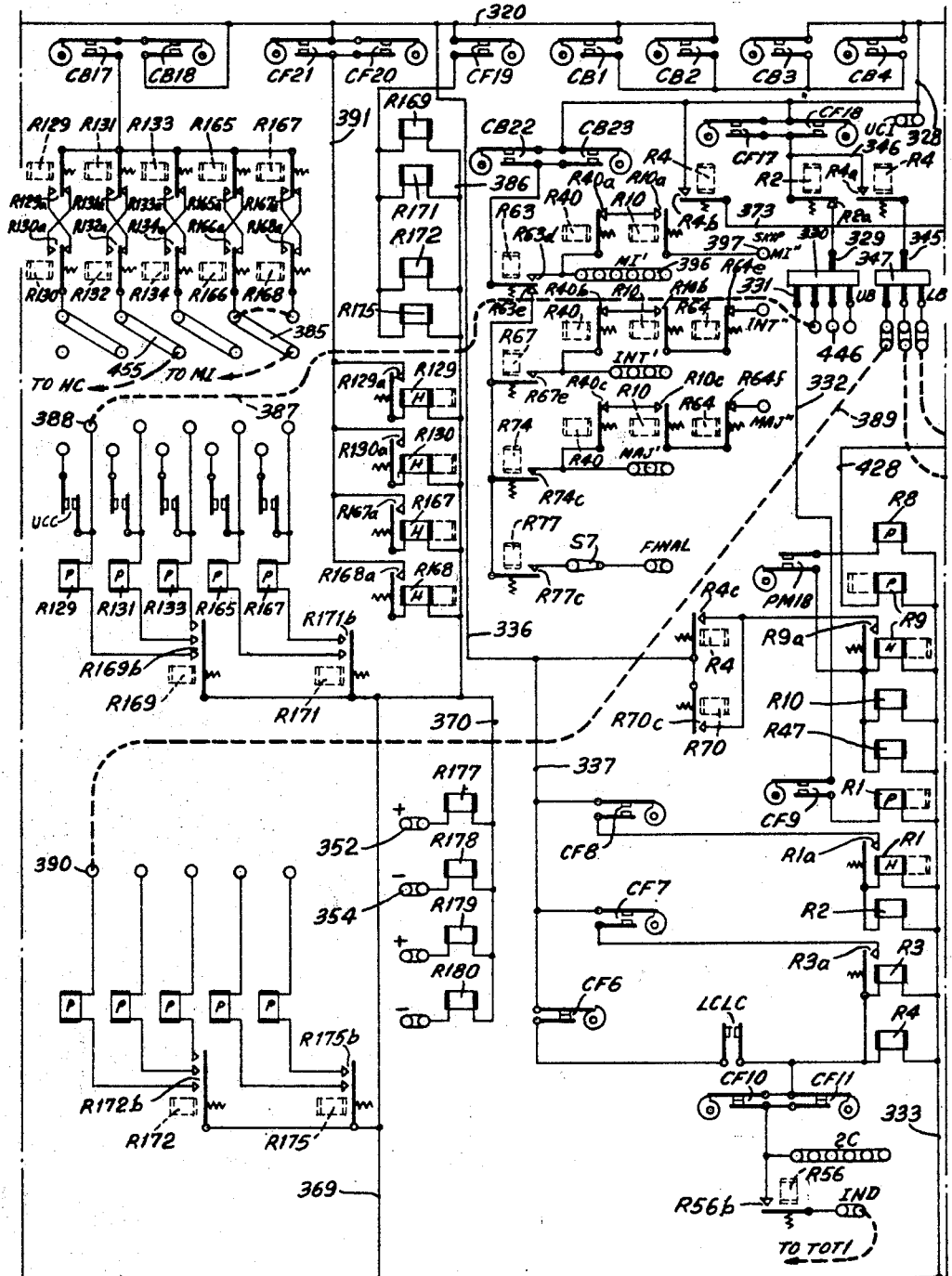

Adjustment of the type bars is regulated by impulses carried to magnets PR (Fig. 20f) from the lower brushes LB (Fig. 20e). A numeral printing control circuit involves line 320, contact breakers CB1—4, wire 328, timer contacts CF17 and CF18, wire 346, lower card lever relay contacts R4a, common brush 345, contact roller 347, through the card by a lower brush LB, the brush socket, plug wire 348 (Fig. 20f), socket N1, normally closed contact TSa, magnet PR and line 321. An alphabet printing circuit is similar, but the plug wire 349 is connected from a card column in which there are alphabet code perforations and to a plug socket A1 of a printer order in which the type bar has alphabet type.

Contacts TSa are shifted for total cycles so that printing is then controlled by impulses from an accumulator rather than from the lower brushes.

Many operations of the tabulator, such as printing and adding, are made optional and directive under control of what are called X distributors. These distributors are switches that are operated under control of special digit or X perforations punched in the cards for distributive control purposes. Contacts CF5 (Fig. 20d) are closed at the instant the X holes pass the card reading brushes in the cycle. They set up a circuit for multi-contact relays as follows: line 320, cam contacts CF5, wire 351, contacts R1b closed as long as cards are feeding, multi-contact relays XR1—4, and line 321. At the top of Fig. 20d it is seen that one of the relays, relay XR3, controls a contact XR3a in series with an X distributor pickup coil R97 which receives X impulses through socket X22 by plug wire from the upper brushes UB. A similar pickup coil R97 is provided to receive digit impulses through socket D22, from the digit selector and the upper brushes UB.

The circuit for sensing the special X perforations is as follows: line 320 (Fig. 20e), cam contacts CB1—4, wire 328, timing contacts CF17 and CF18, upper card lever control contacts R2a, common brush 329, contact roller 330, and through the record card as sensed by an upper brush UB to detect an X perforation, a socket in line with the upper brush, a plug wire to socket X22 (Fig. 20d), contacts XR3a, the second pickup coil of relay R97, wire 350 and line 321.

A somewhat similar pickup circuit is set up by detection of a digit perforation rather than an X perforation. Under such conditions the digit selector is plugged for one or more particular digits and placed in a circuit between the upper brush and the pickup coil. The digit distributor circuit is as follows: line 320 (Fig. 20e), cam contacts CB1—4, wire 328, timing contacts CF17—CF18, contacts R2a, common brush 329, contact roller 330, and through a column of the record card to a particular digit perforation sensed by an upper brush UB, a plug socket in line with the upper brush, a plug wire to socket DSC (Fig. 20d), wire 358, to the common brush 359 of the digit selector, a commutator segment such as the "4" segment 360, a plug socket 361 connected to segment 360, a plug wire to socket D22, the first pickup coil of relay R97, wire 350 and line 321.

When either of the pickup coils is energized, the holding contacts R97a of relay R97 are closed and a holding circuit is established as follows: line 320 (Fig. 20d), cam contacts CB29 and CB30, wires 363 and 364, contacts R97a, the holding coil of relay R97, wire 350, and line 321. The action of relay R97 is preparatory to the X distributor control which takes place a cycle later than the cycle in which the special perforations are sensed while the card is under the upper brushes. Therefore, another relay R98 is picked up to become effective during the cycle when the card is passing the lower brushes, at which time it is desired to distribute the data sensed therefrom and govern its direction into different parts of the printer or accumulator, so as to alter the nature of the accounting operation for credit or debit entry.

For the purpose of calling relay R98 into operation, relay R97 operates contacts R97b in series with the pickup coil of relay 98. Also in series with this pickup coil are digit transfer contacts DT2a which are cam operated to hold the pickup circuit during the time that the contacts CB29 and CB30 open, which is overlapped by the time that cam contacts CF15 and CF16 close. The pickup circuit for relay R98 is as follows: line 320, cam contacts CB29 and CB30, wires 363 and 364, contacts R97b, cam operated contacts DT2a, pickup coil of relay R98, wire 350 and line 321. A holding circuit is then established through closure of contacts R98a. The holding circuit may be followed from line 320, through cam contacts CF15 and CF16, wires 366, 367, contacts R98a, the holding coil of relay R98, wire 350 and line 321. Relay R98 is associated with distributive contacts R98c and R98d which selectively close as operated by a common contact blade. As an example of the distributive effect of these contacts they may be plugged to cause credit or debit entries into an accumulator by association with relays R177 and R178 as follows:

If a debit entry is to be made from a card which is X punched, then the socket 354 (Fig. 20e) of relay R178 is plugged to the normally open contact R98d (Fig. 20d). The other or normal credit selection circuit is as follows: line 321 (Fig. 20e), wires 369 and 370, relay R177, socket 352, plug wire to socket 353 (Fig. 20d), contacts R98c, socket 356, plug wire to socket 2C (Fig. 20e), cam contacts CF10 and CF11, contacts LCLC or R3a both closed with a card under the lower brushes, contacts CF6 or CF7, and wires 337 and 336 to line 320. Either credit relay R177 or debit relay R178 can be energized invariably by plugging directly from the relay to socket 2C instead of going through the X distributor contacts. An example of a direct circuit for credit entry control is as follows: line 321 (Fig. 20e), wires 369 and 370, relay R177, socket 352, plug wire to socket 2C, cam contacts CF10 and CF11, contacts LCLC or R3a, cam contacts CF6 or CF7, wires 337 and 336, and line 320.

When an adding control relay such as relay R177 is energized, as a card passes the lower brushes, the amount perforations are sensed and the impulses directed to time the energization of the adding magnets CR. A typical adding entry circuit is as follows: line 320 (Fig. 20e), cam contacts CB1—4, wire 328, contacts CF17 and CF18, wire 346, contacts R4a, common brush 345, contact roller 347, through the card by brush LB, the plug socket of the lower brush, a plug wire to socket 372 (Fig. 20f), the left side of contact R177b now closed, cam operated gang contacts PBC1 closed for the 9-0 digit entry cycle points, normally closed total switch contacts TSb, magnet CR and line 321.

Magnet CR (Fig. 8) operates armature 44 to trip the clutch frame 41 and cause engagement of clutch gears 37 and 38 to start driving the adding wheel at a time commensurate with the value of the sensed perforation. After the adding wheel is advanced to add the digit, it is stopped by the disengagement of frame 41 by cam 51.

For subtraction, the adding wheel is clutched early in the cycle and then declutched differentially under control of the card perforation to add the complement of the digit. The early engagement is caused by a circuit including line 320 (Fig. 20e), cam contacts CB1—4, wire 328, contacts R4b, wire 373, cam contacts CF24 (Fig. 20f), wires 374 and 375, contacts R178b, contacts PBC1, right total contacts TSb, magnet CR and line 321. Action of magnet CR serves to clutch the adding wheel to the driver as already explained.

In the units order the magnet CR is energized earlier by closure of cam contacts CF22 to add the elusive unit. The circuit is the same as the subtraction start circuit just traced except that cam contacts CF22 are made controlling by a plug wire 377.

As a result of the early clutching, the adding wheels start to turn and are stopped differentially by action of magnets SC as governed by impulses from the card passing under the lower brushes. A typical subtraction stopping circuit in the tens order involves line 320 (Fig. 20e), cam contacts CB1—4, wire 328, cam contacts CF17 and CF18, wire 346, contacts R4a, common brush 345, contact roller 347, the card and lower brush LB, a plug wire to socket 372 (Fig. 20f), normally closed contacts R177b, wire 378, left contacts TSc, magnet SC and line 321. Magnet SC then trips a mechanical linkage for declutching the adding gears to stop the wheel when the complement is entered.

If an adding wheel passes to 10 in accumulating an amount, the contact 87 in the units order is closed to send a carry impulse through the add magnet of the next higher order. The carry circuit includes line 320 (Fig. 20e), cam contacts CB1—4, wire 380 (Fig. 20f), cam contacts CB13, wire 381, contacts 87 of the units order, wire 382, contacts PBC2 closed at the carrying time, right contact TSb, magnet CR and line 321.

Should a wheel be standing at "9" when a carry unit is received, then a unit is added in the next higher order by parallel circuit connections. Assuming that a carry impulse is going into the third order from the right in Fig. 20f, (for purposes of this illustrative instance, the third order would be a higher order than the units order) and that the wheel is at "9" with contact 85 closed, then a branch carry circuit is as follows: from wire 383 (energized by a carry circuit such as that just traced and coming from a next lower order), the carry circuit branches around through contacts 85 and wire 382 over to the next higher order, through contacts PBC2, right contacts TSb, magnet CR and line 321. Magnet CR, when energized at the carry time, clutches the adding wheel drive gears momentarily to add a unit before being declutched by the restoring cam.

Group control devices are provided for separately considering different classes or groups of cards as distinguished by different group number perforations for different groups. Consecutive cards are compared; one card being read at the upper brushes while the preceding card is read at the lower brushes. As long as the card readings are alike, the card feed continues to function. When the machine senses that the two group readings are not alike, the feed unit stops, the machine prints the total, the accumulator is cleared to zero, and the machine automatically starts feeding the cards of the next group.

As a preliminary to the establishment of group control circuits, a number of preparatory relays R169—R175 (Fig. 20e) are energized to close the circuits for the comparison relays. The preparatory circuit includes line 320, cam contacts CF19, relays R169—R175, wire 386, wire 369 and line 321. As an example of the effect of these relays, it is seen that relay R169 serves to close contacts R169b in series with the group control pickup coils R128—R133.

The actual comparing circuits are connected by plug wiring between the pickup coils and certain upper and lower brushes devoted to sensing group numbers or special perforations. An example of the comparing circuits is as follows: lines 320 (Fig. 20e), cam contacts CB1—CB4, wire 328, timer contacts CF17 and CF18, contacts R2a, common brush 329, contact roller 330, through the perforation in the card sensed by upper brush UB, plug wire 387 connected from a socket in line with the upper brush to a socket 388 in line with the pickup coil of relay R129, contacts R169b and wire 369 to line 321. As long as group numbers agree, a companion circuit to that already traced is set up at the same time through a pickup coil of a relay R130 as energized through the lower brushes by the following circuit: line 320 (Fig. 20e), cam contacts CB1—CB4, wire 328, contacts CF17 and CF18, wire 346, contacts R4a, common brush 345, contact roller 347, through a perforation in the card sensed by the lower brush LB, a plug wire 389 connected to socket 390, pickup coil of relay R130, contacts R172b, wire 369 and line 321.

Relays R129 and R130 have holding coils and contacts in series therewith for sustaining the comparing circuit connections. The holding circuit includes line 320, cam contacts CF20, CF21, wire 391, contacts R129a, the holding coil of relay R129, wire 386, wire 369 and line 321. In a similar fashion the other pairs of holding coils, such as those of relays R167, R168, are picked up and held as a part of the comparing control.

Referring to the upper left hand corner of Fig. 20e, it is seen that the pairs of comparing relays are associated with pairs of contacts so arranged that, when a related pair such as relays R129 and R130, are energized at the same time, they fail to provide a circuit path. However, should one or the other be energized alone, showing that there is a disagreement in the group control perforations, then a circuit is established for initiating group control operation. Assuming that there is a disagreement in the group numbers in the lower orders and that relay R167 is energized before relay R168, then the following circuit is established for setting up a minor control operation: line 320 (Fig. 20e), cam contacts CB18, CB17, the left contacts R167a, the right contact R168a, a plug wire connection between the lower order and socket 385, plug wire to socket M1 (Fig. 20d), pickup coil of relay R53, wire 350 and line 321. A holding circuit is established for relay R53 due to the closure of contact R53a in series with the holding coil. The holding circuit includes line 320 (Fig. 20d), cam contacts CB29, CB30, wires 363, 364, contacts R53a, the holding coil of relay R53, wire 350 and line 321. The holding coil of relay R53 operates other contacts R53b in series with a minor control pickup coil of relay R61. The minor control circuit includes line 320, cam contacts CB19, lower card lever relay contacts R3b, heading control suppression contacts R30b, relay contacts R53b, switch S4, pickup coil of relay R61, wire 392 and line 321. A holding circuit is established for relay R61 by the closure of contacts R61a and connections which may be traced from line 320, through wire 393, cam contacts PM15, contacts R61a, relay R61, wire 392 and line 321. Associated with relay R61 are two other minor control relays R63 and R65 which are energized along with it. These relays have contacts throughout the machine for controlling the suspension of card feeding, the initiation of total taking, etc.

The foregoing description of the group control comparison and the resulting pickup of relays for control purposes is duplicated with respect to other columns or groups of columns on the record cards for intermediate and major control. The particular columns selected for control are made effective by plugging from various sockets such as 385 (Fig. 20e) to the sockets INT and MA (Fig. 20d). Then the intermediate relay R54 and major control relay R55 are called into action to set up circuits for relays R67 and R73 similar to that of the minor control described in connection with energization of relay R61. Associated with intermediate relay R67 are two other control relays R69 and R70, and major holding relay R73 also has an associated relay R74.

Provisions are made for the taking of a key operated total by depression of the final total key and closure of contacts K4. The final total circuit includes line 320, contacts K4, wire 394, cam contacts CB24, pickup coil of relay R77, wire 392 and line 321. The holding circuit for final total relay R77 includes the line 320, wire 393, cam contacts PM16, wire 395, contacts R77a, holding coil R77, wire 392 and line 321. Relay coil R77 closes contacts R77c, Fig. 20e, in series with switch S7 and the pluggable final socket.

Another holding coil relating to relay R78 is connected in parallel with coil of relay R77, but it is not picked up until there is a closure of the total selection contacts TSD3.

Referring to Fig. 20a, it is seen that the minor control relay R61 has contacts R61b in series with the pickup coil of relay R11 for governing the continuance of operation of the card feed clutch magnet CFCM. When the minor control is exercised, the contacts R61b are opened to prevent energization of the pickup coil of relay R11. In this manner the feed mechanism is stopped when succeeding cards are not punched alike in the group control field.

Referring to the upper right part of Fig. 20e, it is noted that the minor relay R63, the intermediate relay R67, the major relay R74 and the final relay R77 all close contacts in series with separate pluggable connections. The minor, intermediate and major classes of controls each have two plug connections such as the usual direct minor connecting socket 396 in addition to the minor "SKIP" socket 397. The last mentioned socket is used to direct an impulse to the tape controls before printing for selecting a tape brush to control stoppage of the record form with a predetermined total line at the printing point. In series with the minor control contacts R63d and the "SKIP" socket 397 are relay contacts R40a and R10a, the former being interlock contacts to prevent repetition or more than one skip during total printing and the latter preventing from skipping until after the first card is under the lower brushes.

The interlock relay R40, Fig. 20d, is in the series with cam contacts CB27 and is called into operation by either the minor relay contacts R63f or the intermediate relay contacts R69f.

The "1st CARD IN" control involves not only relay R10 but also relays R8, R9 and R47 as shown in Fig. 20e. There it is seen that the pickup coil of relay R9 is energized by a circuit involving line 320, cam contacts CB1—4, wire 328, lower card lever relay contacts R4b, wire 373, cam contacts CF22, wire 428, relay R9, wire 333 and line 321. Contacts R9a are then closed to provide the holding circuit from line 320, through wire 336, relay contacts R4c or intermediate control contacts R70c, contacts R9a, relay R9, wire 333 and line 321. Relays R10 and R47 are connected in parallel with relay R9 to be energized along therewith as soon as a card is under the lower brushes.

Before going into description of the strip feeding controls, it is believed best to explain first the manner in which totals are printed.

In order to print a total from an accumulator, it is required that the orders of the accumulator be plugged to one of the "class of total" plug sockets, which are identified as MI', INT', MAJ' and FINAL, Fig. 20e. As an example of such plugging, a plug wire may be connected between the minor control socket 396 and the accumulator total entrance socket 399, Fig. 20f. Another connection effected for totals is the plugging between the accumulator exit sockets 400 and the print magnet sockets 401. As a further preliminary to the taking of a total, the total switch plate magnet TSPM, Fig. 20a, must be energized to shift the sets of contacts TSa, TSb and TSc, Fig. 20f, so that the normal item entry connections are broken. The circuit for magnet TSPM can be followed in Fig. 20a from line 320, through cam contacts CB21, relay contacts R22b (open for long skips of the feed but closed after such skips and remaining closed for short skips), contacts R61d closed on a minor group change, cam contacts PM3, wire 402, magnet TSPM and wire 403 to line 321. The printer clutch magnet PCM is also energized by a branch of the circuit which continues from contacts R61d, through contacts R16a, wire 344, magnet PCM, and line 321.

Figure 20F:
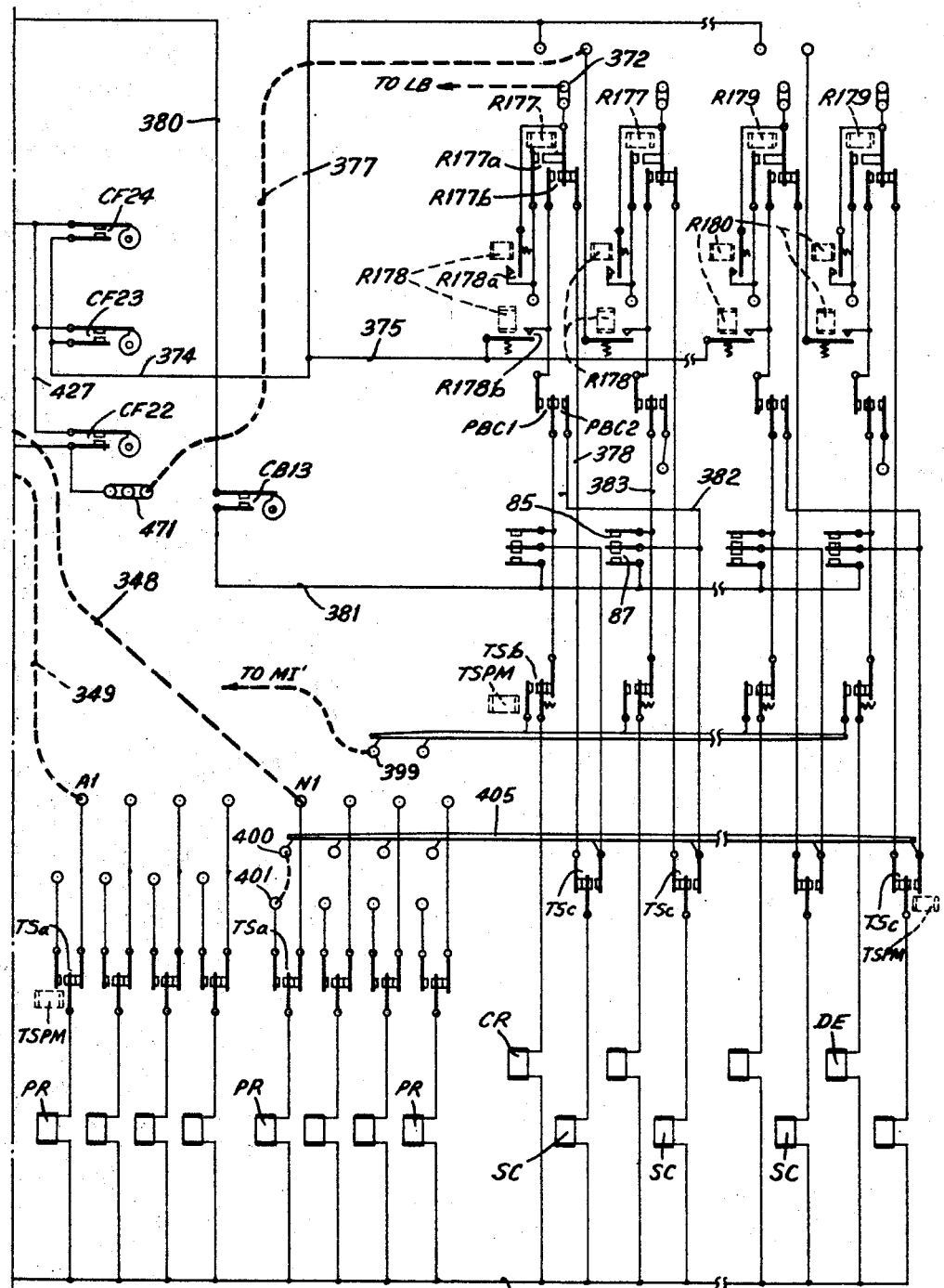

With the aforementioned connections established upon the occurrence of a group change, the total taking operation is started by energizing the accumulator magnets to start the adding wheels turning toward "0" in synchronism with the upward movement of the type bars. The initiating circuit is as follows: line 320, Fig. 20e, contacts CB1—CB4, wire 328, cam contacts CB22 and CB23, relay contacts R63d, the MI' plug socket 396 and a plug wire to socket 399. Fig. 20f, through the cable to the left contacts TSb now closed, magnets CR and line 321. The energized magnets CR then clutch the adding wheels 35, Fig. 8, and the cam 36 thereon is rotated counterclockwise with the zero cam point 86 approaching the tripping point 83 to operate lever 77. Lever 77 closes contacts 87 at a time proportioned according to the digit registered on the wheel before total taking was initiated. The smaller the digit the longer the time it takes for contact closure to take place and the higher the type bar rises to present the related type face at the printing line. When contacts 87 close, a circuit is established with two branches, the one for stopping the type bar in the total printing position, and the other for stopping the adding wheel in the reset zero position.

The total print control circuit follows a path through line 320, Fig. 20e, contacts CB1—CB4, wire 380, Fig. 20f, cam contacts CB13, wire 381, contacts 87 closed by the adding wheel, wire 382 to cable 405, plug socket 400, plug wire to socket 401, left contact TSa, magnet PR and line 321. The printer magnet PR then operates a pawl to stop the type bar in the total printing position. The same circuit branches from wire 382 and passes through the right side of contacts TSc and the subtraction control magnet SC of the accumulator. This magnet SC is effective to declutch the adding wheel at zero and thus serves to reset the accumulator.

Heretofore, it is noted how certain switches called X distributors are controlled by special X perforations or special digit perforations to effect a choice of operations such as debit or credit entry according to the presence or absence of the special perforations. Similar switches termed class selection switches are like the X distributors but are operable during total taking with control over larger groups of contacts so that all the orders of an accumulator can be switched for transfer of totals, group indication, etc. One of such switches is shown to include contacts operated by a relay R328, Fig. 20d, which is suited to be plugged for total control. As an example of total class selection, either of the "INT SEL" or "MAJ SEL" sockets can be plugged to TOT 1 to call in a class selection switch of feeding program upon an intermediate or major group change.

When the machine is operated for tabulating as distinguished from listing, i. e. when items are added without being printed, it is desirable to identify the group being totaled by printing a group number of other identification. This printing operation usually takes place on the first cycle after a total and is known as a group indication cycle for reading and printing part of the data on the first card of a group. The lower card reading brushes for sensing the group identification perforations are connected to normally open class selection contacts and from there the circuits, when closed, go to the printer magnets. Controls are provided to operate these class selection contacts for only one cycle per group and that is the cycle following a group change. In the present instance, when operating with heading cards, a change is made to prevent printing the group indication with the first heading line.

The controls involve relay R61, which is already noted in Fig. 20d as influenced by relay R53 upon a minor group change. Another relay, relay R83, Fig. 20a, is involved and called in late in the cycle by cam contacts CB25. The circuit involves line 320, cam contacts CB21, contacts R22b, contacts R61d, wire 406, contacts CB25, relay R83, wire 403 and line 321.

Both relays R61 and R83 then call in the pickup coil of relay R56. In Fig. 20d the circuit for initiating group indication control is seen to include line 320, wire 407, contacts R83a, contacts R61f, contacts R28b not opened unless used for heading card control to disable group indication when there is a group change between detail of one group and first heading card of the next group, pickup coil R56, wire 350 and line 321. Relay R56 is held during the cycle that the card passes the lower brushes by the circuit involving line 320, cam contacts CF15 and CF16, wires 366 and 367, contacts R56a, holding coil R56, and wire 350 to line 321.

Another initiating circuit is the one effective for the first detail card following a heading card. At such times relay R29 is energized while relay R27 is deenergized and a circuit is established including line 320, Fig. 20a, wire 340, contacts R3a, wire 447, contacts R8c, wire 448, Fig. 20b, cam contacts CB33, normally closed contacts R27b, operated contacts R29c and R29d, wire 410, Fig. 20d, pickup coil R56, wire 350 and line 321.

Relay R56 then closes contacts R56b, Fig. 20e, to set up a class selection switch for the group indicating cycle. The circuit is: line 320, wires 336, 337, cam contacts CF6, lower card lever contacts LCLC, contacts CF10 and CF11, contacts R56b, plug socket IND and a plug wire to socket TOT1, Fig. 20d, contacts R83e, pickup coil R328, and wire 350 to line 321. Relay R328 is also held by cam contacts CF15 and CF16 by a holding circuit involving line 320, cam contacts CF15 and CF16, wires 366, 367, contacts R328a, holding coil R328 and wire 350 to line 321. Relay 328 then shifts a bank of class selection contacts to close the normally open contacts R328b. Since these contacts are plugged between the lower brushes LB sensing a group identification field and the printer magnets PR, recording is effected from the first card of the group and then stopped by the opening of cam contacts CF15, CF16, and the deenergization of relays R56 and R328.

As part of the group indication connections, the printer control relay R16 (Fig. 20a) is called into operation to operate the print clutch magnet PCM. Relay R56 has contacts R56c for selecting relay R16 for group indication. The circuit involves line 320, wire 340, lower card lever relay contacts R3a, contacts R56c, cam contacts CB20, wire 342, card feed relay contacts R15a, minor control relay contacts R61e, relay R16 and line 321. Relay R16 then closes contacts R16b, Fig. 20a, to call the print clutch magnet PCM into operation for one cycle. The clutch circuit includes line 320, contacts R11b, wires 327, 333 and 343, relay contacts R16b, wire 344, print clutch magnet PCM and line 321.

*Digit selection*

One use of the digit selector, Fig. 20d, is explained hereinbefore in the operation of X distributors as an alternative to sensing of X perforations. The selector has a wider field of usefulness in the present case in being used directly to control spacing of the record strip. When card capacity is to be conserved, the use of one column of twelve digit indicium or perforations for variance of spacing has advantages over the use of a plurality of X perforations in a number of columns. Then each digit hole can be selective of a portion of the record form. The common brush socket DSC of the selector is plugged to a particular upper brush to sense one column of each card as it passes through the machine.

The selector shaft is the same as that used for the cams of the CF contacts and operates only when the card feed clutch is in operation. The twelve selective digit plug positions are connected to relays to select various tape sensing brushes to determine the stopping places for recording the lines of print related to each digit.

The purpose of digit line selection plugging is to locate the printed matter from a coded card on a selected line of a form. For example, with the 8th column selected to hold the digit controls, then a card perforated with a "1" hole in column 8 could be controlling to print on the first body line of a form or bill. A card punched with a "2" in column 8 would control to print on the second body line, etc. Thus, definite classifications such as "Gas, Electric, Merchandise, Tax and Arrears" could be printed on their respective first, second, third, fourth and fifth body lines, and the absence of any classification would cause its respective line to be skipped.

Extra space

Upon the occurrence of a major group change, circuit connections are established to secure an extra spacing operation on the downstroke of the type bars after the major total has been printed. Relay R59, Fig. 20d, is called into operation by the major group change relays R74 and a circuit is established as follows: line 320, wire 407, contacts R83a, R61g, R74b, the pickup coil of relay R59, wire 350 and line 321. A holding circuit is then set up through line 320, cam contacts CF27, wire 408, contacts R59a, holding coil R59, wire 350 and line 321. Relay R59 has other contacts R59b, Fig. 20a, which are in series with a relay for energizing the line space clutch magnet for an extra line space as explained hereinafter.

Enabling X control

Throughout the machine there are circuits influenced by the sensing of X perforations and said circuits should await the regular feeding and sensing of cards and not be effective under starting conditions before a card is under the upper brushes. In order to provide such "run in" and "run out" card controls, the machine is provided with the X reading multi-contact relays XR1—XR4, Fig. 20d. In series with the four relays are the upper card control contacts R1b which are opened only before a card gets to the upper brushes and after the last card leaves the upper brushes. On all other card feeding cycles, whenever cam contacts CF5 close at the X sensing time, a circuit is established through the X control enabling relays as follows: line 320, cam contacts CF5, wire 351, upper card relay contacts R1b, relays XR1—XR4 were 350 and line 321. For similar purposes, three other relays are provided to condition circuits of the tape feeding control unit for X reading control only during card feeding cycles. In Fig. 20c, relays R37, R38 and R39 are shown in series with wire 409 and cam contacts CF28 that close during the X reading time. The contacts of the three relays are used in circuits selecting the tape sensing brushes for determining the extent of operation of the sheet feed.

The tape controls

The foregoing sections of the description dealing with the wiring and electrical controls are concerned, in the main, with the devices usually found in tabulating machines. The following portions of the specification are devoted to the novel features of the tape control of record feed and the way the new controls are coordinated with the tabulator.

Many of the novel controls in the tape feed are arranged in the part of the wiring diagram shown in Figs. 20b and 20c. In Fig. 20b it is seen that the motor M is in continuous operation by means of a circuit which is established from line 320, through wire 415, the tape door contacts DC, motor M, and wire 416 to line 321. Associated with motor M are the two clutches described hereinbefore, the one being controlled by the low speed magnet LS (Fig. 20b), which is energized alone for line spacing and overflow skipping, and the other clutch is called in by magnet LS and the high speed interposer magnet HS which is energized to clutch other gearing to skip upon the printing of a total. Most of the wiring is concerned with the operation of one or both of these two clutch control magnets, and stopping the platen and pin feed tape drum to which they are connected.

Also shown on Fig. 20b is a diagrammatic representation of the pin feed drum 231 holding the control tape TP with the commutator 241 extending to control line spacing in addition to the other spacing controls exercised by the feed control indicia in the tape in association with the fifteen sensing brushes B1 to B15.

Tape drum and commutator adjustment

The tape feed spacing key S, Fig. 20b, may be used for properly setting the tape control commutator when setting the record feed devices for a new form under control of an inserted tape TP. If single line spacing is to be used, i. e. with switch L set to "1," the control tape may be set on the feeding pins without regard to the synchronism between the tape and the commutator. However, if the required line spacing is to be double or tripled, the switch L should be set to 2 or 3 and the brushes brought down to bear on the commutator and the space key S depressed. Then a circuit will be set up through line 320, wire 415, wire 417, contacts S, wire 418, interlock contacts R46a, pickup coil of relay R19, wire 416, line 321. Relay R19 then serves to close contacts R19b in series with the low speed clutch magnet LS and the commutator 241 is rotated and brought to a stop when one of the commutator spots is encountered by brush B14 or B15.

Assuming that the triple space selection is made, then when brush B15 encounters the spot 242, the stopping circuit will be established as follows: from line 320, to wire 415, circuit breakers 295, 296, common brush B13, the conductive drum 231, spot 242, brush B15, switch L, wire 420, normally closed contacts R32b, the series of brush selection contacts R120b to R102b, wire 421, relay contacts R41a, relay contacts R20c, wire 422, relay contacts R19d, control relays HS4 and HS1, wire 416, line 321. Control relay HS4 then operates to open contacts HS4a in series with the clutch magnet LS to disable it and stop the rotation of the commutator with the control spot 242 just beyond the line of brushes. Then the brushes can be raised and the tape inserted, so that the restoration perforation (this is the 1t tape perforation which is used as the starting position for both the tape and the record strip) is just beyond the brush B1.

Interlock relay R46 is energized by relay R19 to open contacts R46a and prevent the key contacts S from prolonging any feed operation. When contacts R19a are closed by any feed selection operation of relay R19, a circuit is set up through the pickup coil of relay R46. The circuit includes line 320, wires 415 and 417, stop key contacts ST, relay contacts R19a, wire 411, coil R46, wire 416 and line 321. Relay R46 then opens contacts R46a to break the key operated feed circuit, and it also closes contacts R46b to prepare a holding circuit should the feed space key be held down. As long as feeding is in progress, contacts R46a are held open, and should the key contacts S be closed, the interlock circuit is held through wire 418 and contacts R46b until the key is released.

Once the tape is synchronized with the commutator setting as already described, it can be brought around to the starting position by operation of the restoring key RE.

Tape restoration control

There are times when the tape remains out of the normal starting position after recording has taken place under control of one batch of cards. Prior to the initiation of recording under control of another sequence of record cards, it is desirable to restore the tape to the normal starting position. To effect such control, the tape restoration key RE is depressed and a number of circuit connections are established for operating the clutch magnet LS to cause movement of the tape until the brush B1 encounters the initial tape perforation *it* at the starting position.

The restoration circuit is established by the closure of key contacts RE, Fig. 20b, and the connections include line 320, wires 415, 417, contacts RE, wire 424, the pickup coil of relay R20, and wire 416 to line 321. Relay R20 then closes contacts R20b to set up a circuit through a pickup coil of relay R19. Relay R19 then closes associated contacts R19a to set up holding circuits for both relays R19 and R20 through the stop contacts ST. The holding circuits for relay R19 includes line 320, wire 415, 417, stop contacts ST, relay contacts R19a, holding coil of relay R19, relay contacts HS1a and wire 416 to line 321. Through somewhat similar connections and closure of contacts R20a, the holding coil of relay R20 is also energized. When the holding coil of R19 becomes effective, it acts to close contacts R19b so that the low speed clutch magnet LS is operated as follows: line 320, wire 415, contacts R19b, normally closed lower contacts R34b, normally closed contacts HS4a, magnet LS and wire 416 to line 321. The operation of the clutch magnet causes the feed connections to be established to the pin feed wheel so that the tape is advanced.

The tape is moved until the initial feed control perforation is encountered by the first sensing brush B1, and then a tape stopping circuit is established through the brush to hold the tape at the starting position. The circuit may be followed from line 320, through wire 415, circuit breakers 295, 296, common brush B13, through the conductive drum 231 and the hold *it* in the tape TP to brush B1, through wires 455 and 425, lower contacts R20d now closed by relay R20, wire 422, contacts R19d, relays HS4 and HS1, wire 416 and line 321. Relay HS4 then operates to open the contacts HS4a already mentioned as being in series with the clutch magnet LS and, when these contacts open, the clutch magnet is deenergized to terminate the tape feed.

The other control relay HS1 operates to open the contacts HS1a already mentioned as being in series with the holding coil of relay R19 and, when they are opened, both relays R19 and R20 are deenergized. Control relays HS1 and HS4 are deenergized by the opening of circuit breakers 295 and 296 which operate by the time that the platen clutch is latched upon the termination of the advancement of the tape.

As the restoration movement of the tape is taking place, the overflow control perforation is used to set up the relay R41 which closes contacts R41a in series with all of the tape brush relay contacts. The circuit for picking up relay R41 is made up with line 320, wire 415, breaker contacts 295, 296, common brush B13, cylinder 231, through the overflow control perforation in tape TP, brush B11, wire 462, switch S20, relay contacts HS3a, the pickup coil of relay R41, wire 416 and line 321. When set for handling inverted forms, and with switch S20 set to INV, then the "end" perforation in column 10 of the tape is effective through wires 482 and 483 to energize the pickup coil of relay R41. With relay R41 picked up by either control, a holding circuit for the relay is found on Fig. 20c and traceable through line 320, wire 429, contacts R31a, contacts R41c, holding coil R41, wire 409 and line 321. High speed relay HS3 is also called in to open contacts HS3a, Fig. 20b, and break the pickup circuit. Such a tape restoration cycle should be taken after the main switch is closed in order to energize relay R41.

Relay R41 closes contacts R41a to make the tape brushes effective until a form skipping operation is selected by energizing relay R31 which then opens contacts R31a, Fig. 20c, to deenergize relay R41 for a period extending to the time the end of the form is reached. Upon the passage of the end of every form, relay R41 is picked up to restore the tape brush circuit because of the possibility that a form skipping operation had disturbed the connection through contacts R41a. Contacts R20d are provided to energize relay R33 and drop the overflow relay R42 on tape restoring operations.

*Tape sensing brushes*

Before discussing further the nature of the controls for governing the advancement of the tape and the rotation of the platen, it is believed well to point out the significance of the arrangement of contacts associated with the tape sensing brushes. In Fig. 20b it is noted that to each of the first twelve brushes B1—B12 cooperating with tape TP there is attached a contact blade which is part of a normally open side of a pair of contacts. The closed sides of the twelve contacts related to the brushes are arranged in a cascade formation with the circuit connections for the twelfth brush B12 passing through all the normally closed contacts related to all the eleven other brush selecting contacts. In this way, each higher numbered brush is made dependent upon the normal condition of the contacts associated with all other brushes to the left of it. Accordingly, if the connections are selected for two brushes, the brush at the left, that is, the lower numbered brush, will always predominate as having a closed circuit path while the higher order brush has interrupted circuit connections.

The first ten brushes at the left are usually assigned for record strip stopping control. When there is some change in the operation of the tabulator which calls for a feeding operation, one of the brushes is selected to control the end of feeding which is to be terminated at a particular line on a record form. The line position is predetermined by the location of the perforation in the tape and this perforation is aligned with the particular one of the ten tape sensing brushes. Therefore, all that is necessary to control strip location is to provide circuit connections to that particular brush and at the same time initiate feeding. The operation of the platen is synchronized with the motion of the tape, and when the predetermined line is reached the brush extends through the tape and sets up a stopping circuit. The stopping control is usually arranged in a left to right order, that is, brush B1 controls the starting position for recording the very first line on a record form, brush B2 determines the starting position of the second printing block, and so on. In the example shown in Fig. 5, the first five brushes at the left are devoted to stopping control for location of heading information. The sixth brush selects the position of the first body or detail line, the seventh brush selects the predetermined total line, and the eleventh brush cooperates with the overflow position to cause skipping to the first body line of the following form.

It is noted in the foregoing that reference was made to the eleventh brush as selecting control for overflow operations. It is interesting to note that the connections to this particular brush are operative to cause initiation of feeding rather than stopping as usual in connection with the other brushes.

Another feature of the tape connections coordinated with the tape sensing brushes is the flexibility in skipping portions of the record form when the related record cards are missing. For example, if the four tape brushes B1 to B4 at the left are selected for stopping control for heading operations, should groups 2 and 3 of the heading cards be missing, then control is automatically skipped from the first heading block to the fourth heading block to leave the other two intermediate spaces empty in readiness for corrective printing without spoiling the record form.

It is already noted that the first ten brushes are used to determine stopping positions, but the last of these, brush B10, has a dual function in that it may be connected for detecting the end of a form when inverted forms are being used, that is, the reverse of the conventional arrangement which places heading printing above detail or item printing. On inverted forms, the first body line appears near the top of the form and is followed by a series of item printing positions and a total position before a number of heading lines near the end. A tape perforation in line with brush B10 can be arranged to provide detection for the end of an inverted form.

It is already explained that brush B11 is used to detect a tape perforation coinciding with the overflow line near the end of the form to prevent printing too many item lines on one form and continuing into the heading space of the following form. Brush B12 is provided to sense tape perforations calling for unusual line spacing arrangements. The ordinary one, two or three line spaces between printing lines is selected by operation of switch lever L (Fig. 20b) to connect with either of the three brushes B13, B14, or B15, but if some other unusual line spacing arrangement is desired, then the tape is perforated in alignment with brush B12 to get such spacing control.

Brush B13 is used at all times as a common contact member in association with a conductive part of the tape carrying drum 231. It conveys impulses for all tape feeding control, in addition to the use for single line spacing control.

First card-tape feed interlock

A number of relays are provided to open certain circuit connections before the first card is under the lower brushes and to prevent tape feeding until the first line of print is recorded. As the first card is passing the upper brushes UB (Fig. 20e), the contact LCLC closes and cam contacts CF6 also close near the middle of the cycle to energize relays R3 and R4 as already noted. Relay R4 closes contacts R4b in series with the pickup coil of relay R9. Near the end of the first cycle, cam contacts CF22 close and relay R9 is energized by the circuit from line 320, through circuit breakers CB1—CB4, wire 328, contacts R4b, wires 373, 427, contacts CF22, wire 428, pickup coil R9, wire 333 and line 321. Relay R9 then closes holding connections as follows: line 320, wire 336, contacts R4c, R9a, holding coil R9, wire 333 and line 321. In parallel with contacts R4c are intermediate group change contacts R70c for holding the control one extra cycle upon the coincidence of intermediate change with the appearance of the last card. Closure of contacts R9a also render effective relays R10 and R47 and prepare a circuit for pickup of relay R8 when cam contacts PM18 close as the first card passes under the lower brushes. Since the closure of contacts PM18 is too late to permit a line space impulse to affect the platen feed on the upstroke of the type bars, the first line is printed on the form in the position to which the form was inserted. The pickup circuit for relay R8 includes line 320, wire 336, contacts R4c, R9a, PM18, pickup coil R8, wire 333 and line 321. The holding coil for relay R8 is found near the bottom of Fig. 20c where it is seen to rely on relay contacts R10d and a series of normally closed tape selector contacts. The circuit for holding relay R8 is as follows: line 320 (Fig. 20c), wire 429, relay contacts R33b (opened at the end of a sheet feed skip), wires 430, 431, relay contacts R102c—R120c, wire 434, contacts R10d, R8a, holding coil R8, wire 409 and 321.

In Fig. 20a it is seen that relay R8 controls contacts R8b, R8c, and R8d for withholding heading skip control and line spacing control until the first card recording is made. Relay R9 also has contacts R9b and R9c, Fig. 20c, for governing selection of a brush for skipping control so that it awaits entry of the first card.

Line spacing control

As an accompaniment to every printing operation, it is desired to effect controls for line spacing the record strip and also for advancing the control tape to move in synchronism therewith. On every printing operation the PM cam contacts are operated and certain of these are devoted to control for line spacing. In Fig. 20a, it is shown that three such contacts PM10, PM11 and PM12 are situated in parallel connection and all in series with wiring leading to the pickup coil of relay R19, which, it will be remembered, controls selection of the low speed clutch magnet LS. These three PM cam contacts are timed differently to control the time that the line spacing operation takes place with respect to printing. The PM11 cam contacts are closed at a time while the type bars are moving upward and thereby cause an advance of the platen before printing takes place. Therefore, spacing which is controlled by the PM11 cam contacts is referred to as upstroke spacing. The other two cam contacts PM10 and PM12 are timed to close when the type bars are moving downward after printing has taken place. The spacing accompanying control by contacts PM10 is referred to as downstroke spacing accompanying the restoration of the printing bars. Contacts PM12 are used for space skipping and are effective whenever a tape brush is selected for what is usually a plural line movement of predetermined length.

The operation of line spacing is not only affected by the timing of the PM cams but it is also influenced by the setting of switch S2 (Fig. 20a) for listing or tabulating operation. When the switch is set for listing control there is an upstroke spacing operation on every listing cycle and on every totaling cycle. For final total cycles there is an upstroke spacing operation for the first and second total printing cycles.

When the switch is set for tabulating control there is an upstroke spacing operation on group indication cycles and also on intermediate and major total printing cycles. For final total control when set for tabulating there is upstroke spacing control for the first and second total cycles.

Downstroke spacing accompanies every total taking cycle when the switch is set for listing. When the switch is set for tabulating there is a downstroke spacing operation after every major total recording, and upon the printing of final totals there is a downstroke space after the second total cycle.

The timing of the line space control impulses is made accurate with respect to the tape feed because the circuit breaker wheels 285, 286, Figs. 15 and 16, are geared directly to the tape feeding drum 231 and proportioned to turn one revolution for each cycle of the pin feed. Wheels 285 and 286 have teeth for operating the breaker contacts 295, 296 to close 24 times in each cycle of operation of the tape feed wheel and commutator cylinder 241, Fig. 20b. When operating for single line spacing, the impulse through contacts 295 and 296 is used directly to terminate spacing. For multiple line spacing, the second or third closure of contacts 295 and 296 creates an impulse passing through the commutator segments 242c or 242 to stop the feed platen after two or three line spaces of movement. For space skipping, when the length of feed is determined by the location of a perforation in the tape TP, circuit breakers 295 and 296 also govern the time that the impulse is sent through the tape brush, for they are adjusted to close after each possible perforation position is at the brush line and thereby prevent sparking at the tape.

The common commutator segment 242a is normally positioned to be slightly advanced beyond the brushes B14 and B15, so that when feeding is initiated they make no contact until segments 242c or 242 are encountered.

Line spacing—upstroke

Whenever a group indication or listing cycle is taken, a circuit is initiated to start the platen moving for line spacing as follows: from line 320 (Fig. 20a), the circuit is directed through cam contacts CB52, relay contacts R8d, wire 437, wire 438, minor control contacts R63b normally closed, cam contacts PM11, wire 439 (Fig. 20b), the pickup coil of relay R19 and wire 416 to line 321. The pickup coil then operates to close associated contacts R19a for setting up the holding circuit for relay R19 through the stop contacts ST and the normally closed disabling contacts HS1a.

Relay R19 then closes contacts R19b in series with the low speed clutch magnet LS. The circuit for starting the rotation of the platen follows a path through line 320, wire 415, contacts R19b, lower contacts R34b closed as soon as the feed unit is made effective, normally closed contacts HS4a, magnet LS and wire 416 to line 321.

After the platen has been turned through an arc equal to one line space, the circuit breakers 295 and 296 close to send an impulse through relays for disabling the clutch magnet LS. The line spacing stop circuit is as follows: line 320, wire 415, circuit breakers 295 and 296, switch L set to select single spacing, wire 420, the normally closed left contacts R32b, the normally closed series of brush relay contacts R102b to R120b inclusive, wire 421, normally closed relay contacts R41a and R20c, wire 422, relay contacts R19d, control relays HS4 and HS1, and wire 416 to line 321. Relay HS4 acts to terminate the line spacing operation by opening the contacts HS4a in series with the clutch magnet LS. The spacing control relay R19 is also deenergized by the operation of relay HS1 which opens contacts HS1a in series with relay R19.

Referring to Fig. 9, it is seen that the operation of line spacing is made definite with regard to location of the record strip by operation of the detenting lever 176 which is coordinated with the energization and deenergization of clutch magnet LS, so that the pointed end 177 of the lever cooperates with the teeth 178 of the locating wheel 109, which is geared directly to the platen shaft.

When the switch L (Fig. 20b) is set to select a double spacing operation, the stopping circuit is almost the same as that already traced for stopping after single line advancement, the only difference being that the impulse from the circuit breakers is directed through brush B13 and through the conductive feeding drum 231 and over to one of the commutator spots 242c which cooperates with the brush B14 after a movement equal to two spaces. The circuit continues through the brush B14 down to the second switch terminal now engaged by lever L and then continues through the wire 420 and over to the high speed interrupting relays HS4 and HS1 as explained in the foregoing discussion of line space stopping.

When the connections are established for triple spacing, the stopping circuit is the same as that for double spacing with the exception that the brush B15 is switched into the stopping circuit and is effective when encountering a commutator spot 242 which is spaced around the periphery of the commutator at distances equivalent to movement of three line spaces on the strip.

Line spacing—downstroke

A number of line space initiating circuits are made as an aftermath of printing operations in listing and tabulating. Considering first the circuit established after item recording; the connections can be traced from line 320 (Fig. 20a), through cam contacts CB53, relay contacts R8d, wire 437, switch S2 in the list position, cam contacts CF13, wire 440, cam contacts PM10, relay contacts R34b closed whenever the skipping selection devices are dormant, wire 439 (Fig. 20b), relay pickup R19, wire 416 and line 321. The space selecting relay R19 then operates to call into action the low speed clutch magnet LS as already described with relation to upstroke spacing.

When the tabulator is set for tabulating operations and switch S2 (Fig. 20a) has been moved to the right of the position shown, then the line space starting circuit follows a somewhat different path, in that the cam contacts CF13 are out of the circuit path. Instead, the circuit continues through wire 438 and through the major space control relay contacts R59b and then over to wire 440 and continues on from cam contacts PM10 as already described.

After the platen starts rotating as the result of an impulse from the downstroke selection circuits, it is stopped by closure of the platen circuit breakers 295 and 296, through circuit connections already described hereinbefore with relation to stopping the feed after one or two or three line spaces of upstroke spaces.

Record card arrangement

In Fig. 2 an example of record card arrangement is shown to illustrate the difference between heading cards and heading card groups as distinguished from detail cards and the cards of other accounts. The cards are arranged in the order that they are introduced into the machine, the bottom card being the first to enter and the others following in succession. The first eleven cards at the bottom relate to one account and they bear a group number (not shown) which distinguishes them from the other eleven cards arranged at the top in Fig. 2. Within the groups the heading cards are distinguished from the detail cards by means of X perforations, all heading cards bearing a common heading perforation $hx$ in the 59th column position.

Within each group the heading cards are further subdivided into five groups which are distinguished by other X perforations $1x$ to $5x$. These are found in columns 61 to 65. Some of the heading card groups are composed of a single card. The reason why they are distinguished from other cards being that they carry recording information which requires space to set it apart from other name or address data. The card groups distinguished by X perforations $4x$ and $5x$ are seen each to comprise three records making up a complete name and address of three lines. In Fig. 5 is shown the printing arrangement produced by control governed by these special X perforations in the heading cards by means of electrical control devices about to be described. These heading control devices not only detect the changes between heading and detail cards, as evidenced by the presence or absence of perforation $hx$ (Fig. 2) but also by the various positions of the subdivisions of heading cards as evidenced by the location of special perforations $1x$ to $5x$. These special distinguishing perforations instead of being present in the X hole position could be aligned in a single column and distinguished from each other by being placed in different digital positions, and then coordinated with the digit selector which then would be plugged to an upper brush reading the column bearing the different heading control digit perforations.

Heading control of record feeding

The machine is provided with means for sensing the special X perforations distinguishing the heading cards as they pass under the upper brushes and set up controls for selecting different tape sensing brushes to stop the record forms in position to receive the heading data. A main form of heading control is one in which the distinction between the heading and detail cards is determined by an upper brush in the 59th column (Fig. 2) for detecting the presence or absence of the X perforations $hx$ and thereby determining when the record cards change. As long as heading cards are presented and there is a reading of one heading card to the reading of another heading card, the control is designated as X—X control, and the detection of a change from detail to heading cards is hereafter designated as NX—X control, and the third determination of a change from heading to detail cards is hereafter noted as X to No X, or X—NX control. These three different heading control conditions are determined by relays influenced throughout two successive cycles by the continuance or termination of sensing of the X perforations, that is, if one X hole sensing is followed by a sensing of a second X perforation on the following cycle, it is a sign of continuance of the presence of heading cards and an X—X condition, while if a detail card is followed by a heading card there is a change from inactivity to activity of the controls signifying an NX—X change and the converse is true for a change from activity to inactivity for X—NX control.

Three relays are provided for detecting these heading control changes and in Fig. 20c it is seen that the relays R27, R28 and R29 are associated so that they are energized successively or not according to the continuance or change in the detection of X perforations in heading cards.

An actual example of heading card control may be explained by tracing the circuit connections established when the first heading card is encountered under the upper brushes. Then the first circuit is established through relay R27 by means of the following connections: from line 320 (Fig. 20e), the circuit passes through circuit breaker contacts CB1—CB4, wire 328, cam contacts CF17, relay contacts R2a, common brush 329, contact roller 330, the upper brush UB in the 59th column position, a plug wire therefrom to plug socket X20 (Fig. 20c), contacts XR1a closed in time to detect an X perforation, the second pickup coil of relay R27 and wire 443 to line 321. The associated contacts R27a are closed to direct the circuit through the holding coil of relay R27.

The holding circuit includes line 320 (Fig. 20d), cam contacts CB29 and CB30, wire 363 (Fig. 20c), contacts R27a, holding coil R27 and wire 443 to line 321. The holding coil remains energized until the latter part of the pickup circuit and in so doing picks up the second relay R28 by the circuit closed by cam contacts DT1a. The pickup circuit of R28 is similar to the holding circuit of R27 with the exception of the parallel connection through cam contacts DT1a. The holding coil of relay R28 remains energized beyond the midpoint of the next card feed cycle by the closure of cam contacts CF15 and CF16. The holding circuit for relay R28 is as follows: line 320 (Fig. 20d), cam contacts CF15 and CF16, wire 366 (Fig. 20c), contacts R28a, holding coil of relay R28, wire 443 and line 321.

Near the end of the second cycle, cam contacts CF29, Fig. 20c, close to provide a parallel connection in the last mentioned circuit for the energization of a pickup coil related to the third relay which is relay R29. A holding circuit is established through relay R29 and it remains energized until the cam contacts CB29 and CB30 open near the end of the third cycle. The holding circuit for relay R29 is directed through the associated contacts R29a and the holding coil and is similar to the holding circuit provided for relay R27, the difference being in timing as already mentioned by the successive closure of contacts XR1a, DT1a and CF29.

From the foregoing it is apparent that relay R27 is energized from the time the X perforation is sensed in the cycle during which the heading card is passing under the upper brushes. Relay R29 is energized late in the same cycle and remains energized during most of the next cycle, while the heading card is passing the lower brushes. Relay R28 serves to bridge the gap in timing between the operation of relays R27 and R29.

From the foregoing it is also apparent that the three relays serve to provide three different relay conditions whereby it is apparent how the relationship exists between heading and detail cards passing through the tabulator. For example, at a time when relay R27 is the only one of the three energized, it is a sign that the first heading card is encountered showing a change from NX to X. A second condition is the one wherein relay R29 is energized alone showing that relay R27 has been dropped out by the failure of heading cards to continue to be presented, and this is a sign of a change from X to NX. The third condition is one wherein heading cards continue to advance and relays R27 and R29 are both continuously energized signifying the condition X—X. A fourth negative condition is one wherein all relays are inactive, which is a sign of the advance of continuous detail cards, or NX—NX.

Heading and detail error detection

In addition to the three relays R27, R28 and R29 provided for the detection of heading changes, there are two other relays R25 and R26 provided for the detection of changes in card group numbers at times when the group numbers of passing cards should agree. In the normal state of affairs, the group numbers of heading cards agree with each other and also agree with the group numbers perforated in the related detail cards. However, there are times when errors are made in sorting and various mistakes in arrangement are presented wherein heading cards of unrelated accounts become mixed or heading cards of different accounts are grouped with unrelated detail cards or the detail cards in the same set disagree with regard to group numbers.

The object of the connections about to be traced is to not only detect the presence of unrelated cards in what should be a series of related heading and detail cards, but also to locate the point of the error, that is, are the unrelated cards found in the heading group, found between the heading and the detail group, or found within the detail group. The purpose of detection is realized because the group change determining devices are coordinated with the X—X, X—NX, NX—X, and NX—NX detecting devices previously mentioned, so that both the presence and the location of grouping errors are detected.

The circuit for the error detecting devices can be followed from line 320 (Fig. 20e), through cam contacts CB17 and CB18, and then through any of the contacts R129a—R167a, or contacts R130a—R168a, closed at times not coordinated with each other, thus indicating a change in group number, and then to a plug socket 445 having cross-plugging arrangements to other columns embracing the group number contacts, and from there through a plug wire to plug socket HC (Fig. 20c), the pickup coils of relays R25 and R26 and through wire 443 to line 321. Holding circuits are established for the two relays by connections including line 320 (Fig. 20d), cam contacts CB29 and CB30, wire 363 (Fig. 20c), holding contacts R25a and R26a arranged in parallel, the holding coils R25 and R26 also in parallel and wire 443, to line 321.

The operating controls for relays R25 and R26 are coordinated with the actions of relays R27 and R29 by means of a series of branch circuits found at the bottom of Fig. 20b and about to be described with relation to the selection of skipping control according to the changes and errors in heading and detail cards.

Skip selection by heading and detail card changes and errors

At the lower right hand corner of Fig. 20b, it is noted that there is a series of nine plug sockets extending from a cascade of contact connections narrowing down to a single line interrupted by cam contacts CB33. These plug connections are directional selecting devices for selecting one or the other of the tape sensing brushes to determine the stopping point of the record strip according to changes from heading to detail cards or vice versa, and also to skip form portions of the record strip which would be otherwise imprinted upon under control of record cards erroneously placed in association with cards of a different account.

The circuit connections are established by means of combinations of contacts operated by one or more of the relays R27 and R29 indicative of heading card changes, and contacts operated by relays R25 and R26 indicative of errors in grouping.

The top plug socket identified as X—X is concerned with the detection of continuous heading card control. As already explained, under "Heading Control of Record Feeding," when relays R27 and R29 are both energized, it is an indication of continuing heading card presentation. Following the connections from plug socket X—X it is noted that they pass through normally closed contacts R25e, normally open contacts R29e and normally open contacts R27c. This circuit is established when both relays R27 and R29 are effective during heading card presentation as already explained. Should an error in the heading group occur at such a time, then the relay R25 becomes effective to shift contacts R25e, opening them and closing contacts R25f to make the plug socket X—XE effective to provide an error control for skipping the record sheet.

The third plug socket NX—X is effective through relay contacts R25c, normally closed contacts R29d, and normally open contacts R27c. Operation of relay R27 alone indicates a change from detail to heading cards and at such times plug socket NX—X becomes effective. Upon the normal coincidence of a change in group control numbers at the time when progress is made from what is supposed to be the detail cards of one group to the heading cards of another group, then contacts R25c are opened and lower contacts R25d close to make the error plug socket NX—XE effective.

The fifth socket X—NX is made effective through contacts R26b, normally open contacts R29c and closed contacts R27b. Upon a change from heading to detail cards there is continued activity of relay R29 accompanied with inactivity of relay R27, and therefore contacts R29c close to make socket X—NX effective. An error in group control numbers between what should be related heading cards and following detail cards causes the operation of relay R26 and contacts R26c are closed to make the error plug socket X—NXE effective.

The three lower plug sockets NX—NXL for list control, NX—NXT for tabulating control, and NX—NXE for detail card error control are concerned with a fourth condition of the relays R27 and R29, i. e. when neither are energized, thus indicating the scanning of all detail cards and no heading cards. A card having no X perforation is followed by a card also lacking an X perforation, and the situation is concerned solely with detail cards. During such times there are encountered overflow conditions when too many items or totals are presented for the space allotted on one record form. A skip must be made from the body of one form, over the heading space of the next, to the body of the next form.

Overflow conditions are evidenced by the energization of relay R42 and the closure of contacts R42e in series with the sockets NX—NXL and NX—NXT. During listing control of the tabulator, there is a direct circuit path through normally closed contacts R27b, R29b and R26e, then through contacts R42e on the occurrence of an overflow, and the activity of any plugging to list socket NX—NXL.

During tabulating control (i. e. the printing of totals without item printing), the detection of overflow conditions awaits the taking of a minor or intermediate total as evidenced by the closure of contacts R65e or R70e before plug socket NX—NXT is made active. The circuit path is again through normally closed contacts R27b, R29b, R26e and R42e, but passed down through contacts R65e, or R70e and over to tabulating socket NX—NXT.

If an error in group control numbers should be detected while detail cards are being analyzed, then relay R26 becomes active to close contacts R26d. Since there is a connection to the normally closed contacts R29b and R27b, plug socket NX—NXE is made effective to carry an impulse to initiate form skipping.

In the foregoing description of the ways that the nine plug sockets X—X to NX—NXE are made conductive, it is pointed out generaly that they serve to select one of the ten tape sensing brushes B1—B10 and thus sense a tape perforation which is located to provide a record form stop for bringing the record sheet to a predetermined position suited to the change in the heading and error controls. Brush selection is not direct but passes through a series of relays, each group of which comprises a tape brush selector which is used not only for heading and error control but is also pluggable for skipping by digit selection, X distributor, upper brush, before and after total control, and group control. The brush selectors are to be described in the following section.

*Tape brush selectors*

In Fig. 20c it is seen that a dotted rectangular outline encloses a set of pickup and holding coils for relays R101 and R102. This is one of ten tape brush selectors provided in the machine. Although only the 1st, 2nd and 10th selectors are shown in Fig. 20c, it is to be understood that the seven other selectors are arranged, wired and operated in manners similar to those about to be explained with respect to the three shown.

Before describing the inner construction of the tape brush selectors, it is believed well to point out the relationship between the selectors and the contacts in series with the tape sensing brushes shown in Fig. 20b. Referring to the first selector, it is noted that the relay therein is identified as relay R102 and that is the same designations as borne by the related contacts R102b (Fig. 20b) in alignment with the first sensing brush B1 at the left of the line of tape sensing brushes. Then referring again to Fig. 20c, it is seen that the second tape selector contains relay R104 which is the operator for the contacts R104b (Fig. 20b) aligned with the second tape sensing brush B2. This relationship continues for all ten selectors so that the selector shown near the bottom of Fig. 20c contains the relay R120 which is the operator for contacts R120b (Fig. 20b) connected with the tape sensing brush B10 resting on the tenth line of tape indicia positions, which is sometimes used for inverted form-end detection.

Returning now to consideration of the inner construction of each tape selector, it is seen that the first tape selector has three plugging positions identified as D1, XR1, T1. The first two are connected to pickup coils of relay R101 which is the preliminary stage for operation of the control relay R102. The other plug socket T1 is connected directly to one of the pickup coils of relay R102.

The ten plug sockets, such as sockets D1, are used in a number of ways to pick up skipping control impulses from various sources in the machine for controlling skipping of the record forms to the positions corresponding to the kind of function made evident by the source of the impulse. For example, the digit selector in any of its positions may be connected to any of the selector sockets D1—D10 to select a record form line predetermined by the digit perforation in the record card. As another form of control, the D1—D10 sockets can be selectively plugged to sockets MI', INT' or MAJ' (Fig. 20e) for group control selection of record skipping after the printing of minor, intermediate or major total. Then, too, the D1—D10 sockets can be selectively plugged to any of the heading control outlets, such as NX—X (Fig. 20b) or error sockets such as NX—XE error. Other sources of control are derived from the X distributors or class selectors.

The second set of pluggable sockets XR1—XR10 associated with the tape brush selectors are controlled within closer limits, because the pickup coil of relay R101, for example, is in series with contacts R37a closed only during that interval when X perforations are passing under the record card sensing brushes. The connection from socket XR1 is pluggable directly to an upper brush socket such as socket 446 (Fig. 20e).

The third set of plug sockets T1—T10 are used primarily for before total skipping, that is, they operate before total printing so that the desired line is brought into position before recording. The plugging connection is, for example, from socket T10 (Fig. 20c) to a plug socket such as MI'', INT'', MAJ'' (Fig. 20e). The same sockets T1—T10 are also used in connection with any control outlets shown at the lower right hand corner of Fig. 20b.

The control of the selector is believed best illustrated by taking an example and in this case one may be taken in conformity with the grouping of the cards as shown in Fig. 2 and the arrangement of the printed matter as shown in Fig. 5. In connection with these two last mentioned figures, it is noted that, after the consideration of detail cards in connection with the first account, it is desired to skip from form to form to print the first heading line of the second form. In other words, this is an NX—XE form of control as governed by the heading control relays and contacts shown at the bottom of Fig. 20b. Referring to Fig. 3, it is noted that selection of the first tape sensing brush B1, that is the one at the left, will call into use a perforation it found in the 6th line space position, which is the position in which it is desired to have a newly presented record form stop to receive the first heading impression.

Referring to Figs. 20b and 20c, it will be assumed that a plug wire is connected between socket NX—XE and D1 of the tape brush selector. Then, upon a change from detail to heading cards the relay R27 will be energized to close contacts R27c and the brush selector circuit will be set up as follows: from line 320 (Fig. 20a), the circuit continues through wire 346, lower card lever relay contacts R3a, wire 447, the first card controlled contacts R8c, wire 448 (Fig. 20b), cam contacts CB33, relay contacts R27c, R29d, and R25d, the plug socket NX—XE, plug wire to socket D1 (Fig. 20c), the second pickup coil of relay R101 and wire 409 to line 321. A holding circuit is established for relay R101 by contacts R101a, at the same time that a pickup circuit is established for relay R102, through contacts R101b. The circuit for the holding coil of relay R101 includes line 320 (Fig. 20c), cam contacts CF30, wire 449, wire 450, holding coil R101, contacts R101a, and wire 409 to line 321.

The pickup circuit for relay R102 passes through minor and intermediate relay contacts which operate at times to open and delay skipping when one or two totals are to be printed as, for example, on the predetermined total line shown in Fig. 5. The pickup circuit for relay R102 includes the following connections: line 320 (Fig. 20c), cam contacts PM9, relay contacts R9c closed after the presentation of the first card, total contacts R63a and R58a, wires 452, 453, contacts R101b, the second pickup coil of relay R102, wire 454 and wire 409 to line 321. Relay R102 then prepares a holding circuit by the closure of contacts R102d. The circuit includes line 320, wire 429, contacts R33b opened at the end of the skipping operation, wires 430 and 431, contacts R102d, the holding coil of relay R102 and wires 454 and 409 to line 321. The operation of the holding coil to close contacts R102d not only serves to close contacts R102b, Fig. 20b, to select the proper tape sensing brush but it also breaks the connection at R102c, Fig. 20c, which is in a circuit normally sustaining the operation of relay R34, which is used to close contacts R34a, Fig. 20a, to initiate the movement of the tape and platen for skipping control.

Referring to Fig. 20b, it is seen that energization of relay R102 causes closure of contacts R102b, placing the brush B1 in a circuit which is perfected upon the sensing of the tape perforation 1t in the first column. At the same time that the brush is selected, the skipping movement is initiated by the closure of contacts R34a (Fig. 20a) because relay R34 is deenergized by the selecting action of relay R102 as already mentioned. The circuit for establishing clutch connections to initiate feeding is as follows: line 320 (Fig. 20a), cam contacts CB54, wire 442, cam contacts PM12, relay contacts R34a, wire 439 (Fig. 20b), the pickup coil of relay R19 and wire 416 to line 321. Relay R19 is then sustained by connections already mentioned and also acts to close contacts R19b in series with the high speed interposer magnet HS. The feed initiating circuit includes line 320, wire 415, contacts R19b, contacts R34a, normally closed overflow contacts R42c, magnet HS and wire 416 to line 321. Interposer magnet HS then closes contacts 217 to call in the clutching magnet LS. Magnet LS then operates to close the clutch connections between the motor and the platen drive shaft to rotate the platen and at the same time advance the record tape. As the record strip moves from form to form to bring the first heading line into position, the tape perforation 1t moves towards brush B1 (Fig. 20b) and, when a circuit is established through the tape, the clutch connection is broken and the record strip and tape stop in the selected position.

The stopping control circuit includes line 320, wire 415, circuit breakers 295, 296, common brush B13, the conductive portion of the tape drum 231, through the perforation in the tape and through brush B1, wire 455, contacts R102B, wire 421, contacts R41a, contacts R20c, wire 422, contacts R19d, relays HS4 and HS1, wire 416 and line 321. Relay HS1 then opens contacts HS1a in series with holding coil of relay R19, thereby deenergizing the relay and causing it to open contacts R19b in series with the clutch magnet LS and interposer magnet HS so that skip feeding is terminated at the 6th line which is the first heading line.

The high speed relays HS1 and HS4 are used to cause a fast breakdown of the tape sensing circuit by deenergizing relay R19 and opening contacts R19d before the tape brush leaves the tape perforation.

In this foregoing example, the D1 plug socket was used rather than the T1 socket because it was known that a total was to be printed on the predetermined total line since a group change accompanied the detail to heading change NX to X and the skip to the first heading line was to occur after the predetermined total was printed. Under such conditions, the relay R102 cannot be picked up until after the total is printed, because the minor relay contacts R63a prevent a brush selecting circuit from taking place until after the total is printed. If an intermediate total should have followed the minor predetermined total, then intermediate control contacts R68a would have delayed the pickup of relay R102 for the second total printing cycle.

When there is an NX—X heading change and a group control change at the same time, the total taking control of skip takes precedence over the heading control. For example, with the plug socket MI", Fig. 20e, plugged to T10, Fig. 20c, for a predetermined total line, and plug socket NX—X, Fig. 20b, plugged to D1 for a skip to first heading line, then upon concurrent actuation of both controls the total control takes precedence in calling in relay R120 directly, Fig. 20c, while relay R101 is inactive for total cycles because the pickup circuit for the related brush selection relay R102 relies upon group control contacts R63a and R68a opened until minor and intermediate totals are printed. In a similar manner, all total selections of tape brushes take precedence over other selections to the XR and D sockets of the tape selectors.

Although the example of plugging to D1 is taken in connection with heading control, it will be realized that other sources of control, such as the group control devices, the digit selector, X distributors, class selectors, etc. are also effective to initiate skipping upon a change in control.

As an example of selection skipping by direct plugging to the upper brushes, it may be noted in connection with the showing of the cards in Fig. 2 that plugging from a socket, such as socket XR2 (Fig. 20c) may be made directly to the upper brush socket in line with column 61, so that the X perforation 2x on the second heading card may be detected as it passes under the upper brushes and a circuit established thereby to the pickup coil of relay R103 to set up a train of events resulting in the final effectiveness of relay R104 to select brush B2 in cooperation with the tape which is provided with a perforation 2t (Fig. 3) to determine that the second heading line is to be at the tenth position as noted in Fig. 5.

Other tape brush selectors can be plugged to upper brushes for detection of X perforations 3x, 4x and 5x (Fig. 2) to determine the stopping positions for location of the first line of different heading sections on the record form. All of these heading perforations could be eliminated if a single column is devoted to skipping control as determined by the digit selector, and in such case the digit perforations 1—5 could be used and the digit selector plugged to the second to sixth tape brush selectors (Fig. 20c) to get the desired skipping control for head spacing.

The control which is to be exercised when there is a change from heading to detail cards, that is, X—NX control, occurring between the last heading line and the first body line, is effected by plugging between X—NX (Fig. 20b) to T6 (not shown among the three selectors on Fig. 20c), which is the sixth tape brush selector required for the example shown in Figs. 2 and 5. Since the first five selectors are used for initial stopping and heading stop controls, the sixth selector may be used for stopping at the first body line. The circuit for selecting a skip to the first body line is as follows: line 320, Fig. 20a, wire 340, contacts R3a, wire 447, contacts R8c, wire 448, Fig. 20b, cam contacts CB33, contacts R27b, contacts R29c, contacts R26b, plug socket X—NX, plug wire, the "T" socket of the sixth brush selector (not shown in Fig. 20c), through a relay R112, wire 409 and line 321. Relay R112 is operated to establish a holding circuit through connections similar to those already traced with regard to contacts R102d and R104d, and it also serves to deenergize relays R34 and R35 to initiate skipping control.

Relay R34 when deenergized permits the closure of contacts R34a (Fig. 20a) to establish the circuit through the pickup coil of relay R19 for initiating feeding as already explained. The other skipping control relay R35, when deenergized, allows the closure of contacts R35b (Fig. 20b) for setting up part of a circuit which utilizes a relay R33 and contacts R36a that are associated with a relay for controlling restoration of relays at the end of the skipping operation. Relay R36, it will be noted, is arranged in parallel with the clutch magnets LS and HS and becomes energized by the closure of relay contacts R19c whenever relay R19 is deenergized to call for a termination of skipping.

Upon energization of relay R19, preparations are made thereby not only for strip advancement but also for strip stoppage and relay restoration in readiness for a new strip feed control. Contacts R19d, Fig. 20b, are closed in preparation for a circuit to cause stoppage by the action of relays HS4 and HS1. Other contacts R19c are opened to deenergize the normally energized relay R36 which controls the relay R33 that is effective immediately upon sensing a tape stop perforation for deenergizing the tape selector relays and quickly reestablishing the skip control relays. Deenergization of relay R36 allows closure of contacts R36a in series with relay R33 and preparation for a holding circuit therefor through the associated contacts R33a. When relays HS4 and HS1 are energized by the tape perforation for stoppage, relay R33 is also energized through wire 458, contacts R35b and wire 416. As soon as relay R33 is effective to close contacts R33a, a holding circuit is established from line 320 Fig. 20b, wire 457, contacts R36a, contacts R33a, relay R33, wire 416 and line 321. Operation of relay R33 causes the opening of contacts R33b, Fig. 20c, to deenergize any selected tape brush selector relay R102—R120, and prepare all selector relays and skipping control circuits for other operations.

The holding circuit for relay R33 is quickly reopened at the end of the skipping operation by the energization of relay R36 which is called into operation when relay R19 is deenergized by the action of relay HS1. The deenergization of relay R19 allows the closure of contacts R19c and a circuit is directed through relay R36 from line 320, through wire 415, contacts R19c, wire 461, relay R36, and line 416 to line 321. Relay R36 then opens contacts R36a and, since the effectiveness of relay R33 is already established by the disablement of the tape selector relays, the parts are restored in readiness for another selection operation.

The disabling of relay R33 at the end of the skipping operation also serves to allow the closure of contacts R33b (Fig. 20c) to reenergize relays R34 and R35 in readiness for another tape brush selection operation.

Referring back to the control selected by a change from X to NX and the energization of relay R112, it is noted in Fig. 20b that activation of this relay causes closure of contacts R112 and the selection of brush B6 in a feed stopping circuit, which is completed when the tape perforation 6t (Fig. 3) is encountered by the brush. This coincides with the placement of the 31st line on the record form at the printing position as noted in Fig. 5, where the first body line is directly under the heading line of the record form designed for "Description" of the articles sold.

After the form is skipped to the first body line, a number of items are recorded and line spacing takes place in connection with each recording as explained hereinbefore. Upon the occurrence of a group change, plugging to the skip controls are effective to advance the record form to a predetermined total line to receive the impression of the total amount.

Assuming that a minor total is to be printed on a predetermined line, the minor control socket MI" (Fig. 20e) can be plugged to a socket T7 (not shown among the selectors in Fig. 20c) controlling the selection of the brush in the seventh position to cooperate with the perforation 7t (Fig. 3) which is presented when the record form advances to the 45th line.

After a minor group change occurs, a circuit is completed at about 244° in the cycle and it passes through line 320 (Fig. 20e), circuit breakers CB1—CB4, cam contacts CB22 and CB23, the normally open minor relay points R63d, interlock relay points R40a, first card control contacts R10a, socket 397 and a plug wire to T7 socket (similar to the other T sockets in Fig. 20c), and through a selection relay R114 and wire 409 to line 321. The circuit for holding relay R114 energized is found in Fig. 20c to include line 320, wire 429, contacts R33b, wires 430 and 431, the normally closed contacts R102c, R104c, etc. to the closed contacts R114d (not shown), and then through relay R114 and wire 409 to line 321. This circuit will be maintained until the end of the skipping operation, at which time relay R33 becomes effective to open contacts R33b.

The operation of relay R114 in opening the normally closed connections of relays R34 and R35 causes the initiation of the skipping operation because it will be remembered that closure of contacts R34a (Fig. 20a) permits the selection of the clutching relay R19 when cam contacts PM12 close.

The total skipping circuit is from line 320, Fig.

20b, through wire 415, shifted contacts R19b, contacts R34a, normally closed contacts R42c, the high speed interposer magnet HS and wire 416 to line 321. Magnet HS then closes the high speed clutch contact 217 and a parallel circuit goes through contacts 217 and HS4a to clutch magnet LS to connect the feed drive.

The clutch connection being established, the platen and tape start to move and continue to advance until the perforation 7t aligned with the tape brush B7 appears under the brush and then the stopping circuit is established as follows: line 320, wire 415, circuit breakers 295, 296, brush B13, drum 231, through the perforation 7t in tape TP, brush B7, wire 460, contacts R114b, and then in series through the normally closed contacts R112b, R110b, R108b, R106b, R104b, R102b, and wire 421, contacts R41a, R20c, wire 422, contacts R19d, relays HS4 and HS1, wire 416 and line 321. The opening of the contacts of relay HS4 deenergizes the low speed clutch magnet LS while the opening of contacts controlled by relay HS1 deenergizes the holding coil of relay R19. Energization of relay R33 by the deenergization of normally energized relay R36 and closure of contacts R36a with a subsequent stopping control cause a circuit for ending the skip feeding controls to be established from line 320, Fig. 20b, through wire 457, contacts R36a, contacts R33a, the coil of relay R33, wire 416, and line 321. The operation of relay R33 causes the opening of contacts R33b (Fig. 20c) to deenergize relay R114 and prepare the brush selector and skipping control circuits for subsequent operations. The record strip is stopped with the total line position at the printing line to receive the total impression, after which another skipping operation is initiated by either the NX—X control or minor socket MI' to DI to advance the strip to the first heading line of the next form.

Although in most instances there is only one tape perforation selective of a certain record form position, there are times when alternate controls are provided for selecting the same line position. Under such conditions a number of the tape brushes B1—B10 are allotted to the various kinds of control, but all of these brushes are aligned with tape perforations at the same line position. For a similar sort of control, multiple plugging can be resorted to by using multiple sockets DI, XR1, T1 and at any of the other control positions. Plug wires in the shape of a Y are also used for joint control.

*Error controls*

As already noted in connection with the description of heading controls, errors in the arrangement of the cards is detected with regard to placement among or between the heading and detail cards. The detection of such errors is to be utilized to cause motion of the record forms to allow blank spaces which may be filled in later to remedy the errors caused by mistakes in card arrangement. Various examples of such skipping control from the "error" plug sockets are about to be explained.

Assuming that an error occurs among heading cards made evident by the activity of any circuit plugged to the socket X—XE. In other words, not all the heading cards are perforated with the same account or group number and there is no intervening detail cards between the groups of disagreeing heading cards. By plugging from the X—XE socket to any D1—D6 or T1—T6 (Fig. 20c) socket the form will be ejected to the desired heading line on a new record form. This socket is therefore usually plugged to the DI or TI sockets of the first tape brush selector, so that the differing heading impressions are made on the top of a second record form, while the first form remains plain as to the kind of detail material which may be filled in later.

Another error is made evident by the energization of connections to the X—NXE socket which indicates that an unrelated group of detail cards follows a certain heading group. In other words, the group of detail cards, which should follow the heading cards that have already been sensed under the lower brushes, is missing. Likewise, the group of heading cards is missing for the group of detail cards, the first of which has just passed through the upper brushes. In connection with such an error, it is usually desirable to skip over the body of the first form and the heading of the second form and permit printing to start with the first body line on the second form. In the printed example already noted, the plugging would be from X—NXE to D6 or T6 and to FS to secure the proper skipping control.

The error control of NX—XE is one which is normal with the conventional arrangement of the printing on a record form, that is, the change from detail cards of one group to the heading cards of another group is usually a normal change rather than an error. However, this control is provided because there are times when an inverted arrangement is desired in order that the detail cards precede the heading cards of the same group as pointed out later in connection with a full discussion of inverted form control. In connection with conventional arrangement of the forms, this error control could be used as an alternative to selection by group change which is sometimes used to activate the first tape brush selector by plugging to DI or TI.

Another error is made evident by the activation of socket NX—NXE which is made capable of emitting an impulse when an error occurs in a detail group. In other words, not all the detail cards are punched with the same account or group number, and there are no intervening heading cards between the disagreeing detail cards. Here again the plugging may be made to a tape brush selector socket such as D6 to restart detail printing on the body portion of a second form.

*Overflow ejection*

The heading and error controls discussed hereinbefore are concerned with changes occurring while printing takes place on the heading and body portions of the same record form. Another condition is presented when the end of one form is reached and there still remain items relating to the same account to be recorded. At such times it is desirable to skip over the heading area of the second form and restart item recording on the body portion of the second form. In Figs. 4 and 5 it is noted that the scale SC (Fig. 4) is marked on line 44 with the dot 7s to correspond with the position near the end of the first record form and just before the predetermined total line thereon. This is the position selected as the overflow ejection point up to which items are rerecorded before an overflow ejection operation takes place.

Referring to the control tape shown in Fig. 3, it is seen that the corresponding 44th position bears a control perforation 7t which is the overflow control perforation. This perforation is aligned with the 11th tape sensing brush B11 (Fig. 20b) which is provided for overflow control.

It will be noted that the control effected by the tape perforations 7t for overflow ejection differs from all those stopping controls discussed hereinbefore in that the effect it has is for the purpose of starting an advance of the record strip rather than causing the termination of its movement as heretofore.

Assuming that the end of a record form is reached and that the tape moving along therewith has arrived at the point wherein the overflow perforation permits the establishment of a circuit through the overflow controls, the initiating circuit may be traced as follows: line 320 (Fig. 20b), wire 415, circuit breakers 295, 296, brush B13, drum 231, overflow perforation 7t, brush B11, wire 462, relay contacts R34d, relay contacts HS2a, pickup coil of relay R42, wire 416, and line 321. A holding circuit is established immediately for relay R42 because it is desired to avoid arcing at the overflow control perforation by a rapid break in the pickup connections already traced. The holding circuit includes line 320 (Fig. 20c), wire 429, contacts R33b, wire 430, contacts R42a, the holding coil of relay R42, wire 409, line 321. At the same time that the holding circuit is made for relay R42, the high speed relay HS2 is also energized by the closure of contacts R42b and the result is that the contacts HS2a (Fig. 20b) in series with the pickup coil of relay R42 are opened immediately after the actuation of the pickup circuit.

The effect of the energization of relay R42 is noted in the connections near the bottom of Fig. 20b, where it is seen that the contacts R42e associated with the NX—NX control sockets become effective to select one of the tape brush selectors plugged thereto. Assuming that the overflow is to cause movement of the record sheet to the first body line of a second form, then the plugging is from socket NX—NXL to D6 of the sixth selector, which is similar to the three selectors shown in Fig. 20c. The circuit for the overflow control is as follows: from line 320 (Fig. 20a), through wire 340, contacts R3a, wire 447, contacts R8c, wire 448 (Fig. 20b), cam contacts CB33, relay contacts R27b, R29b, R26e, R42e, plug socket NX—NXL, plug wire to socket D6, and then through pickup relay R111, wire 409 and in line 321. When cam contacts PM9 close, the brush selector relay R112 is picked up provided there is no accompanying group change to influence relay contacts R63a or R68a. The circuit is then from line 320, through cam contacts PM9, relay contacts R9c, R63a, R68a, wire 452, and through the pickup contacts R111b (not shown) through the pickup coil of relay R112 and over to wire 409 and line 321.

The holding circuit for brush selector relay R112 is of the usual form comprising a path through the contacts R33b and the series of normally closed contacts R102c, R104c, etc. The establishment of a circuit for the holding coil of relay R112 acts in the usual manner to deenergize relays R34 and R35.

Relay R34 when deenergized by any tape brush selection always prevents overflow ejection by the opening of contacts R34d (Fig. 20b) to disable the pickup circuit for relay R42.

The platen movement is initiated by the deenergization of relay R34 and the closure of contacts R34a to energize the pickup coil of relay R19. The circuit includes line 320 (Fig. 20a), cam contacts CB54, wire 442, cam contacts PM12, relay contacts R34a, wire 439 (Fig. 20b), pickup coil of relay R19, wire 416 and line 321.

The feed initiation circuit is directed through the low speed drive by the action of overflow relay R42 (Fig. 20b) in closing contacts R42b normally open in series with the low speed clutch magnet LS. The circuit is from line 320, through wire 415, contacts R19b, contacts R34a, relay contacts R42b, HS4a, clutch magnet LS, wire 416 and line 321.

The platen rotates and the control tape advances until the perforation 6t (Fig. 3) encounters the selected sensing brush B6, Fig. 20b, which was made effective by the action of relay R112 in closing contacts R112b, as noted in the foregoing sections. The stopping circuit follows the familiar course through the cascade formation of tape brush contacts and through wire 422 (Fig. 20b) and through the stopping control relays HS4 and HS1. Operation of the contacts HS4a serves to deenergize the clutch magnet LS and stop the platen in the position presenting the first body line of the second form at the printing line.

Relay R33 is picked up at the end of the skipping operation and serves to open contacts R33b to terminate the tape brush selection control. Relay R36 also comes into play to deenergize relay R33, so that the skipping controls are restored in preparation for subsequent operation.

In the example of overflow control considered while tracing the connections mentioned in the above sections, it was assumed that the tabulator was set for listing. There is another condition somewhat similar when use is made of the socket NX—NXT (Fig. 20b) effective on tabulating control cycles. The socket mentioned becomes effective only on total cycles if the overflow line is reached by the recording of totals. Thus, when tabulating, the minor total impression will be printed in alignment with the related group indication before ejection takes place from form to form. If an intermediate control change occurs along with the minor change and it is desired to print the intermediate total immediately below the minor total and not on the next form, then the control plugging should be to D6 instead of T6 of the tape brush selectors. The reason for this is that plugging to T6 is directly active in the brush selection relay group, while all the D sockets lead to the subordinate stage of relay selection, which stage includes the minor and intermediate contacts R63a, Fig. 20c, and contacts R68a.

The overflow control is disabled or superseded when there is a skip to the predetermined total line. Looking at the tape TP, Fig. 3, it is noted that the overflow indicium 7t is encountered one space before the predetermined total line indicium 8t. However, at the times when the feed of the record strip and tape is toward the predetermined total line (because of a group change, error, or other control), the sensing of the overflow control perforation is made ineffective, for at such times the heading space of the second form is not to be skipped. Upon the selection of brush B7 (probably by a group change and plugging from T7 to M1") for a feed to the predetermined total line, relay R34 is deenergized with the result that contacts R34d, Fig. 20b, are opened to prevent the energization of overflow control relay R42 when brush B11 senses the overflow perforation.

The overflow control of the tape may be used to call in a total taking operation of the tabulator. For such control the overflow control socket NX—NXL, Fig. 20b, can be Y plugged to the tape brush selector socket T7 for selecting tape brush B7 to stop strip feeding at a predetermined total line, and also to the minor control socket MI, Fig. 20d, in series with the pickup coil of relay R53. As noted hereinbefore, activity of relay R53 causes the tabulator to act as upon the occurrence of a minor group change to print a total on the strip. For tape feeding control after total recording, plug connections can be made from socket MI', Fig. 20e, to DI or D6, Fig. 20c, for a skip to a first line of a second form. When the minor control devices are so used for tape introduction of totals, the intermediate and major controls can be operated by the usual card comparing devices.

*Short skip controls*

The suspension of card feeding is the usual accompaniment of skipping control. This hesitation in tabulator operation is provided to allow time for the record strip to move into position before recording is resumed. The control is usually effected by deenergization of relay R34 with every skip selection and the consequent opening of contacts R34c (Fig. 20a) in series with the card feed clutch magnet controls.

The object of the short skip controls is to neutralize the interlock for suspending card feeding and instead provide for the continuous operation of card feeding in the tabulator when the skipping operation is of such a limited extent that it can be accomplished between card feed cycles. A pair of relays R23 and R24 shown in the upper right hand corner of Fig. 20c are provided for effecting the short skipping control which is to be plugged to any feed selector calling for the movement of the record form less than 3 and ⅔ inches. It has been found that such a skipping movement can be accomplished without the necessity for interrupting the card feed.

As one example of short skip control connections, the heading control socket X—X (Fig. 20b) may be connected to socket 464 (Fig. 20c) in alignment with one of the pickup coils of relay R23. This can be done because the skipping operations between heading to heading impressions are usually short distances as noted in Fig. 5. The example may be carried out by tracing a circuit for this skip control as follows: from line 320 (Fig. 20a), the circuit continues through wire 340, relay contacts R3a, wire 447, contacts R8c, wire 448, Fig. 20b, cam contacts CB33, relay contacts R27c, R29e, R25e, plug socket X—X, plug wire to the socket 464 (Fig. 20c), the pickup coil of relay R23 and wire 443 to line 321.

A holding circuit is established for relay R23 as follows: line 320 (Fig. 20d), cam contacts CB29, CB30, wire 363 (Fig. 20c), contacts R23a, holding coil of relay R23, wire 443 and line 320. Referring back to Fig. 20a, and noting that relay R23 has contacts R23b arranged in parallel with contacts R34c, it is realized that the normal interlock for stopping card feeding during skipping may be overcome by the closure of contacts R23b during skipping, at which time contacts R34c are opened.

In a similar way, another such "short skip" control relay R24 has a pair of contacts R24b also arranged in parallel with interlock contacts R34c so that other short skipping controls may prevail to continue normal card feeding at the times when the skipping operations are of short duration.

*Group control suppression by heading cards*

There are times when it is desired to avoid the results of checking or comparing the group control numbers between heading and detail cards. The detection of X perforations may be utilized for this purpose by sensing the appearance of the heading cards under the lower brushes and setting up a relay for disabling the group control devices during the passage of the heading cards.

Referring to the lower right hand corner of Fig. 20c, there is seen a portion entitled "L Head Control" in which a relay R30 is seen to have a pair of pickup coils, the first of which is connected to a plug socket D21 which is used when the heading distinguishing impulses pass through the digit selector. The other plug socket X21 is used in connection with a second pickup coil which is made effective in connection with direct plugging to the lower brush column sensing the X perforations appearing on all heading cards. An example of a circuit for the detection of heading cards under the lower brushes is as follows: line 320 (Fig. 20e), circuit breaker contacts CB1—4, wire 328, cam contacts CF17, CF18, wire 346, lower contact, lever relay contacts R4a, common brush 345, the conductive feed cylinder 347, through the record card to a lower brush LB, a socket in connection with the lower brush sensing the card column bearing the X perforations and then through a plug wire to socket X21 (Fig. 20c), relay contacts XR2a closed during the interval of X position sensing, the second pickup coil of relay R30, wire 443 and line 321.

A holding circuit is established for relay R30 by connections involving line 320 (Fig. 20d), cam contacts CB29, CB30, wire 363 (Fig. 20c), holding contacts R30a, relay R30, wire 443 and line 321.

Referring to the upper right hand corner of Fig. 20d, it is seen that relay R30 when activated opens contacts R30b which is a series connection for the control contacts leading to the minor, intermediate and major pickup relays R61, R67 and R73. Therefore, if any change in group number is detected between heading cards and between the last heading card on following detail cards, the control is suppressed by the opening of contacts R30b, and the machine continues to operate as though there was no change between the successive cards.

The above mentioned control is useful in eliminating the need for perforating the heading cards with control group number perforations the same as related detail cards. Then too, it is useful in connection with printing inverted forms where a group change between the last heading card of one group and the first detail card of the next group is a change which should not cause a total cycle or clearing operation, because there is a coinciding X—NX change to take care of strip feeding from form to form.

*Form skipping*

Upon the occurrence of certain errors, such as X—NXE error (i. e., a group change between heading and detail cards of what should be a single account for one form), it is necessary to skip more than one form length. Due to the absence of related detail and heading cards of two successive groups, it is necessary to skip the body area of one form and the heading area of the next form.

It is already noted hereinbefore how the overflow control acts to skip the heading area. The overflow control perforation has another use in that it prepares the circuit connections for all the tape sensing brushes by establishing a circuit for a relay R41, which acts to close the contacts R41a, Fig. 20b, in series with all the brush selecting relay contacts R102b—R120b. Thus, an "End of Form" or "Overflow" control exercised initially prepares circuits for stopping control for all succeeding forms. When the overflow line is reached, a circuit for relay R41 is prepared as follows: line 320, Fig. 20b, wire 415, circuit breakers 295, 296, common brush B13, cylinder 231, the tape perforation coordinated with appearance of the end of a record form at the printing line, brush B11, wire 462, switch terminal CONV (for conventional forms as distinguished from inverted forms discussed hereinafter), switch S20, contacts HS3a, pickup coil of relay R41, wire 416 and line 321. Contacts R41c, Fig. 20c, are then closed and a holding circuit is set up as follows: line 320, wire 429, contacts R31a closed until form skipping is selected, contacts R41c, the holding coil of relay R41, wire 409 and line 321. Contacts R41b are also closed to energize relay HS3, which then opens contacts HS3a, Fig. 20b, to restore the pickup circuit of relay R41. The third set of contacts R41a are closed for stopping control and remain so conditioned until a form skipping operation is selected.

Form skipping control is selected by plugging from an error socket such as X—NXE to form skip socket FS, Fig. 20c, in series with relay R31. Then, upon an error in card arrangement between a heading group and a following detail group, relay R31 is energized and it opens contacts R31a to deenergize relay R41. The result is that contacts R41a, Fig. 20b, are opened and there will be no stopping control by any of the brushes B1 to B10, even though one of them is selected by plugging from X—NXE to D6 or T6 (not shown).

The sixth tape brush selector is energized and the related relay R112 shifts contacts R112b, Fig. 20b, but stopping is prevented by the previously opened contacts R41a in series therewith. However, the energization of selector relay R112 has the required starting effect through the opening of the series circuit R102c, R104c, etc., Fig. 20c, and the deenergization of relay R34 with the consequent closure of contacts R34a, Fig. 20a, and the picking up of start relay R19 when cam contacts PM12 close after the last heading recording.

Relay R19 then calls in magnet HS and the clutch magnet LS as usual and the feed continues for more than one form length, because the first sensing of the tape perforation by brush B6 is ineffective for stopping because of the opening of contacts R41a. The feed continues past the overflow line of the first form and at that position relay R41 is again picked up by brush B11 to close contacts R41a, so that the second encounter of the tape perforation 6t, Fig. 3, by brush B6 is effective to stop the sheet with the first body line of the second form at the printing line.

Feed start interlock

The feed space key contacts S, Fig. 20b, are ineffective for inducing a spacing operation while feeding is taking place under other controls. As soon as relay R19 is energized by any of the feed selection controls, associated contacts R19a are closed in series with the closed stop key contacts ST and the pickup coil of relay R46. Relay R46 then opens the normally closed contacts R46a in series with the pickup coil of feed control relay R19, so that it cannot be picked up by operation of the feed space key contact S. Contacts R46b are also closed in series with contacts S and the holding coil of relay R46, so that if key contacts S are held closed while relay R19 is deenergized, the feed key is ineffective for spacing and must be released to drop relay R46 before it is again effective.

Card feed stop

There are times when it is desired that occurrence of any of the error controls or other feed selection controls are to be drawn to the attention of the operator immediately, rather than have the controls skip some form length and continue in operation. A card feed stop relay is provided and made pluggable to any control socket.

Assuming, for example, that the error control X—XE, Fig. 20b, is to be effective, its socket will have a plug wire leading to either of the sockets 469 or 470, Fig. 20c, of the two pickup coils of a card feed stop relay R21. Upon energization of either coil, contacts R21a are closed and a holding circuit is established for relay R21 as follows: line 320, Fig. 20d, cam contacts CB29 and CB30, wire 363, Fig. 20c, contacts R21a, holding coil R21, wire 443 and line 321. Relay R21 then opens contacts R21b, Fig. 20a, to deenergize relay R12 which in turn allows contacts R12b to open and renders relay R11 ineffective to maintain the card feed clutch magnet CFCM through contacts R11b. Thus, card feeding is stopped and corrections can be made on the record forms.

For handling single sheets, i. e. individual forms for each account, time is allowed for insertion of a new sheet by calling in the card feed stop as an incident to the last skipping operation.

Selective spacing

Although the provisions are made for single, double and triple line spacing, there are cases requiring other spacing arrangements for wider separations, irregular spacing, etc. Such a wide choice of print arrangement is made possible by perforating the extreme right column of tape TP, Fig. 20b, in alignment with a stopping control brush B12.

Selective spacing is controlled by a relay R32, Fig. 20c, with a pair of pickup coils subject to energization by any of the heading, group change, total taking digit selection, X distributor or class selection controls. For direct regular spacing control, one of the plug sockets 472 can be connected to socket 471, Fig. 20f. For selective spacing under control of X punched cards, an X distributor switch, or class selection contacts, may be plugged between the socket 471 and the selective space socket.

Assuming that a class selection operation is to affect the special spacing, then a sample circuit will be as follows: line 320, Fig. 20e, circuit breakers CB1—CB4, wire 328, lower card lever relay contacts R4b, wires 373 and 427, cam contacts CF22, plug socket 471, a plug wire to socket 475, Fig. 20d, contacts R328b closed selectively, socket 476, a plug wire to socket 472, Fig. 20c, a pickup coil of relay R32, wire 443 and line 321. Contacts R32a are then closed and a holding circuit is prepared from line 320, Fig. 20d, through cam contacts CB29 and CB30, wire 363, Fig. 20c, contacts R32a, the holding coil of relay R32, wire 443 and line 321. Relay R32 then closes contacts R32b, Fig. 20b, to connect to brush B12 rather than to the wire 420 leading to the line space switch L which is now ineffective for ordinary line spacing because it has been moved to "Select" for tape control of spacing.

Sheet and tape movement is caused by the energization of relay R19 and clutch magnet LS in the usual way by the closure of cam contacts PM10 or PM11, Fig. 20a. When brush B12 senses a selective space perforation in the twelfth tape column, a stopping control circuit is set up from line 320, Fig. 20b, through wire 415, circuit breakers 295, 296, brush B13, cylinder 231, a space perforation in tape TP permitting brush B12 to contact the cylinder, wire 479, contacts R32b, normally closed contacts R120b-R102b in series, wire 421, contacts R41a, R20c, wire 422, contacts R19d, relays HS4, HS1, wire 416 and line 321. Relay HS4 then stops the feed by opening contacts HS4a, while relay HS1 deenergizes relay R19 by opening contacts HS1a.

Feed unit stop key

The tape stop key contacts ST, Fig. 20b, are normally closed and are operated only in an emergency to cause immediate stoppage of the platen, the record sheet and the control tape. Opening of contacts ST causes deenergization of relay R19 and opening of contacts R19b to deenergize magnet LS and declutch the drive to the platen and tape feed wheel. Operation of stop key contacts ST does not have any effect on the operation of the tabulator and, therefore, the key is normally not used after the tabulator is started.

Last card tape restoration

Devices are provided to restore the tape to the starting position after the last card has passed through the tabulator.

It is described hereinbefore how relays R9, R10 and R47, Fig. 20e, are energized for 1st card control. Relay R47 operates in conjunction with relay R9 to set up a distinctive circuit through a tape restoring relay R20 for last card control.

Assuming that last card control is desired, switch S10, Fig. 20d, is closed in series with upper control relay contacts R2a to induce group control totals on the passage of the last card. Then, when the last card passes the lower brushes, the lower card lever relay contacts R4c, Fig. 20e, open after printing but intermediate control contacts R70c remain closed. After the minor and intermediate totals have been printed, contacts R70c open and the holding coil of relay R9 is deenergized along with the pickup coil of relay R47. However, the holding coil of relay R47 remains energized (as seen in Fig. 20d) by the circuit with line 320, cam contacts CB29 and CB30, wires 363 and 364, contacts R47a, holding coil R47, wire 350 and line 321. It is this distinctive last card hiatus between the deenergization of relays R9 and R47 which is used to call relay R20 into action.

Turning to Fig. 20b, it is noted that the pickup coil of relay R20 is in series with the open contacts R47b and the closed contacts R9b, Fig. 20c. During machine operation the position of the two contacts is usually reversed. It is only on last card cycles that relay R9 is deenergized to allow closure of contacts R9b while relay R47 remains energized to close contacts R47b. Then a circuit is completed for relay R20 as follows: line 320, Fig. 20c, cam contacts PM9, contacts R9b, wire 480, Fig. 20b, contacts R47b, the pickup coil of relay R20, wire 416 and line 321. Then contacts R20a and R20b are closed; the latter to call in relay R19 and the former to provide a holding circuit for relay R20. The pickup coil of relay R19 is energized by the circuit: line 320, Fig. 20c, cam contacts PM9, contacts R9b, wire 480, Fig. 20b, contacts R47b, wire 424, contacts R20b, pickup coil R19, wire 416 and line 321. Relay R19 then closes contacts R19a to provide holding circuits for both relays R19 and R20. The holding circuit of relay R20 comprises line 320, wires 415 and 417, stop key contacts ST, contacts R19a, contacts R20a, holding coil R20, wire 416 and line 321. Relay R19 closes contacts R19b and the clutch magnet LS is operated to connect the platen and the tape to the driver for advancing the record sheet towards the first heading line position and also to restore the tape to the starting position.

Relay R20 has a third set of contacts R20d which are closed in series with the first tape brush B1 to select the first stopping position as governed by the tape perforation aligned with brush B1. The record sheet and tape advance until the perforation 1t, Fig. 3, comes under brush B1, Fig. 20b, and then the restoration stopping circuit is completed through line 320, wire 415, circuit breakers 295 and 296, common brush B13, cylinder 231, through perforation 1t in tape TP, brush B1, wires 455 and 425, contacts R20d, wire 422, contacts R19d, relays HS4 and HS1, wire 416 and line 321. With relays HS4 and HS1 energized, contacts HS4a and HS1a are opened to deenergize the clutch magnet LS and relay R19, respectively, and thereby halt the sheet and tape feeding operation with both elements in the initial or fully restored position as a result of the passage of the last card.

Forms of irregular lengths

It is possible to control the spacing of forms which differ in size from preceding and succeeding forms. A plurality of such irregular recurrent records can be considered as a unit and a control tape proportioned to take into consideration the various starting and stopping points on the forms and the disposition of the heading and detail data thereon.

For example, a long voucher record may be followed on the strip by a comparatively short check slip which is related thereto and of the same account. The control tape therefor is made in a unit length equal to the sum of the lengths of the related voucher and check. Feed control perforations are put in the tape to space for voucher items and check name, address and amount. If the check is a paycheck, the voucher detail lines can be itemized for tax deduction, bonds, insurance, Social Security, etc., and related lines would be skipped if an item card is omitted.

The voucher and check combination is one example of an inverted form wherein the name and address heading data on the check follows the item data on the voucher.

Inverted forms

There are some accounting needs which require that a record form be arranged with the items or detail information at the top and the name, address and other usual heading data at the bottom. In other words, the record is reversed or inverted with the heading printed after the items, amounts and totals. The sheet feeding controls already discussed are flexible enough to be plugged to take care of the feeding requirements of inverted forms.

It is assumed that the record cards containing the data which are to be printed in an inverted way are arranged in the proper sequence with the heading cards of a certain account following the detail cards of the same account. Then the X—NX and NX—X relationship varies from that found with the conventional forms, because with an inverted form an NX—X change is merely a change from the last detail card to the heading card of the same account and not coincident with a change from form to form. On the other hand, an X—NX change is not merely a change from heading to body portions, but is a change calling for a skip from form to form.

The various changes for skipping and spacing control are about to be discussed with relation to inverted forms.

The X—X socket, Fig. 20b, may be plugged the same as for conventional sheets, i. e., to a short skip socket 464, Fig. 20c, to prevent stopping the card feed while skipping.

The X—XE socket, which is active upon an error in grouping heading cards, calls for a skipping operation to the first heading line on a new form, i. e., to the mid-section of the second form rather than the first line. It will be remembered that on an inverted form the first line is a detail line and not a heading line.

The NX—X socket denotes changes from detail to related heading cards and so may be plugged to skip from the last item print line to the first heading line which is usually beyond the middle of the same form. If plugged to a D hub such as D5, a total, or totals, are printed at the bottom of the detail section of the form before skipping to the first heading line.

The activity of the NX—XE socket indicates that an unrelated group of heading cards follows a detail group. In other words, two sets of cards are missing; the heading cards related to the detail cards just sensed, and the detail cards for the heading cards about to be sensed. The NX—XE socket is plugged not only to select stoppage at the first heading line, but it is also plugged to the form skip socket FS, Fig. 20c, because the skip is to continue for more than one form length. For the inverted form of control, the tape TP, Fig. 20b, is perforated in the 10th (INVERTED FORM-END) column and coincident with the bottom of the heading section of the form.

It will be remembered that when socket FS, Fig. 20c, is made active, relay R31 serves to deenergize relay R41 and thus open contacts R41a, Fig. 20b, to prevent stopping at a first heading line immediately after error detection. Instead, skipping continues until relay R41 is again energized by the sensing of the form end perforation in column 10. Then a circuit is completed through line 320, Fig. 20b, wire 415, circuit breakers 295, 296, brush B13, cylinder 231, an "INVERTED FORM END" perforation in tape TP in the 10th column, brush B10, wires 482 and 483, switch terminal INV to which switch S20 is set for inverted control, relay contacts HS3a, pickup coil of relay R41, wire 416 and line 321. Relay R41 then not only closes contacts R41b and R41c, Fig. 20c, to break down the pickup circuit and establish a holding circuit, but it also closes contacts R41a, Fig. 20b, to reestablish the stopping control circuit which is effective through a selected tape brush to stop the second form to receive printing on the first heading line past the middle of the form.

Another change during inverted form printing is the one making active the X—NX socket. If the group control is used, this heading change is an indication of an error in placement of card sets in that the detail cards and heading cards of a group are reversed. Therefore, the socket may be plugged for either ordinary skipping, form skipping, or card feed stop to be indicative of the error.

Activity of the X—NXE socket is not the indication of an error when operating on inverted forms, for at such times at the end of a form it is normal to detect a change from the last heading card of one group to the first detail card of another group. Therefore, plugging may be to a D or T socket of a tape brush selector to stop the new form at the first detail or item line on the top or body portion of the form.

Both control sockets NX—NXL and NX—NXT are made active by inverted overflow conditions the same as when working with conventional forms, with the exceptions that the overflow perforation is sensed coincident with the midsection rather than the end of a form, and the skipping operation is selected to stop near the top of a form rather than after a heading space. Therefore, plugging will be to D1 instead of to D6.

The NX—NXE socket is active in detecting an error in the detail cards of a set. In other words, not all successive detail cards are punched with the same account or group number, and there are no intervening heading cards between the disagreeing groups of detail cards. By plugging the NX—NXE socket to the tape brush selector D1, the record form will be ejected to the starting detail print line on a new form.

*X distributor and class selector control over feeding program changes*

It is mentioned hereinbefore how the many sources of control such as heading and detail card changes cause effectiveness of X—NX, NX—X, etc., sockets for plugging to tape selectors D1—D9 or T1—T9 to select a particular tape brush B1—B9 for stopping control to position the record sheet. Such control predetermines a particular program of movement or pattern of sheet appearance. Further control is possible by the perforation of the control tape with two or more patterns or programs of feeding control and then using an X distributor or class selector shift to select a program.

For example, the first four tape brushes B1—B4 could be selective of one feeding program while the next four brushes B5—B8 are selective of an alternative feeding program. Then, with a control socket as X—NX plugged to the common X distributor socket 356, Fig. 20d, socket 353 could be plugged to D1 and socket 355 to D5. Presence of special X distributor perforations in the cards would then determine use of tape brush B5 to cause starting of detail line printing on, say, line 10 of the form, rather than the control of brush B1 to start detailing at line 6. So also all other printing positions on the form could be variably programmed by the X distributor contacts. For control on total cycles, the class selector contacts can be interposed in the feed selector circuits.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for operating on a record strip, a paper feed control tape with differentially spaced perforations for controlling the positioning of said strip, a main operating means, means under control of said operating means for sensing said perforations, means under control of said operating means for feeding said strip in synchronism with the sensing of the perforations in said feed control tape, and means under control of said sensing means for controlling said feeding means to feed said strip predetermined distances.

2. In a machine for operating on a record strip, a feed control tape with indicia for controlling the positioning of said strip, means for advancing said strip and said tape in synchronism, means for operating said advancing means, means for sensing said indicia, and means under control of said sensing means to disable said operating means to stop said strip in predetermined positions.

3. In a machine for operating on a record strip, a feed control tape with indicia for controlling the feeding of said strip, a rotatable means for advancing said strip and said tape, a driving means, a clutch between said driving means and said rotatable means, means for sensing said indicia, and means under control of said sensing means for operating said clutch to control the feeding of said strip.

4. In a machine for recording on a record strip, a platen for holding said strip, a driving means, a clutch between said driving means and said platen, a feed control tape with indicia for controlling the feeding of said strip, means connected to said platen for supporting and moving said tape, means for sensing said indicia, and means under control of said sensing means for operating said clutch to control the feeding of said strip.

5. In a machine for printing on a continuous record strip divided into forms, a feed roller around which said strip is fed, an endless control tape with feed perforations and sheet spacing control perforations, a sprocket wheel engaging said tape feed perforations to advance the tape, a clutch between said wheel and said roller and a manipulative knob with connections to said clutch to engage or disengage it, means for driving said wheel, and means under control of said control perforations for starting and stopping said driving means.

6. In a machine for operating on a record strip, an elongated feed control tape with feed control indicia placed differentially thereon in a diagonal pattern, said indicia being spaced laterally in successive sensing positions and longitudinally in successive positions representing line spaces, a line of sensing devices extending laterally across said tape, means for advancing said strip and tape in synchronism, means for selecting said sensing devices seriatim, and means under control of the selected sensing devices for feeding said strip to a succession of predetermined positions.

7. In a record controlled machine for operating on a strip, said records bearing indicia to control the feed of said strip, means for analyzing said records, a feed control tape with indicia to control the feed of said strip, means for sensing said tape, means feeding said strip and said tape in synchronism, and means under control of both said analyzing means and said sensing means for controlling said feeding means to feed said strip to predetermined positions.

8. A machine as set forth in claim 7 with means for causing alternating control over said feed controlling means by said record analyzing means and said tape sensing means.

9. A machine as set forth in claim 7 with means under control of said record analyzing means for causing said controlling means to initiate feeding, and means under control of said tape sensing means for governing said controlling means to select the stopping points along said strip.

10. In a machine controlled by heading and detail cards to print on a record strip divided into forms with a plurality of heading, amount and total areas, said heading and detail cards being distinguished by indicia to control the feed of said strip, means for sensing said card indicia, a feed control tape with indicia spaced thereon to limit said areas of heading, amount and total print on said strip, means for sensing said tape indicia, means for feeding said strip and said tape in synchronism, means under control of said card sensing means for initiating operation of said feeding means, and means under control of said tape sensing means for stopping said feeding means.

11. In an accounting machine, an endless control tape with a plurality of columns of indicia placed thereon for control of said machine, means for feeding said tape, a set of sensing brushes, one for each of said columns for sensing said indicia, means cooperating with said feeding means for supporting said tape to move in an elliptical path, means for holding said set of brushes, said holding means being movably mounted and having a spring tending to move the brushes away from the tape, and a latch cooperating with said holding means to hold it in a normal position wherein said brushes press on said tape, said latch having a finger piece for manual operation.

12. The combination set forth in claim 11 further characterized by the provision of a tensioning member on said holding means for pressing on said tape to hold it taut when said brushes are pressing thereon, and releasing the tape for removal when the brush holding means is unlatched.

13. The combination set forth in claim 11, wherein said tape supporting means comprises a pin feed wheel at one end of said tape in the elliptical path, and a box carrying a series of spaced semicircular guides, one of which supports the other end of said tape in the elliptical path, said box having an adjustable pin and slot connection with the frame of the machine, whereby tapes of different lengths may be supported.

14. In a record controlled machine for operating on a record strip divided into operation receiving areas, a feed control tape with indicia to control the feed of said strip, means for advancing the control records, one by one, means for line spacing said strip, means for sensing said tape, means for feeding said strip and said tape in synchronism, means under control of said tape sensing means for controlling the operation of said feeding means for long feeding movements from area to area, and means under control of the last mentioned means for suspending operation of said record advancing means during long feeding of the strip.

15. The combination set forth in claim 14 with a means for detecting the control for short feeding movement of the strip, and means under control of said detecting means to disable said suspending means, whereby record advancement is continued while feeding said strip.

16. In an accounting machine, a control tape with a regular succession of feeding perforations and differentially located perforations placed therein for control of the machine, means for feeding said tape, means for sensing said tape, said feeding and sensing means including a metallic cylinder with projecting pins for cooperating with the feeding perforations of said tape, and insulating means for separating said cylinder electrically from the machine.

17. The combination of claim 16 wherein said cylinder is formed with a ring of openings through which project the pins as separate shouldered pieces, and an annular ring held under the pins to hold them in the extended position.

18. The machine of claim 16 with a record strip, means under control of said sensing means for feeding said record strip, a commutator connected to said cylinder, and means under control of said commutator for regulating line space movement of said strip.

19. In a device for controlling the feed of a record strip, a platen for supporting said strip, a feed control tape with indicia, a pin feed wheel for supporting said tape, a main operating means, a clutch between said operating means and connections to said platen and wheel to synchronize their movement, means for operating said clutch to initiate feeding, means for sensing said tape indicia, and means under control of said sensing means to control said clutch operating means to terminate feeding at points predetermined by said indicia.

20. A device as set forth in claim 19 with a circuit breaker for said tape sensing means and connections therefrom to said pin feed wheel and said platen to synchronize the motion of all three.

21. A device as set forth in claim 19 with a line space control commutator with regularly spaced segments, said commutator being connected to be synchronized with said pin feed wheel and said platen, and means under control of said commutator to control said clutch operating means to terminate feeding after a number of line spaces determined by the location of the commutator segments.

22. In a machine for recording on a strip, means for feeding said strip, a feed control tape with indicia, means for advancing said tape in synchronism with said strip, means for sensing said indicia, means under control of said sensing means for controlling said feeding means, amount entering means, accumulating devices adjusted under control of said entering means, total taking devices cooperating with said accumulating devices to read out totals, and means under control of said sensing means for initiating operation of said total taking devices when a predetermined line is reached on said strip.

23. In a machine for recording items and totals on a strip divided into record forms, item entering devices, printing devices, accumulating devices, total taking devices cooperating with said printing and accumulating devices, means for feeding said strip, a feed control tape with an overflow indicium and a predetermined total line indicium, means for advancing said tape in synchronism with the feeding of said strip, means for sensing said overflow indicium, means under control of said sensing means for controlling said feeding means to feed the strip from form to form upon the detection of the end of one form, means for initiating operation of said total taking devices, means under control of said total initiating means for disabling said overflow controlling means, means for sensing said total line indicium, means under control of said initiating means for selecting said total indicium sensing means, and means under control of said total indicium sensing means for controlling said feeding means to feed the strip to a predetermined line.

24. A machine of the kind set forth in claim 23 with control by records divided into groups, each group having heading and item records, said strip forms being divided into areas for heading space and an item body space, group control devices for detecting changes in record groups, means under control of said group control devices for automatically initiating operation of said total taking devices and selecting said total indicium sensing means to supersede said overflow indicium sensing means, whereby the latter is ineffective to control feeding from the last line of one form to the first body line of the next form and instead the control of feeding is such as to feed to the predetermined total line before total printing and then to the first heading line of the next form.

25. In a record controlled machine for recording on a strip divided into forms with predetermined item and total recording areas, said records being arranged in groups with group number indicia for minor, intermediate and major control, means for feeding said records successively, means for sensing said group number indicia, group control devices under control of said sensing means for detecting changes in groups, accumulating devices, printing devices, and means under control of said group control devices for operating said printing devices to record minor, intermediate and major group totals on said strip, strip feeding means, means under control of said group control devices for initiating strip feeding before total recording, a feed control tape with plural columns of stop control indicia located to predetermine total recording positions, a plurality of sensing devices for sensing said stop control indicia, means for selecting said sensing devices separately under control of said group control devices for minor, intermediate and major changes, and means under control of the selected sensing devices for controlling said strip feeding means to position the recorded minor, intermediate and major totals at predetermined lines on said strip.

26. In a machine for recording on a strip divided into successive related forms of different lengths, a feed control tape of a length proportional to, or a multiple of, the total length of said related forms, said tape bearing indicia positioned to control the areas of recording on said strip, means for sensing said indicia, means for feeding said strip, and means under control of said sensing means for controlling the operation of said feeding means to advance said strip to predetermined record receiving positions.

27. In a machine for recording on a strip divided into a plurality of recurrent forms of different lengths, a feed control element of a length proportional to the sum of the lengths of said plural recurrent forms, said element bearing indicia positioned thereon to predetermine the areas of recording on said strip, means for feeding said strip, means for sensing said indicia, and means under control of said sensing means for controlling the operation of said feeding means to position said strip for recording.

28. In a machine controlled by groups of detail and heading cards to record data on a record strip, means for sensing said cards, group control means under control of said sensing means for finding changes in card groups, means for detecting a change from detail to heading cards, means for feeding said record strip, feed control devices with an endless perforated control tape for predetermining the degree of operation of said feeding means to position said strip to a predetermined total printing line and a first heading print line, means under control of said detecting means for controlling one of said devices for feeding to a first heading line, means under control of said group control means for suspending control by the last mentioned means, and means under control of said group control means for controlling one of said devices for feeding said strip to a predetermined total line before going to a following heading line.

29. In a machine controlled by groups of detail and heading cards to record data on a record strip, means for sensing said cards, group control means under control of said sensing means for determining changes in card groups, means under control of said sensing and group control means for recording a group indication on said strip after each change in group, means for detecting the appearance of heading cards, means under control of said detecting means for disabling said group indication recording means during detection of heading cards, and means under control of said detecting means for initiating operation of said group indication recording means after detection of the last heading card of a group.

30. In a machine for operating on a record strip, a control element with indicia for controlling feeding of said strip and predetermining the operation receiving positions of said strip, a plurality of means for sensing said indicia, means for feeding said strip, means under control of said sensing means for controlling said feeding means, means for selecting one of said sensing means for feeding control, and means for delaying operation of said selecting means so that feeding control occurs after rather than before an operation on the strip.

31. In a machine for operating on a record strip, a control tape with indicia for predetermining the operation receiving positions of said strip, a plurality of means for sensing said indicia, means for feeding said strip, means under control of said sensing means for controlling said feeding means, a relay for each of said sensing means for selecting control by a related sensing means, a pair of pickup coils for said relay, a second relay, one of said pair of coils having a plug socket for direct control and the other being in a holding for said second relay, a pickup coil and plug socket for said second relay, machine controls for emitting feed control impulses, means for plugging said emitting controls to either the direct pickup coil or the coil of the second relay, whereby feeding of said strip occurs selectively before or after operation thereon.

32. In a record controlled machine for printing on a record strip under control of groups of cards, said cards being distinguished by group number indicia, said cards being further distinguished within groups by digit indicia, special distribution indicia, class selection indicia, and heading and detail card distinguishing indicia, sets of upper and lower sensing brushes, means for feeding said cards under said upper brushes and one cycle later under said lower brushes, group control devices cooperating with certain of said brushes to detect changes in group number indicia, minor, intermediate and major group change devices controlled by a digit distributor commutator with connections therefrom to one of said sensing brushes for reading the digit indicia, distributor controls connected to one of said sensing brushes for reading said special indicia, selection controls connected to one of said sensing brushes for reading said class indicia, heading controls connected to one of said sensing brushes for reading heading indicia and detecting changes from heading to detail cards and vice versa, the combination of a control tape with a plurality of columns of indicia for controlling feeding of said strip and predetermining the print receiving positions of said strip, means for feeding said strip, a plurality of means for sensing said tape indicia, means under control of said tape sensing means for controlling operation of said feeding means, a plurality of selecting means each for selecting one of said tape sensing means for control over feeding, and means for placing any one of said selecting means under control of any of the following: upper sensing brushes, lower sensing brushes, minor, intermediate or major group control devices, digit distributor commutator, special distributor controls, class selection controls and heading controls, whereby reading of card indicia and change of machine functions are selective of tape control for determining the extent of strip feeding.

33. In a machine controlled by successive groups of cards for operating on a record sheet, certain of said card groups being distinguished from others by special indicia, a feeding control element bearing a plurality of sets of indicia for governing programs of feeding control for said sheet, a plurality of sets of sensing means for sensing said element indicia, means for sensing said special card indicia, means under control of the last mentioned sensing means for selecting one of said sets of element sensing means, a sheet feeding means, and means under control of said selected set of element sensing means for controlling said sheet feeding means to position said sheet with a selected program of sheet spacing.

34. In a machine controlled by records for printing on a record strip, said records bearing digit indicia, means for feeding said strip, a feed control tape with feed control indicia, a plurality of sensing means for sensing said feed indicia, devices for sensing said digit indicia, means under control of said sensing devices for selecting one of said tape sensing means for control, and means under control of the selected sensing means for controlling said feeding means to advance said strip to a position determined by the related feed control indicium.

35. In a machine for feeding a record strip, a feed roller for said strip, a commutator geared to said roller, said commutator having a plurality of rings of differently spaced spots for governing line spacing of different extents, means for rotating said roller and commutator, a control key, means under control of said key for initiating operation of said rotating means, means for selecting one of said rings of spots, and means under control of a spot of a selected ring for stopping said rotating means to locate the commutator in a starting position.

36. A machine of the kind set forth in claim 35 with automatic means for controlling said initiating means to operate said rotating means, automatic means for stopping said rotating means to long space the strip, and means under control of said automatic initiating control means to disable said control key during operation of said rotating means.

37. In a machine for recording on a strip with an initial recording position, a feed control tape with an initial indicium and other feed control indicia, devices for sensing said feed control indicia, means for feeding said strip, means under control of said sensing devices for controlling said feeding means, means for sensing said initial indicium, means for moving said tape and sensing means with respect to each other, a tape restoration key, means under control of said key for initiating operation of said moving means, means for stopping said moving means, normally ineffective connections between said sensing means and said stopping means, and means under control of said key for making said connections effective to stop the tape in the initial position, whereby the tape is positioned before the strip is coordinated therewith.

38. A machine of the kind set forth in claim 37, wherein said tape also bears a final indicium, normally ineffective connections between said sensing devices and said stopping means, means for detecting said final indicium, and means under control of said detecting means for making said connections effective for tape control of strip feed on subsequent operations.

39. In a machine for recording on a strip, a feed control tape with a plurality of columns of indicia, a plurality of sensing devices cooperating separately with the columns of spaced indicia on the tape, means for feeding said strip, means for advancing said tape, means for initiating operation of said feeding and advancing means, a series of relays related to said sensing devices, pairs of contacts operated by said relays, each pair having a normally open side connected to one of said devices and a closed side connected in series with similar contacts in a common stopping circuit, any of said sensing devices effecting operation of its contacts for connection to said circuit upon sensing a related indicium, means for operating one of said relays to select a particular sensing device, and means under control of said circuit for terminating operation of said feeding means when the selected sensing device encounters an indicium.

40. In a record controlled machine for printing on a record strip, printing devices, means for feeding the control records successively, means for sensing the records, means under control of said sensing means for controlling said printing devices, means for detecting the sensing of the first record, a feed control tape with indicia, a plurality of devices for sensing said tape indicia, means for selecting one of said sensing devices, means for feeding said strip, means under control of the selected sensing device and the tape for controlling said strip feeding means, and means under control of said first record detecting means for preventing operation of said selecting means until the first card entry is made.

41. The combination set forth in claim 40 wherein said records are divided into groups with heading and detail cards in the groups, said selecting means including devices for sensing changes in groups and changes from detail to heading records and vice versa, a set of relays under control of said change sensing devices and selected for calling in one of said tape sensing devices, means for operating a selected relay, and means under control of said first record detecting means for disabling said relay operating means until the first record is recorded.

42. In a machine for recording on a strip as controlled by heading and detail records arranged in successive related groups, said heating records being distinguished from the detail records by X indicia, means for feeding said records successively, means for sensing said X indicia, means under control of said sensing means for detecting the four relationships between the records at any feed cycle, i. e., X sensing followed by X sensing to denote a heading to heading feed, X sensing followed by no X sensing to denote a heading to detail change, no X sensing followed by X sensing to denote a detail to heading change, and no X sensing followed by no X sensing to denote a detail to detail feed, a feed control tape with indicia to control strip feeding, a plurality of means for sensing said tape indicia, means under control of said tape sensing means for feeding said strip differentially according to the one of the plural means selected, and means under control of said detecting means for selecting said tape sensing means according to the occurrence of the four record relationships.

43. The combination set forth in claim 42 wherein said records bear group number indicia for relating groups of heading and detail records, group control devices cooperating with the record sensing means for sensing changes in card groups, means under control of said group control devices and cooperating with said detecting means for determining coincidences of group changes with heading and detail changes whereby four changes may be noted, i. e., a group change with X to X sensing denoting an error in heading grouping, a group change with X to no X sensing denoting an error in heading and detail grouping, a group change with no X to X sensing denoting an error in detail and heading grouping when recording in inverted fashion, a group change with no X to no X sensing denoting an error in detail grouping, and means under control of said error determining means for selecting said tape sensing means according to the occurrence of the errors.

44. In a machine for operating on a record as controlled by a tape with control indicia in a plurality of columns, a plurality of tape reading brushes provided for differential control, means for selecting a tape reading brush, means under control of the selected brush for determining record operation, means under control of said selecting means for initiating tape feeding, means under control of said initiating means for preparing to disable said selecting means, means under control of the selected brush when reading a tape indicium for terminating tape feeding, and means under control of said preparing and terminating means for momentarily disabling said brush selecting means to prepare it for other brush selection operations.

45. In a machine for recording data on a record strip divided into forms, means for entering data, printing devices under control of said entering means, means for feeding said strip as data is recorded thereon, a control tape with spaced feed control indicia and an overflow indicium coinciding with the predetermined limit of recording area on a form, means for advancing said tape in synchronism with the feed of the strip, means for sensing said overflow indicium, means under control of said overflow sensing means for initiating operation of said strip feeding means to feed it from form to form, a plurality of separate means for sensing said feed control indicia, and means under control of said indicia sensing means for stopping said strip feeding means with the strip at a predetermined recording point on the second form.

46. The combination set forth in claim 45 with a means under control of said overflow sensing means for selecting any one of said plurality of feed indicia sensing means for control to determine where the overflow feed is to stop.

47. In a machine for printing inverted forms as controlled by records arranged with sets of detail records each followed by related heading records, said heading records bearing special indicia, said sets of detail records being distinguished by group number indicia, means for sensing said group ndicia, group control devices under control of said sensing means for controlling the machine operation when record groups change, means for sensing said special indicia, and means under control of said special indicia sensing means for disabling said group control devices between the last heading record of one group and the first detail record of the next group.

48. In a machine controlled by records arranged in groups with group number indicia, the last record of certain groups bearing special indicia, means for sensing said group number indicia, group control devices under control of said sensing means for controlling the machine operation when record groups change, devices for sensing said special indicia, and means under control of said special indicia sensing devices for disabling said group control devices when comparing the last special indicia bearing record of one group with the following record of the next group.

49. The combination set forth in claim 48 with the machine recording on a strip divided into forms, and the records arranged with each group having detail and heading records, the latter bearing special indicia, means for feeding said strip, means under control of said group control devices and said special sensing devices for controlling said feeding means, the group control devices predominating on changes between detail records and changes from detail to heading records, and said special sensing devices predominating on changes between heading and detail records.

50. In a machine for recording on a strip as controlled by records arranged in groups and distinguished by group control indicia, means for sensing said indicia, means under control of said sensing means for detecting errors in record grouping, means for feeding said strip, a feed control tape with a plurality of columns of feed control indicia, a plurality of devices for sensing separate columns of said feed indicia, means for advancing said tape in synchronism with the feed of the strip, means for selecting certain of said sensing devices for strip feeding control, means under control of said selected sensing devices for controlling said strip feeding means to position said strip in a predetermined way for a recording pattern, and means under control of said error detecting means for disabling the selected tape sensing devices for a portion of tape movement whereby the strip portions reserved for recording of missing records will be skipped.

51. In a machine for feeding a record sheet to receive data on predetermined lines, means for holding said sheet, a driving means, means for engaging said driving means with said holding means to feed said sheet, means for disengaging said driving means to stop sheet feeding, a line selecting tape with a plurality of columns of differentially located perforations, a plurality of pluggable sensing brushes, one for each tape column, means for moving said tape in synchronism with the sheet feed to permit contact through the perforations to one after another of said brushes, relays plugged to certain of said brushes, and means under control of said relays for operating said engaging and said disengaging means at predetermined line positions on the sheet to determine the data receiving area thereon.

52. In a machine for recording on a strip, means for feeding said strip, a feed control tape with a feed start indicium and a feed stop indicium, means for moving said tape with said strip, means for sensing said start indicium, means under control of said sensing means for initiating operation of said feeding means, means for detecting said stop indicium, and means under control of said detecting means for stopping said feeding means, whereby the strip is positioned for recording according to the positions of said indicia on said tape.

53. In a machine for operating on a record strip, a feed control tape with a plurality of columns of indicia for controlling the positioning of said strip, means for advancing said strip and said tape in synchronism, means for operating said advancing means, a relay for disabling said operating means to stop said strip in predetermined positions, a series of tape indicia sensing brushes, one for each of said columns, a common circuit for said relay, and means for selectively connecting said brushes in said circuit.

54. In a machine for operating on a record strip divided into sections, an endless feed control tape with indicia for controlling the positioning of said strip, the length of said tape being proportional to or a multiple of the length of one of said sections into which said strip is divided, means for supporting said tape, means for advancing said strip and said tape in synchronism, means for operating said advancing means, means for sensing said indicia, and means under control of said sensing means for stopping said operating means to stop said strip in predetermined positions.

55. In a record controlled machine for operating on a strip divided into forms, said records bearing indicia to control the feeding of said strip, means for analyzing said records, an endless feed control tape with indicia to control the feeding of said strip, said tape being equal in length or a multiple of the length of one of said forms into which said strip is divided, means for supporting said tape, means for sensing said tape, means for feeding said strip and said tape in synchronism, and means under control of both said analyzing means and said sensing means for controlling said feeding means to feed said strip to predetermined positions.

56. In a machine controlled by heading and detail cards to print on a record strip divided into forms with a plurality of heading, detail and total areas, said heading and detail cards being distinguished by indicia to control the feed of the strip, means for sensing said card indicia, an endless feed control tape with indicia spaced thereon to limit said areas of heading, detail and total print on said strip, said tape being of a length proportional to or a multiple of the length of one of said forms into which said strip is divided, means for supporting said tape, means for sensing said tape indicia, means for feeding said strip and said tape in synchronism, means under control of said card sensing means for initiating operation of said feeding means, and means under control of said tape sensing means for stopping said feeding means.

57. In a record controlled machine for operating on a record strip divided into operation receiving areas, an endless feed control tape with indicia to control the feeding of said strip, said tape being equal in length to the length of one or more of said areas into which said strip is divided, means for advancing the control records in succession, means for line spacing said strip, means for supporting said tape, means for sensing said tape, means for feeding said strip and said tape in synchronism, means under control of said tape sensing means for controlling the operation of said feeding means for long feeding movements from area to area, and means under control of the last mentioned means for suspending operation of said record advancing means during long feeding movement of the strip.

58. In a machine for recording on a strip, said strip being divided into sections, means for feeding said strip, an endless feed control tape with indicia, said tape being equal in length to one or more of said sections into which said strip is divided, means for supporting said tape, means for advancing said tape in synchronism with said strip, means for sensing said indicia, means under control of said sensing means for controlling said feeding means, amount entering means, accumulating devices adjusted under control of said entering means, total taking devices cooperating with said accumulating devices to read out totals, and means under control of said sensing means for initiating operation of said total taking devices when a predetermined line is reached on said strip.

59. In a machine for operating on a record divided into sections as controlled by an endless tape with control indicia in a plurality of columns, said tape being equal in length to the length of one or more of said sections into which said record is divided, means for supporting said tape, a plurality of tape reading brushes provided for differential control, means for selecting a tape reading brush, means under control of the selected brush for determining record operation, means under control of said selecting means for initiating tape feeding, means under control of said initiating means for preparing to disable said selecting means, means under control of the selected brush when reading a tape indicium for terminating tape feeding, and means under control of said preparing and terminating means for momentarily disabling said selecting means to prepare it for other brush selection operations.

60. In a machine for recording data on a record strip divided into forms, means for entering data, printing devices under control of said entering means, means for feeding said strip as data is recorded thereon, an endless control tape with spaced feed control indicia and an overflow indicium coinciding with the predetermined limit of recording area on a form, said tape being of a length equal to the length of one or more of said forms, means for supporting said tape, means for advancing said tape in synchronism with the feed of the strip, means for sensing said overflow indicium, means under control of said overflow sensing means for initiating operation of said strip feeding means to feed it from form to form, a plurality of separate means for sensing said feed control indicia, and means under control of said indicia sensing means for stopping said strip feeding means with the strip at a predetermined recording point on the second form.

61. In a machine for recording on a strip divided into sections as controlled by records arranged in groups and distinguished by group control indicia, means for sensing said indicia, means under control of said sensing means for detecting errors in record grouping, means for feeding said strip, an endless feed control tape with a plurality of columns of feed control indicia, said tape being equal in length to one or more of said strip sections, means for supporting said tape, a plurality of devices for sensing separate columns of said feed indicia, means for advancing said tape in synchronism with the feed of the strip, means for selecting certain of said sensing devices for strip feeding control, means under control of said selected sensing devices for controlling said strip feeding means to position said strip in a predetermined way for a recording pattern, and means under control of said error detecting means for disabling the selected tape sensing devices for a portion of tape movement, whereby the strip portions reserved for recording of missing records will be skipped.

62. In a machine for feeding a record sheet to receive data on predetermined lines, said sheet being divided into sections, means for holding said sheet, a driving means, means for engaging said driving means with said holding means to feed said sheet, means for disengaging said driving means to stop sheet feeding, an endless line selecting tape with a plurality of columns of differentially located perforations, said tape being equal in length to the length of one or more of the selections into which the sheet is divided, means for supporting said tape, a plurality of pluggable sensing brushes, one for each tape column, means for moving said tape in synchronism with the sheet feed to permit contact through the perforations to one after another of said brushes, relays plugged to certain of said brushes, and means under control of said relays for operating said engaging and said disengaging means at predetermined line positions on the sheet to determine the data receiving area thereon.

63. In a machine for recording on a strip, said strip being divided into sections, means for feeding said strip, and endless feed control tape with a feed start indicium and a feed stop indicium, said tape being equal in length to one or more of said section lengths, means for supporting said tape, means for moving said tape with said strip, means for sensing said start indicium, means under control of said sensing means for initiating operation of said feeding means, means for detecting said stop indicium, and means under the contr ' of said detecting means for stopping said feeding means, whereby the strip is positioned for recording according to the positions of said indicia on said tape.

64. In a machine for operating on a record strip, said strip being divided into sections, an endless feed control tape with a plurality of columns of indicia for controlling the positioning of said strip, said tape being equal in length to the length of a section of said strip or a multiple thereof, means for supporting said tape, means for advancing said strip and said tape in synchronism, means for operating said advancing means, a relay for disabling said operating means to stop said strip in predetermined positions, a series of tape indicia sensing brushes, one for each of said columns, a common circuit for said relay, and means for selectively connecting said brushes in said circuit.

65. In a machine controlled by cards for operating on a record sheet, certain of said cards being distinguished from others by special indicia, a feeding control element bearing a plurality of sets of indicia for governing programs of feeding control for said sheet, a plurality of sets of sensing means for sensing said element indicia successively, means for sensing said special card indicia, means under control of the last mentioned sensing means for selecting one of said sets of element sensing means, a sheet feeding means, and means under control of said selected set of element sensing means for controlling said sheet feeding means to position said sheet with a selected program of sheet spacing.

66. In a machine for recording on a strip as controlled by heading and detail records arranged in successive recorded groups, said heading records being distinguished from the detail records by X indicia, means for feeding said records successively, means for sensing said X indicia, means under control of said sensing means for detecting four relationships between the records at any feed cycle, i. e., X sensing followed by X sensing to denote a heading to heading feed, X sensing followed by no X sensing to denote a heading to detail change, no X sensing followed by X sensing to denote a detail to heading change, and no X sensing followed by no X sensing to denote a detail to detail feed, a feed control tape with indicia to control strip feeding, a plurality of means for sensing said tape indicia, means under control of said tape sensing means for feeding said strip differentially according to one of the plural means selected, means under control of said detecting means for selecting said tape sensing means according to the occurrence of the four record relationships, said strip being divided into forms with heading and detail portions, said records being distinguished by group control indicia, group control devices cooperating with the record sensing means for sensing changes in card groups, means under control of said group control devices and cooperating with said detecting means for determining errors in grouping by detecting coincidences of group changes with heading and detail record continuances or changes and thus determining X—X, X—NX, NX—X and NX—NX errors, means for feeding said tape cyclically with one cycle of the tape synchronizing with the feed of one form on a strip, and means under control of said error determining means for disabling the selected tape sensing means for the post error portion of a tape cycle, means for again enabling the selected tape sensing means on a second cycle whereby portions of two forms of the strip are skipped to leave room for recording the data of missing heading or detail records.

67. In a machine for recording on a strip as controlled by heading and detail records arranged in successive recorded groups, said heading records being distinguished from the detail records by X indicia, means for feeding said records successively, means for sensing said X indicia, means under control of said sensing means for detecting four relationships between the records at any feed cycle, i. e. X sensing followed by X sensing to denote a heading to heading feed, X sensing followed by no X sensing to denote a heading to detail change, no X sensing followed by X sensing to denote a detail to heading change, and no X sensing followed by no X sensing to denote a detail to detail feed, a feed control tape with indicia to control strip feeding, a plurality of means for sensing said tape indicia, means under control of said tape sensing means for feeding said strip differentially according to one of the plural means selected, means under control of said detecting means for selecting said tape sensing means according to the occurrence of the four record relationships, said records being distinguished by group control indicia, group control devices cooperating with the record sensing means for sensing changes in card groups, means under control of said group control devices and cooperating with said detecting means for determining errors in grouping by detecting coincidences of group changes with heading and detail record continuances or changes and thus determining X—X, X—NX, NX—X and NX—NX errors, means for feeding said tape cyclically with one cycle of the tape synchronizing with the feed of one form on a strip, and means under control of said error determining means for disabling the selected tape sensing means for the post error portion of a tape cycle, and means under control of said error determining means for stopping said record feeding means.

68. In a machine for recording on a record strip, a platen for holding said strip, a driving means, a clutch between said driving means and said platen, a feed control tape with indicia for controlling the feeding of said strip, means connected to said platen for supporting and moving said tape, means for sensing said indicia, means under control of said sensing means for operating said clutch to control the feeding of said strip, said clutch operating means including a relay and a circuit therefor with normally closed contacts, and a stop key for opening said contacts to stop the strip and tape in a desired position.

69. In a machine controlled by control records for recording on a strip with an initial recording position, a feed control tape with an initial indicium and other feed control indicia, devices for sensing said indicia, means for feeding said strip, means under control of said sensing devices for controlling said feeding means, means for sensing said initial indicium, means for moving said tape and sensing means with respect to each other, a tape restoration key, means under control of said key for initiating operation of said moving means, means for stopping said moving means, normally ineffective connections between said sensing means and said stopping means, means under control of said key for making said connections effective to stop the tape in the initial position whereby the tape is positioned before the strip is coordinated therewith, means for feeding said control records successively, means for detecting the passage of a last record, means under control of said detecting means for controlling instead of said key to initiate operation of the moving means and make said connections effective to stop the tape in the initial position, whereby the tape is positioned before a new set of records control recording on the strip.

70. In a machine for recording on a strip as controlled by heading and detail records arranged in successive recorded groups, said heading records being distinguished from the detail records by X indicia, means for feeding said records successively, means for sensing said X indicia, means under control of said sensing means for detecting four relationships between the records at any feed cycle, i. e. X sensing followed by X sensing to denote a heading to heading feed, X sensing followed by no X sensing to denote a heading to detail change, no X sensing followed by X sensing to denote a detail to heading change, and no X sensing followed by no X sensing to denote a detail to detail feed, a feed control tape with indicia to control strip feeding, a plurality of means for sensing said tape indicia, means under control of said tape sensing means for feeding said strip differentially according to one of the plural means selected, means under control of said detecting means for selecting said tape sensing means according to the occurrence of the four record relationships, said strip being divided into forms with heading and detail areas inverted, means under control of said detecting means upon a no X to X change for selecting a tape sensing means to control feeding from the detail area to the top of the heading area of the same form, and means under control of said detecting means upon an X to no X change for selecting a tape sensing means to control feeding from the heading area of one form to the detail area of the next form.

71. In a machine for recording on a strip as controlled by heading and detail records arranged in successive recorded groups, said heading records being distinguished from the detail records by X indicia, means for feeding said records successively, means for sensing said X indicia, means under control of said sensing means for detecting four relationships between the records at any feed cycle, i. e. X sensing followed by X sensing to denote a heading to heading feed, X sensing followed by no X sensing to denote a heading to detail change, no X sensing followed by X sensing to denote a detail to heading change, and no X sensing followed by no X sensing to denote a detail to detail feed, a feed control tape with indicia to control strip feeding, a plurality of means for sensing said tape indicia, means under control of said tape sensing means for feeding said strip differentially acocrding to one of the plural means selected, means under control of said detecting means for selecting said tape sensing means according to the occurrence of the four record relationships, said strip being divided into forms with detail and heading areas inverted, said records being distinguished by group control indicia, group control devices cooperating with the record sensing means for sensing changes in card groups, means under control of said group control devices and cooperating with said detecting means for determining coincidences of group changes with heading and detail changes whereby four changes may be noted, i. e., a group change with X to X sensing denoting an error in heading grouping, a group change with X to no X sensing denoting an error in heading and detail grouping, a group change with no X to X sensing denoting an error in detail and heading grouping when recording in inverted fashion, a group change with no X to no X sensing denoting an error in detail grouping, means under control of said error determining means for selecting said tape sensing means to skip an entire form length upon the detection of no X to X, X to X, or no X to no X errors, and upon detection of an X to no X error for selecting a tape sensing means to merely skip from the end of one form to the top of the next form.

72. In a machine for recording on a strip with an initial recording position, said strip being divded into forms with inverted detail and heading reoording spaces, a feed control tape with an initial indicium and other feed control indicia, said tape having a final indicium for the detail space and a secondary final indicium for the heading space, devices for sensing said indicia, means for feeding said strip, means under control of said sensing devices for controlling said feeding means, means for sensing said initial indicium, means for moving said tape and sensing means with respect to each other, a tape restoration key, means under control of said key for initiating operation of said moving means, means for stopping said moving means, normally ineffective connections between said sensing means and said stopping means, means under control of said key for making said connections effective to stop the tape in the initial position whereby the tape is positioned before the strip is coordinated therewith, normally ineffective connections between said sensing devices and said stopping means, means for detecting said final indicium, means under control of said detecting means for making said connections effective for tape control of strip feed on subsequent operations, means for detecting said secondary final indicium, and switching means for making said secondary detecting means controlling over said connection effecting means.

ALBERT W. MILLS.
FRANK J. FURMAN.
EDWARD J. RABENDA.

REFERENCES CITED

The following references are of record in the file of this patent:

UNITED STATES PATENTS

| Number | Name | Date |
|---|---|---|
| 558,221 | Snoeck | Apr. 14, 1896 |
| 636,721 | Gilman | Nov. 7, 1899 |
| 1,508,095 | Fuller | Sept. 9, 1924 |
| 1,591,081 | Curtis | July 6, 1926 |
| 2,003,329 | Young | Nov. 5, 1931 |
| 2,138,646 | Scharr | Nov. 29, 1938 |
| 2,153,182 | Gray | Apr. 4, 1939 |
| 2,243,474 | Bryce | May 27, 1941 |
| 2,310,418 | Ghertzmann | Feb. 9, 1943 |
| 2,328,653 | Lake et al. | Sept. 7, 1943 |
| 2,369,441 | Daly et al. | Feb. 13, 1945 |